(12) United States Patent
Gould et al.

(10) Patent No.: US 12,433,941 B2
(45) Date of Patent: Oct. 7, 2025

(54) EXOSOMAL NUCLEIC ACID VACCINE MODULARLY CONFIGURED TO HARNESS MULTIPLE ANTIGEN PRESENTATION MECHANISMS

(71) Applicants: The Johns Hopkins University, Baltimore, MD (US); Capricor, Inc., Beverly Hills, CA (US)

(72) Inventors: Stephen John Gould, Baltimore, MD (US); Linda Marban, Santa Monica, CA (US); Tariq Hussain Warsi, Thousand Oaks, CA (US)

(73) Assignees: The Johns Hopkins University, Baltimore, MD (US); Capricor, Inc., Beverly Hills, CA (US)

( * ) Notice: Subject to any disclaimer, the term of this patent is extended or adjusted under 35 U.S.C. 154(b) by 577 days.

(21) Appl. No.: 17/909,610

(22) PCT Filed: Mar. 12, 2021

(86) PCT No.: PCT/US2021/022222
§ 371 (c)(1),
(2) Date: Sep. 6, 2022

(87) PCT Pub. No.: WO2021/183961
PCT Pub. Date: Sep. 16, 2021

(65) Prior Publication Data
US 2023/0142621 A1    May 11, 2023

Related U.S. Application Data

(60) Provisional application No. 63/155,268, filed on Mar. 1, 2021, provisional application No. 63/110,325, filed on Nov. 5, 2020, provisional application No. 63/108,847, filed on Nov. 2, 2020, provisional application No. 63/061,766, filed on Aug. 5, 2020, provisional application No. 63/000,211, filed on Mar. 26, 2020, provisional application No. 62/990,946, filed on Mar. 17, 2020, provisional application No. 62/989,525, filed on Mar. 13, 2020.

(51) Int. Cl.
| | | |
|---|---|---|
| *A61K 39/12* | (2006.01) |
| *A61K 9/127* | (2006.01) |
| *A61K 31/7105* | (2006.01) |
| *A61K 35/28* | (2015.01) |
| *A61K 39/00* | (2006.01) |
| *A61P 31/14* | (2006.01) |
| *C07K 14/245* | (2006.01) |
| *C12N 9/06* | (2006.01) |
| *C12N 15/85* | (2006.01) |
| *C12N 15/88* | (2006.01) |

(52) U.S. Cl.
CPC .............. *A61K 39/12* (2013.01); *A61K 9/127* (2013.01); *A61K 31/7105* (2013.01); *A61K 35/28* (2013.01); *A61P 31/14* (2018.01); *C07K 14/245* (2013.01); *C12N 9/003* (2013.01); *C12N 15/85* (2013.01); *C12N 15/88* (2013.01); *A61K 2039/53* (2013.01); *A61K 2039/572* (2013.01); *A61K 2039/575* (2013.01); *A61K 2039/70* (2013.01); *C07K 2319/00* (2013.01); *C12N 2800/107* (2013.01); *C12N 2830/002* (2013.01); *C12N 2840/10* (2013.01)

(58) Field of Classification Search
None
See application file for complete search history.

(56) References Cited

U.S. PATENT DOCUMENTS

| 10,493,165 B2 | 12/2019 | Selaru et al. |
| 2018/0028687 A1 | 2/2018 | Selaru et al. |
| 2020/0030432 A1* | 1/2020 | Ciaramella ............. A61P 31/16 |

FOREIGN PATENT DOCUMENTS

| WO | WO 2015/127094 A1 | 8/2015 |
| WO | WO 2016/159875 A1 | 10/2016 |
| WO | WO 2018/064681 A1 | 4/2018 |
| WO | WO 2018/102795 A2 | 6/2018 |
| WO | WO 2019/010373 A1 | 1/2019 |
| WO | WO 2021/147025 A1 | 7/2021 |
| WO | WO 2021/165667 A1 | 8/2021 |

OTHER PUBLICATIONS

PCT International Search Report and Written Opinion in International Application No. PCT/US2022/43230, dated Jun. 6, 2023, 14 pages.

(Continued)

*Primary Examiner* — Daniel C Gamett
(74) *Attorney, Agent, or Firm* — DLA Piper LLP (US)

(57) ABSTRACT

The present invention relates to modular systems for vaccination against infectious agents that involves the delivery of, e.g., exosome-loaded, antigen-encoding mRNAs to and into cells and tissues of the immunized subject. The present invention also relates to compositions and methods for the design, preparation, manufacture, formulation, and/or use of vaccines, e.g., nucleic acid vaccines, loaded into extracellular vesicles, e.g., exosomes loaded with synthetic mRNAs encoding multiple surface and cytoplasmic antigens of interest, e.g., antigenic polypeptides derived from an infectious virus, e.g., SARS-CoV-2, designed to elicit strong humoral and cellular immune responses due to the simultaneous expression of antigens in their native state and as exosome-associated antigens.

20 Claims, 26 Drawing Sheets
Specification includes a Sequence Listing.

(56) References Cited

OTHER PUBLICATIONS

Rice et al., "A Next Generation Bivalent Human Ad5 COVID-19 Vaccine Delivering Both Spike and Nucleocapsid Antigens Elicits Th1 Dominant CD4+, CD8+ T-cell and Neutralizing Antibody Responses", bioRxiv, Retrieved online <URL: https:www.biorxiv.org/content/10.1101/2020.07.29.227595v1.full >, Jul. 2020, 36 pages.
Tsai et al., "Exosome-Mediated mRNA Delivery For SARS-CoV-2 Vaccination", bioRxiv, Retrieved online <URL: https://www.biorxiv.org/content/10.1101/2020.11.06.371419v1.full.pdf >, Nov. 2020, 49 pages.
EP Search Report in European Application No. 21767199.9, dated Apr. 30, 2024, 14 pages.
Guo et al., "Choice of selectable marker affects recombinant protein expression in cells and exosomes", Journal of Biological Chemistry, Jul. 2021, 297(1): 100838, 13 pages.
Komaki, "SubNAme: Full=GCN5-like N-acetyltransferase {ECO: 0000313; EMBL GCD48210.1}", GenBank Database, UniProt, May 8, 2019, retrieved from EBI accession No. A0A401WG06, 5 pages.
Kuate et al., "Exosomal vaccines containing the S protein of the SARS coronavirus induced high levels of neutralizing antibodies", Virology, Apr. 2007, 362(1): 26-37.
Noorani, "SubName: Full=Puromycin N-acetyltransferase {ECO: 0000313; EMBL: KOT91327.2}", GenBank Database, UniProt, Dec. 9, 2015, retrieved from EBI accession No. A0A0M8RH46, 5 pages.
Tsai et al., "Degron tagging of BleoR and other antibiotic-resistance genes selects for higher expression of linked transgene and improved exosome engineering", Journal of Biological Chemistry, Mar. 2022, 298(5): 101846, 15 pages.
Wu et al., "Wuhan seafood market pneumonia virus isolate Wuhan-Hu-1, complete geno—Nucleotide—NCBI", GenBank Database, Jan. 28, 2020, retrieved from NCBI accession No. MN908947.1, 11 pages.
Xu et al., "Construction of Conveniently Screening pLKO.1-TRC Vector Tagged with TurbiGFP", Appl Biochem Biotechnol, Oct. 2016, 181(2): 699-709.

* cited by examiner

FIGURE 1C  FIGURE 1D

| | MICE | AGE (WEEKS) | N | ROUTE | VOLUME (μL) | EXO_mRNA (UG) | BLEED (μL) |
|---|---|---|---|---|---|---|---|
| GROUP 1 | C57BL6 | 13 | 6 | IM | 50 | 0 | 100 |
| GROUP 2 | C57BL6 | 13 | 6 | IM | 50 | 8 | 100 |
| GROUP 3 | C57BL6 | 13 | 6 | IM | 50 | 2 | 100 |
| GROUP 4 | C57BL6 | 13 | 6 | IM | 50 | 0.5 | 100 |

EXOSOMAL NUCLEIC ACID VACCINE MODULARLY CONFIGURED TO HARNESS MULTIPLE ANTIGEN PRESENTATION MECHANISMS

CROSS-REFERENCE TO RELATED APPLICATIONS

This application is a 35 USC § 371 National Stage application of International Application No. PCT/US2021/022222 filed Mar. 12, 2021, now pending; which claims the benefit under 35 USC § 119(e) to U.S. Application Ser. No. 63/155,268 filed Mar. 1, 2021, U.S. Application Ser. No. 63/110,325 filed Nov. 5, 2020; U.S. Application Ser. No. 63/108,847 filed Nov. 2, 2020; U.S. Application Ser. No. 63/061,766 filed Aug. 5, 2020; U.S. Application Ser. No. 63/000,211 filed Mar. 26, 2020; U.S. Application Ser. No. 62/990,946 filed Mar. 17, 2020; and U.S. Application Ser. No. 62/989,525 filed Mar. 13, 2020. The disclosure of each of the prior applications is considered part of and is incorporated by reference in the disclosure of this application.

INCORPORATION OF SEQUENCE LISTING

The material in the accompanying sequence listing is hereby incorporated by reference into this application. The accompanying sequence listing text file, named JHU4330-6_ST25.txt, was created on Sep. 2, 2022 and is 100 kB in size. The file can be accessed using Microsoft Word on a computer that uses Windows OS.

FIELD OF THE INVENTION

The present invention relates generally to vaccines and more specifically to an exosome-based vaccine platform.

BACKGROUND INFORMATION

Vaccination is an effective way to provide prophylactic protection against infectious diseases, including, but not limited to, viral, bacterial, and/or parasitic diseases, such as influenza, AIDS, hepatitis virus infection, cholera, malaria, tuberculosis, and many other diseases. For example, influenza infections are the seventh leading cause of death in the United States with 200,000 hospitalizations and 40,000 deaths seen in the United States per year and cause about 3-5 million hospitalizations and about 300,000 to 500,000 deaths worldwide per year. Millions of people receive flu vaccines to protect them from seasonal flu each year. Vaccination also holds the best potential for preventing the spread of coronavirus disease 2019 (COVID-19) caused by the severe acute respiratory syndrome coronavirus 2 (SARS-CoV-2). SARS-CoV-2 was first identified in Wuhan, China and has since spread through the entire world. In less than a year from its zoonotic entry into the human population, SARS-CoV-2 has infected more than 45 million people, killed 1.2 million people, and caused worldwide societal disruption.

COVID-19 typically presents with symptoms common to many respiratory infections but can also progress to severe disseminated disease and death. Humans are host to several mildly pathogenic betacoronaviruses (0C43, HKU1, etc.) but SARS-CoV-2 was not present in the human population prior to 2019 when it arose as a zoonosis from a bat coronavirus endemic to China. SARS-CoV-2 is closely related to two prior bat-to-human zoonoses that gave rise to severe acute respiratory syndrome (SARS) in 2003 and middle eastern respiratory syndrome (MERS) in 2012. While SARS-CoV-2 infection is associated with lower mortality than SARS or MERS, SARS-CoV-2 is more transmissible and has become a major cause of morbidity and mortality worldwide.

Infection of a cell by SARS-CoV-2 releases its viral genomic RNA (gRNA) into the cytoplasm, where it is translated into the large polyproteins orf1 and orf1ab. These proteins are processed to more than a dozen polypeptides that prime the cell for virus replication. These proteins also drive the synthesis of subgenomic viral RNAs that encode the SARSCoV-2 structural proteins nucleocapsid (N), spike (S), membrane (M), and envelope (E). The integral membrane proteins S, M, and E are co-translationally translocated into the endoplasmic reticulum and trafficked by the secretory pathway to the Golgi and Golgi-related compartments, and perhaps other compartments of the cell as well. During their intracellular trafficking, the S, M, and E proteins work together to recruit N protein-gRNA complexes into nascent virions, and to drive the budding of infectious vesicles from the cell membrane. The resulting SARS-CoV-2 virions are small, membrane-bound vesicles of ~100 nm diameter, with large, spike-like trimers of S that protrude from the vesicle surface and mediate binding to, and fusion with, target cell membranes.

SARS-CoV-2 receptors include, at a minimum, angiotensin-converting enzyme II (ACE2), neuropilin, and CD147. SARS-CoV-2 receptors are highly expressed on epithelial cells of the respiratory tract, consistent with its respiratory mode of transmission. However, SARS-CoV-2 receptors are also expressed in many other cell types, allowing SARS-CoV2 to spread within the body and impact multiple organ systems, including the brain, heart, gastrointestinal tract, circulatory system, and immune system. Not surprisingly, the consequences of SARS-CoV-2 infection are both pleiotropic and highly variable. Nevertheless, there is clear evidence that SARS-CoV-2 infection elicits immune responses that reverse the course of disease, clear the virus, and confer resistance to reinfection.

These observations augur well for control of SARS-CoV-2 transmission and disease through population-wide immunization with immunity-inducing vaccines. Although there are no validated vaccines for any human coronavirus, disease-preventing vaccines have been developed for certain animal coronaviruses. These successful coronavirus vaccines fall into two types, the attenuated virus vaccines that elicit immune responses to all viral proteins, and inactivated virus particle (IPV) vaccines that induce immunity to only the structural proteins of the virus. Of the SARS-CoV-2 vaccines selected for rapid development, none fall into either of these categories, and instead they all strive only to elicit immunity to just a single protein, the spike-like S protein that mediates virus-cell interactions.

Although S-based SARS-CoV-2 vaccines all target the same protein, they vary significantly in antigen structure and mode of antigen delivery. Forms of S in leading vaccines range from S protein fragments, such as those that target only the receptor-binding domain of spike, to full-length forms of spike, but curiously, none are comprised of a full-length, functional form of spike. As for the modes of S antigen delivery, most enlist host cells to express the S antigen component of their vaccine, from either injected mRNAs or infectious viral vectors, while at least one involves direct injection of purified, recombinant protein.

A typical vaccine contains an agent that resembles the disease-causing agent, which could be a microorganism, such as bacteria, virus, fungi, parasites, or one or more toxins. The antigen or agent in the vaccine stimulates the body's immune system to recognize the agent as a foreign invader, generate cellular immune responses and antibody (humoral) immune responses against it, and thereby inhibit or destroy it, and develop a memory of it. The vaccine-induced memory enables the immune system to act quickly to protect the body from any of these agents that it later encounters. Vaccine production used in the art, e.g., antigen vaccine production, has several stages, including the generation of antigens, antigen purification, in some cases inactivation of infectious agents, and vaccine formulation. The first phase of this process is to generate the antigen through culturing viruses in cell lines, growing bacteria in bioreactors, producing recombinant proteins derived from viruses and bacteria in cell cultures, yeast or bacteria, or synthesize nucleic acids that express the antigens of interest (AOIs). The second phase of the process is to purify the source of antigen, and in the case of killed agent vaccines, to inactivate the virus, bacteria, or parasite. The third phase of the process is to create the actual vaccine formulation, which may include anything from simple dilution of the AOI in buffer, to the mixing of the AOI with adjuvants.

As demonstrated by the COVID-19 outbreak, vaccine development can be a costly, time consuming endeavor that is outpaced by fast-spreading infections. There is therefore a great need for the development of new vaccine production platform technologies that can be modularly adapted to any new infectious agent. This need is also apparent for older infectious agents that mutate so rapidly that new vaccines are needed every year, as is the case for flu. Furthermore, we need improved technologies that generate vaccines that more closely mimic the physicochemical state of the intact virus, which is often vesicular in nature.

Consequently, there is a pressing need to develop new vaccines as well as new approaches to combatting infectious diseases. Leading SARS-CoV-2 vaccine candidates target a single protein, spike, but it is unclear whether immunity to this one protein can prevent SARS-CoV-2 infection and disease.

Exosomes are small extracellular vesicles (sEVs) of ~30-15 nm diameter that are made by all cells, abundant in all biofluids, and mediate intercellular transmission of signals and macromolecules, including RNAs.

Herein, the present inventors describe the development of mRNA-loaded exosomes, demonstrate that they can mediate the functional expression of heterologous proteins in vitro and in vivo, and have fewer adverse effects than comparable doses of lipid nanoparticles. Furthermore, the present inventors applied this approach to the development of an exosome-based, multiplexed mRNA vaccine that drives expression of the SARS-CoV-2 nucleocapsid and spike proteins. This vaccine elicited long-lasting cellular and humoral responses to nucleocapsid and to spike, demonstrating that exosome-based mRNA formulations represent a previously unexplored platform in the fight against COVID-19 and other infectious diseases. In particular, the present inventors describe herein a different and innovative approach to expression-dependent SARS-CoV-2 vaccination that combines the advantages of exosome-based mRNA delivery, multiplexed mRNA formulation, induction of immunity to both the spike and nucleocapsid proteins, and antigen design that involves expressing the nucleocapsid protein in a form designed for improved antigen presentation, with the ability of certain fusion proteins to elicit potent immune reactions through targeting of Class I and Class II antigen presentation pathways.

SUMMARY OF THE INVENTION

The present invention provides exosome-based vaccine platforms as disclosed herein to overcome the aforementioned limitations of the conventional vaccine strategies. The exosome-based vaccines according to the present invention combine the improved protection that comes from immunizing individuals with, e.g., multiple surface and cytoplasmic antigens, the hallmark of killed virus vaccines, with the superior safety profile of virus-free, recombinant antigen vaccines. In addition, the presently disclosed exosome-based vaccines are designed to elicit strong humoral and cellular immune responses due to the simultaneous expression of antigens in their native state and as exosome-associated antigens.

The present invention provides, in a first aspect, an extracellular vesicle (EV)-based nucleic acid composition, or an EV-based formulation, or an EV-based complex, comprising an extracellular vesicle (EV), or a plurality of EVs, loaded with, or combined with, one or more polynucleotides each having an open reading frame (ORF) encoding a protein of interest (POI). In some embodiments, the one or more polynucleotide are messenger RNAs (mRNAs). In some embodiments, the EV-based nucleic acid composition, formulation or complex further comprises a chemical lipofection reagent. In some embodiments, the chemical lipofection reagent is a polycationic lipid. In some embodiments, the chemical lipofection reagent is an mRNA lipofection reagent, or an mRNA transfection reagent, e.g., Lipofectamine® MessengerMAX™, Lipofectamine® 2000, Lipofectamine® 3000.

In some embodiments of the present invention, the POI is an antigenic protein of interest (AOI) a prophylactic protection against an infectious disease. In some embodiments, the POI is a therapeutic protein of interest. In some embodiments, the EV-based nucleic acid composition, formulation or complex is an immune response stimulating composition, formulation or complex. In some embodiments, the EV-based nucleic acid composition, formulation, or complex, is an EV-based nucleic acid vaccine (EV-based NAV). In some embodiments, the AOI is configured, or designed, to elicit, or induce, a humoral immune response and/or a cellular immune response in an animal subject, such that the expression of the AOI in an animal subject elicits, or induces, a humoral immune response and/or a cellular immune response in the animal subject. In some embodiments, the animal subject is a mammal, e.g., a human. In some embodiments, the EV-based nucleic acid composition, formulation or complex, or the EV-based NAV, further comprises a physiologically acceptable excipient and/or adjuvant.

In some embodiments of the present invention, the expression of the AOI is in its native form, wherein the AOI corresponds to a polypeptide as it is encoded by an infectious agent's genome. In some embodiments, the AOI corresponds to a polypeptide as it is encoded by an infectious agent's genome.

In some embodiments of the present invention, the expression of the AOI is in its exosomal form (to, e.g., enhance loading of viral antigens on antigen-presenting EVs and/or on MHCs), wherein the AOI corresponds to a derivative of its native form that is fused, or linked, to an exosomal anchor protein. In some embodiments, the AOI comprises a polypeptide as it is encoded by an infectious agent's genome that is fused, or linked, to an exosomal anchor protein.

In some embodiments of the present invention, the expression of the AOI is in its cytoplasmic form (to, e.g., enhance proteasome-based MHC loading of viral antigens), wherein the AOI corresponds to its native form, or a derivative of its native form, that is expressed within the cytoplasm of a host cell. In some embodiments, the AOI corresponds to a derivative of a polypeptide as it is encoded by an infectious agent's genome that is expressed within the cytoplasm of a host cell.

In some embodiments of the present invention, the POI comprises a fusion protein comprising fragments of each of a plurality of antigenic peptides. In some embodiments, the fusion protein comprises fragments of one or more of SARS-Co-V-2 proteins S, N, M and E. In some embodiments, the fusion protein comprises the receptor binding domain (RBD) of S, the entire N protein, and soluble portions of the M and E proteins. In some embodiments, the fusion protein comprises the receptor binding domain (RBD) of S, and/or the entire N protein, and/or soluble portions of the M and/or E proteins. In some embodiments, the S protein is Wuhan-1 isolate of SARS-CoV-2 ($S^{W1}$). In some embodiments, the S protein is the Wuhan-1 strain S protein; a furin-blocked, trimer-stabilized form of the Wuhan-1 strain S protein; or the Wuhan-1 strain S protein with an amino acid change of D614G.

In some embodiments of the present invention, the fusion protein further comprises a transmembrane domain of, e.g., Lamp1.

In some embodiments of the present invention, the AOI in its native form, which corresponds to a polypeptide as it is encoded by an infectious agent's genome, is simultaneously expressed with the AOI in its exosomal form, which corresponds to a derivative of its native form that is fused, or linked, to an exosomal anchor protein. In some embodiments, the one or more polynucleotides encode a first AOI and a second AOI, wherein the first AOI corresponds to a polypeptide as it is encoded by an infectious agent's genome, and the second AOI corresponds to a derivative of a polypeptide as it is encoded by an infectious agent's genome that is fused, or linked, to an exosomal anchor protein.

In some embodiments of the present invention, the AOI in its exosomal form, which corresponds to a derivative of its native form that is fused, or linked, to an exosomal anchor protein, is simultaneously expressed with the AOI in its cytoplasmic form, which corresponds to a derivative of its native form that is expressed within the cytoplasm of a host cell. In some embodiments, the one or more polynucleotides encode a first AOI and a second AOI, wherein the first AOI corresponds to a derivative of a polypeptide as it is encoded by an infectious agent's genome that is fused, or linked, to an exosomal anchor protein, and the second AOI corresponds to a derivative of a polypeptide as it is encoded by an infectious agent's genome that is expressed in the cytoplasm of a host cell.

In some embodiments of the present invention, the AOI in its native form, which corresponds to a polypeptide as it is encoded by an infectious agent's genome, is simultaneously expressed with the AOI in its cytoplasmic form, which corresponds to a derivative of its native form that is expressed within the cytoplasm of a host cell. In some embodiments, the one or more polynucleotides encode a first AOI and a second AOI, wherein the first AOI corresponds to a polypeptide as it is encoded by an infectious agent's genome, and the second AOI corresponds to a derivative of a polypeptide as it is encoded by an infectious agent's genome that is expressed in the cytoplasm of a host cell.

In some embodiments of the present invention, the AOI in its native form, which corresponds to a polypeptide as it is encoded by an infectious agent's genome, is simultaneously expressed with the AOI in its exosomal form, which corresponds to a derivative of its native form that is fused, or linked, to an exosomal anchor protein, and with the AOI in its cytoplasmic form, which corresponds to a derivative of its native form that is expressed within the cytoplasm of a host cell. In some embodiments, the one or more polynucleotides encode a first AOI, a second AOI, and a third AOI, wherein the first AOI corresponds to a polypeptide as it is encoded by an infectious agent's genome, the second AOI corresponds to a derivative of a polypeptide as it is encoded by an infectious agent's genome that is fused, or linked, to an exosomal anchor protein, and the third AOI corresponds to a derivative of a polypeptide as it is encoded by an infectious agent's genome that is expressed in the cytoplasm of a host cell.

In some embodiments of the present invention, the AOI comprises the SARS-CoV-2 spike protein (the S protein) having the amino acid sequence according to SEQ ID NO:1 (Table 1), or a polypeptide having at least 90%, 91%, 92%, 93%, 94%, 95%, 96%, 97% 98%, or 99% amino acid sequence identity with SEQ ID NO:1. The term "S" as in "the SARS-CoV-2 spike protein (the S protein)" refers to the same protein as, or is synonymous with, the term "$S^{W1}$" as in "the full-length, functional form of S from the original Wuhan-1 isolate of SARS-CoV-2 ($S^{W1}$)" having the having the amino acid sequence according to SEQ ID NO:1.

In some embodiments of the present invention, the AOI comprises the SARS-CoV-2 nucleocapsid protein (the N protein) having the amino acid sequence according to SEQ ID NO:2 (Table 1), which is expected to be expressed in the cytoplasm of the expressing cell, or a polypeptide having at least 90%, 91%, 92%, 93%, 94%, 95%, 96%, 97%. 98%, or 99% amino acid sequence identity with SEQ ID NO:2.

In some embodiments of the present invention, the AOI comprises the Lamp-S(ECD)-Lamp protein (the LSL protein) having the amino acid sequence according to SEQ ID NO:3 (Table 1), which is expected to be localized to endosomes, lysosomes, and/or exosomes, or a polypeptide having at least 90%, 91%, 92%, 93%, 94%, 95%, 96%, 97% 98%, or 99% amino acid sequence identity with SEQ ID NO:3.

In some embodiments of the present invention, the AOI comprises the Lamp-N-Lamp protein (the LNL protein) having the amino acid sequence according to SEQ ID NO:4 (Table 1), which is expected to be localized to endosomes, lysosomes, and/or exosomes, or a polypeptide having at least 90%, 91%, 92%, 93%, 94%, 95%, 96%, 97% 98%, or 99% amino acid sequence identity with SEQ ID NO:4.

In some embodiments of the present invention, the AOI comprises the SARS-CoV-2 membrane protein (the M protein) having the amino acid sequence according to SEQ ID NO:5 (Table 1), which is expected to bud from cells in EVs, or a polypeptide having at least 90%, 91%, 92%, 93%, 94%, 95%, 96%, 97%, 98%, or 99% amino acid sequence identity with SEQ ID NO:5.

In some embodiments of the present invention, the AOI comprises the SARS-CoV-2 envelope protein (the E protein) having the amino acid sequence according to SEQ ID NO:6 (Table 1), which is expected to bud from cells in EVs, or a polypeptide having at least 90%, 91%, 92%, 93%, 94%, 95%, 96%, 97% 98%, or 99% amino acid sequence identity with SEQ ID NO:6.

In some embodiments of the present invention, the AOI comprises the FKBPDD-S(ECD) protein (the ddS protein) having the amino acid sequence according to SEQ ID NO:7 (Table 1), or a polypeptide having at least 90%, 91%, 92%, 93%, 94%, 95%, 96%, 97% 98%, or 99% amino acid sequence identity with SEQ ID NO:7.

In some embodiments of the present invention, the AOI comprises the FKBPDD-N protein (the ddN protein) having the amino acid sequence according to SEQ ID NO:8 (Table 1), which is expected to be processed by the proteasome for loading on Class I WIC, or a polypeptide having at least 90%, 91%, 92%, 93%, 94%, 95%, 96%, 97% 98%, or 99% amino acid sequence identity with SEQ ID NO:8.

In some embodiments of the present invention, the AOI comprises the $S_{RBD}$NME protein having the amino acid sequence according to SEQ ID NO:9 (Table 1), which is expected to bud from cells in EVs, or a polypeptide having at least 90%, 91%, 92%, 93%, 5 94%, 95%, 96%, 97% 98%, or 99% amino acid sequence identity with SEQ ID NO:9.

In some embodiments of the present invention, the AOI comprises the L-$S_{RBD}$NME-L protein having the amino acid sequence according to SEQ ID NO:10 (Table 1), which is expected to be localized to endosomes, lysosomes, and/or exosomes, or a polypeptide having at least 90%, 91%, 92%, 93%, 94%, 95%, 96%, 97% 98%, or 99% amino acid sequence identity with SEQ ID NO:10.

The term "L-$S_{RBD}$NME-L" as in "the L-$S_{RBD}$NME-L protein" refers to the same protein as, or is synonymous with, the term "LSNME" as in "a multi-antigen membrane protein, LSNME, comprised of the receptor binding domain (RBD) of S, the entire N protein, and soluble portions of the M and E proteins, all expressed within the extracellular domain of the human Lamp1 protein" having the having the amino acid sequence according to SEQ ID NO:10.

In some embodiments of the present invention, the AOI comprises the surface glycoprotein of SARS-CoV-2 with the amino acid sequence according to NCBI Sequence Reference Sequence YP_009724390.1. In some embodiments, the AOI comprises at least 90%, 91%, 92%, 93%, 94%, 95%, 96%, 97% 98%, or 99% identity with the amino acid sequence according to NCBI Sequence Reference Sequence YP_009724390.1.

In some embodiments of the present invention, the AOI comprises the nucleocapsid phosphoprotein of SARS-CoV-2 with the amino acid sequence according to NCBI Sequence Reference Sequence YP_009724397.2. In some embodiments, the AOI comprises at least 90%, 91%, 92%, 93%, 94%, 95%, 96%, 97% 98%, or 99% identity with the amino acid sequence according to NCBI Sequence Reference Sequence YP_009724397.2.

In some embodiments of the present invention, the AOI comprises the membrane glycoprotein of SARS-CoV-2 with the amino acid sequence according to NCBI Sequence Reference Sequence YP_009724393.1. In some embodiments, the AOI comprises at least 90%, 91%, 92%, 93%, 94%, 95%, 96%, 97% 98%, or 99% identity with the amino acid sequence according to NCBI Sequence Reference Sequence YP_009724393.1.

In some embodiments of the present invention, the AOI comprises the envelope protein of SARS-CoV-2 with the amino acid sequence according to NCBI Sequence Reference Sequence YP_009724392.1. In some embodiments, the AOI comprises at least 90%, 91%, 92%, 93%, 94%, 95%, 96%, 97% 98%, or 99% identity with the amino acid sequence according to NCBI Sequence Reference Sequence YP_009724392.1.

In some embodiments of the present invention, two or more of the AOIs are simultaneously expressed in the animal subject. In some embodiments, one or more of the AOIs which are expected to bud from cells in EVs are simultaneously expressed with one more of the AOIs which are expected to be expressed in the cytoplasm of the expressing cell, and/or optionally with one or more of the AOIs which are expected to be processed by the proteasome for loading on Class I MHC. In some embodiments, one or more of the AOIs which are expected to bud from cells in EVs are simultaneously expressed with one more of the AOIs which are expected to be localized to endosomes, lysosomes, and/or exosomes, and/or optionally with one or more of the AOIs which are expected to be processed by the proteasome for loading on Class I MHC. In some embodiments, one or more of the AOIs which are expected to be expressed in the cytoplasm of the expressing cell are simultaneously expressed with one more of the AOIs which are expected to be localized to endosomes, lysosomes, and/or exosomes, and/or optionally with one or more of the AOIs which are expected to be processed by the proteasome for loading on Class I MHC. In some embodiments, one or more of the AOIs which are expected to bud from cells in EVs are simultaneously expressed with one more of the AOIs which are expected to be expressed in the cytoplasm of the expressing cell, and with one more of the AOIs which are expected to be localized to endosomes, lysosomes, and/or exosomes, and/or optionally with one or more of the AOIs which are expected to be processed by the proteasome for loading on Class I MHC. In some embodiments, the S protein, the $S_{RBD}$NME protein, and the L-$S_{RBD}$NME-L protein are simultaneously expressed in the animal subject. In some embodiments, all four SARS-CoV-2 S, N, M and E proteins are expressed in the animal subject.

An illustrative embodiment according to present invention provides an EV-based composition (e.g., an EV-based NAV), comprising an EV (e.g., an exosome) loaded with, or combined with: (a) polynucleotides (in particular mRNAs) having ORFs encoding AOIs comprising a fusogenic viral surface protein in its native form (e.g., the S protein); (b) a cytoplasmic fusion protein (e.g., $S_{RBD}$NME protein); and (c) an exosomal fusion protein (e.g., the L-$S_{RBD}$NME-L protein or the L1-$S_{RBD}$NME-L1 protein that displays the $S_{RBD}$NME protein on the extracellular surface). In some embodiments, the $S_{RBD}$NME protein comprises: (i) the receptor-binding domain (RBD) of the S protein; (ii) the N protein; (iii) the soluble portion of the M protein; and (iv) the soluble portion of the E protein.

An illustrative embodiment according to the present invention provides an EV-based composition (e.g., an EV-based NAV), comprising an EV (e.g., an exosome) loaded with, or combined with, polynucleotides (e.g., mRNAs) having ORFs encoding AOIs comprising at least 90%, 91%, 92%, 93%, 94%, 95%, 96%, 97% 98%, or 99% identity with the amino acid sequences according to SEQ ID NOs:1, 9, and 10. The tripartite mRNA-based vaccine system according to these embodiments is designed to elicit balanced cellular, as well as humoral, immune responses. The modular design of such a tripartite mRNA-based vaccine system allows its rapid application to any pathogen, rapid testing, and rapid scale-up. Such a tripartite mRNA-based vaccine system is free of infectious virions, thereby enhancing its safety.

In some embodiments of the present invention, the M protein having the amino acid sequence according to SEQ ID NO:5, or a polypeptide having at least 90%, 91%, 92%, 93%, 94%, 95%, 96%, 97% 98%, or 99% amino acid sequence identity with SEQ ID NO:5, is configured, or designed, to be simultaneously expressed with the E protein having the amino acid sequence according to SEQ ID NO:6, or a polypeptide having at least 90%, 91%, 92%, 93%, 94%, 95%, 96%, 97% 98%, or 99% amino acid sequence identity with SEQ ID NO:6, with the N protein having the amino acid sequence according to SEQ ID NO: 2, or a polypeptide having at least 90%, 91%, 92%, 93%, 94%, 95%, 96%, 97% 98%, or 99% amino acid sequence identity with SEQ ID NO:2, and with the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO:1, in the animal subject.

In some embodiments of the present invention, the EV-based nucleic acid composition, formulation or complex, or the EV-based NAV, comprises one or more EVs each loaded with, or combined with, one or more polynucleotides, e.g., one or more mRNAs, encoding the M protein having the amino acid sequence according to SEQ ID NO:5, or a polypeptide having at least 90%, 91%, 92%, 93%, 94%, 95%, 96%, 97% 98%, or 99% amino acid sequence identity with SEQ ID NO:5, with one or more polynucleotides, e.g., one or more mRNAs, encoding the E protein having the amino acid sequence according to SEQ ID NO:6, or a polypeptide having at least 90%, 91%, 92%, 93%, 94%, 95%, 96%, 97% 98%, or 99% amino acid sequence identity with SEQ ID NO:6, with one or more polynucleotides, e.g., one or more mRNAs, encoding the N protein having the amino acid sequence according to SEQ ID NO:2, or a polypeptide having at least 90%, 91%, 92%, 93%, 94%, 95%, 96%, 97% 98%, or 99% amino acid sequence identity with SEQ ID NO:2, and with one or more polynucleotides, e.g., one or more mRNAs, encoding the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO:1.

In some embodiments of the present invention, the M protein having the amino acid sequence according to SEQ ID NO:5, or a polypeptide having at least 90%, 91%, 92%, 93%, 94%, 95%, 96%, 97% 98%, or 99% amino acid sequence identity with SEQ ID NO:5, is configured, or designed, to be simultaneously expressed with the E protein having the amino acid sequence according to SEQ ID NO:6, or a polypeptide having at least 90%, 91%, 92%, 93%, 94%, 95%, 96%, 97% 98%, or 99% amino acid sequence identity with SEQ ID NO:6, and/or with the N protein having the amino acid sequence according to SEQ ID NO:2, or a polypeptide having at least 90%, 91%, 92%, 93%, 94%, 95%, 96%, 97% 98%, or 99% identity with SEQ ID NO:2, and/or with the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO:1, in the animal subject.

In some embodiments of the present invention, the EV-based nucleic acid composition, formulation or complex, or the EV-based NAV, comprises one or more EVs each loaded with, or combined with, one or more polynucleotides, e.g., one or more mRNAs, encoding the M protein having the amino acid sequence according to SEQ ID NO:5, or a polypeptide having at least 90%, 91%, 92%, 93%, 94%, 95%, 96%, 97% 98%, or 99% amino acid sequence identity with SEQ ID NO:5, and/or with one or more polynucleotides, e.g., one or more mRNAs, encoding the E protein having the amino acid sequence according to SEQ ID NO:6, or a polypeptide having at least 90%, 91%, 92%, 93%, 94%, 95%, 96%, 97% 98%, or 99% amino acid sequence identity with SEQ ID NO:6, and/or with one or more polynucleotides, e.g., one or more mRNAs encoding the N protein having the amino acid sequence according to SEQ ID NO:2, or a polypeptide having at least 90%, 91%, 92%, 93%, 94%, 95%, 96%, 97% 98%, or 99% identity with SEQ ID NO:2, and/or with one or more polynucleotides, e.g., one or more mRNAs, encoding the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO:1.

In some embodiments of the present invention, the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO:1, and the $S_{RBD}$NME protein having the amino acid sequence according to SEQ ID NO:9, or a polypeptide having at least 90%, 91%, 92%, 93%, 94%, 95%, 96%, 97% 98%, or 99% amino acid sequence identity with SEQ ID NO:9, are configured, or designed, to be simultaneously expressed in the animal subject.

In some embodiments of the present invention, the EV-based nucleic acid composition, formulation or complex, or the EV-based NAV, comprises one or more EVs each loaded with, or combined with, one or more polynucleotides, e.g., one or more mRNAs, encoding the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO:1, and with one or more polynucleotides, e.g., one or more mRNAs, encoding the $S_{RBD}$NME protein having the amino acid sequence according to SEQ ID NO:9, or a polypeptide having at least 90%, 91%, 92%, 93%, 94%, 95%, 96%, 97% 98%, or 99% amino acid sequence identity with SEQ ID NO:9.

In some embodiments of the present invention, the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO:1, and the L-$S_{RBD}$NME-L protein having the amino acid sequence according to SEQ ID NO:10, or a polypeptide having at least 90%, 91%, 92%, 93%, 94%, 95%, 96%, 97% 98%, or 99% amino acid sequence identity with SEQ ID NO:10, are configured, or designed, to be simultaneously expressed in the animal subject.

In some embodiments of the present invention, the EV-based nucleic acid composition, formulation or complex, or the EV-based NAV, comprises one or more EVs each loaded with, or combined with, one or more polynucleotides, e.g., one or more mRNAs, encoding the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO:1, and with one or more polynucleotides, e.g., one or more mRNAs, encoding the L-$S_{RBD}$NME-L protein having the amino acid sequence according to SEQ ID NO:10, or a polypeptide having at least 90%, 91%, 92%, 93%, 94%, 95%, 96%, 97% 98%, or 99% amino acid sequence identity with SEQ ID NO:10.

In some embodiments of the present invention, the $S_{RBD}$NME protein having the amino acid sequence according to SEQ ID NO:9, or a polypeptide having at least 90%, 91%, 92%, 93%, 94%, 95%, 96%, 97% 98%, or 99% amino acid sequence identity with SEQ ID NO:9, and the L-$S_{RBD}$NME-L protein having the amino acid sequence according to SEQ ID NO:10, or a polypeptide having at least 90%, 91%, 92%, 93%, 94%, 95%, 96%, 97% 98%, or 99% amino acid sequence identity with SEQ ID NO:10, are configured, or designed, to be simultaneously expressed in a host cell, or in the animal subject.

In some embodiments of the present invention, the EV-based nucleic acid composition, formulation or complex, or the EV-based NAV, comprises one or more EVs each loaded with, or combined with, one or more polynucleotides, e.g., one or more mRNAs, encoding the $S_{RBD}$NME protein having the amino acid sequence according to SEQ ID NO:9, or a polypeptide having at least 90%, 91%, 92%, 93%, 94%, 95%, 96%, 97% 98%, or 99% amino acid sequence identity with SEQ ID NO:9, and with one or more polynucleotides, e.g., one or more mRNAs, encoding the L-$S_{RBD}$NME-L protein having the amino acid sequence according to SEQ ID NO:10, or a polypeptide having at least 90%, 91%, 92%, 93%, 94%, 95%, 96%, 97% 98%, or 99% amino acid sequence identity with SEQ ID NO:10.

In some embodiments of the present invention, the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO:1, the $S_{RBD}$NME protein having the amino acid sequence according to SEQ ID NO:9, or a polypeptide having at least 90%, 91%, 92%, 93%, 94%, 95%, 96%, 97% 98%, or 99% amino acid sequence identity with SEQ ID NO:9, and the L-$S_{RBD}$NME-L protein having the amino acid sequence according to SEQ ID NO:10, or a polypeptide having at least 90%, 91%, 92%, 93%, 94%, 95%, 96%, 97% 98%, or 99% amino acid sequence identity with SEQ ID NO:10, are configured, or designed, to be simultaneously expressed in the animal subject.

In some embodiments of the present invention, the EV-based nucleic acid composition, formulation or complex, or the EV-based NAV, comprises one or more EVs each loaded with, or combined with, one or more polynucleotides, e.g., one or more mRNAs, encoding the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO:1, with one or more polynucleotides, e.g., one or more mRNAs, encoding the $S_{RBD}$NME protein having the amino acid sequence according to SEQ ID NO:9, or a polypeptide having at least 90%, 91%, 92%, 93%, 94%, 95%, 96%, 97% 98%, or 99% amino acid sequence identity with SEQ ID NO:9, and with one or more polynucleotides, e.g., one or more mRNAs, encoding the L-$S_{RBD}$NME-L protein having the amino acid sequence according to SEQ ID NO:10, or a polypeptide having at least 90%, 91%, 92%, 93%, 94%, 95%, 96%, 97% 98%, or 99% amino acid sequence identity with SEQ ID NO:10.

In some embodiments of the present invention, the ORF corresponding to the S protein comprises a nucleotide sequence according to SEQ ID NO:11, or a nucleotide sequence having at least 90%, 91%, 92%, 93%, 94%, 95%, 96%, 97% 98%, or 99% nucleotide sequence identity with SEQ ID NO:11. In some embodiments, the ORF corresponding to the $S_{RBD}$NME protein comprises a nucleotide sequence according to SEQ ID NO:12, or a nucleotide sequence having at least 90%, 91%, 92%, 93%, 94%, 95%, 96%, 97% 98%, or 99% nucleotide sequence identity with SEQ ID NO:12. In some embodiments, the ORF corresponding to the L-$S_{RBD}$NME-L protein comprises a nucleotide sequence according to SEQ ID NO:13, or a nucleotide sequence having at least 90%, 91%, 92%, 93%, 94%, 95%, 96%, 97% 98%, or 99% nucleotide sequence identity with SEQ ID NO:13.

According to the present invention, the mRNA corresponds to the ORFs of the S gene, the N gene, the M gene, and/or the E gene of the genomic RNA of SARS-CoV-2, e.g., NCBI GenBank LC528233.1.

In some embodiments of the present invention, the exosomal anchor protein is a tetraspanin that is enriched in the membrane of an exosome. In some embodiments, the exosomal anchor protein is CD63, CD9, CD81, MfgE8, Lamp2b, Lamp1, ARRDC1, synthetic exosomal cargoes.

In some embodiments of the present invention, the extracellular vesicle is an exosome, microvesicle, exosome-like vesicle, ectosome, ectosome-like vesicle, exovesicle, or a small extracellular vesicles (sEV).

In some embodiments of the present invention, the extracellular vesicle is derived from 293F cells, cardiospheres, cardiosphere-derived cells (CDCs), activated-specialized tissue-effector cells (ASTECs), or mesenchymal stem cells (MSCs).

In some embodiments of the present invention, the polynucleotide is a synthetic polynucleotide. In some embodiments, the synthetic polynucleotide contains a codon-optimized ORF. In some embodiments, the synthetic polynucleotide contains an optimized three prime untranslated region (3'UTR), and/or an optimized five prime untranslated region (5'UTR), and/or a polyadenylated tail.

An illustrative embodiment of the present invention provides an EV-based composition (e.g., an EV-based NAV), comprising an EV (e.g., an exosome) derived from 293F cells, wherein the EV is loaded with, or combined with, one or more mRNAs (e.g., synthetic mRNAs) comprising ORFs according to SEQ ID Nos:11, 12, and 13. In some embodiments of this example, an EV is derived from CDCs or ASTECs.

Another illustrative embodiment of the present invention provides an exosome-based vaccination complex, comprising an exosome derived from 293F cells, wherein the exosome is loaded with, or combined with, one or more synthetic mRNA having an ORF encoding an antigenic polypeptide of interest encoding the S protein or glycoprotein of SARS-CoV-2, and further comprising a chemical lipofection reagent, such as mRNA MAX lipofectamine. In some embodiments of this example, the antigenic polypeptide of interest is fused to CD63. In some embodiments of this example, the antigenic polypeptide of interest is fused to Lamp (e.g., Lamp2b or Lamp1). In some embodiments of this example, an EV is derived from CDCs or ASTECs.

In some embodiments of the present invention, a plurality of EVs each comprise a plurality of polynucleotides, each polynucleotide having an ORF encoding a different POI.

The present invention provides a method of making an extracellular vesicle (EV)-based nucleic acid composition, formulation or complex, or an EV-based NAV, the method comprising loading the one or more polynucleotides each having an open reading frame (ORF) encoding a protein of interest (POI) according to of the present invention into one or more extracellular vesicles (EVs). In some embodiments, the polynucleotides are pre-mixed with a chemical lipofection reagent, e.g. a polycationic lipid. In some embodiments, the polynucleotides are purified prior to being pre-mixed with the chemical lipofection reagent, e.g. polycationic lipid.

The present invention provides a method of inducing, or eliciting, an antigen specific immune response in a subject, comprising administering the EV-based composition, formulation or complex, or the EV-based NAV, according to of the present invention to the subject in an effective amount to produce an antigen specific immune response. In some embodiments, the antigen specific immune response comprises a T cell response and/or a B cell response. In some embodiments, the method comprises a single administration of the EV-based composition.

The present invention provides a method of generating antibodies specific for an antigen of interest (AOI), comprising introducing into an animal the EV-based composition, formulation or complex, or the EV-based NAV, according to the present invention.

The present invention provides the EV-based composition, formulation or complex, or the EV-based NAV, according to of the present invention for use in a method of inducing an antigen specific immune response in a subject, the method comprising administering the EV-based composition, formulation or complex, or the EV-based NAV, to the subject in an effective amount to produce an antigen specific immune response. In some embodiments, the method further comprises administering a booster dose of the EV-based composition.

The present invention provides the use of the EV-based composition, formulation or complex, or the EV-based NAV, according to of the present invention in the manufacture of a medicament for use in a method of inducing an antigen specific immune response in a subject, the method comprising administering the EV-based composition to the subject in an effective amount to produce an antigen specific immune response.

The present invention provides a method of preventing or treating a viral infection comprising administering to a subject the EV-based composition, formulation or complex, or the EV-based NAV, according to of the present invention. In some embodiments, the viral infection is influenza viral infection, coronavirus infection, or SARS-CoV-2 infection.

According to the present invention, immunity against pathogens can be induced by the functional delivery of nucleic acids that reprogram cells of the host to express virus-encoded antigens (e.g., DNA vaccines or mRNA vaccines). According to the present invention, sterilizing immunity and immune memory are generated by expressing viral antigens (a) in the cytoplasm (to enhance proteasome-based WIC-loading), and (b) on exosomes and in endosomes (to enhance loading on antigen-presenting EVs).

The present invention provides a method of creating, maintaining, or restoring antigenic memory to a viral strain in an individual or a population of individuals comprising administering to the individual or population a booster dose of the EV-based composition, formulation or complex, or the EV-based NAV, according to of the present invention. In some embodiments, the viral strain is SARS-CoV-2. In some embodiments, the EV-based composition, formulation or complex, or the EV-based NAV, is administered to the subject via a route selected from the group consisting of intramuscular administration, intradermal administration, and subcutaneous administration. In some embodiments, the administering step comprises contacting a muscle tissue of the subject with a device suitable for injection of the composition.

The present invention provides a method of making an EV-based composition, complex or formulation, or an EV-based NAV, comprising contacting a composition comprising EVs with polycationic lipids and one or more polynucleotides, each having the open reading frame (ORF) encoding the protein of interest (POI) according to of the present invention.

TABLE 1

| | |
|---|---|
| SEQ ID NO: 1 | MFVFLVLLPLVSSQCVNLTTRTQLPPAYTNSFTRGVYYPDKVFRSSVLHSTQDLFLPFFSNVTW<br>FHAIHVSGTNGTKRFDNPVLPFNDGVYFASTEKSNIIRGWIFGTTLDSKTQSLLIVNNATNVVIK<br>VCEFQFCNDPFLGVYYHKNNKSWMESEFRVYSSANNCTFEYVSQPFLMDLEGKQGNFKNLRE<br>FVFKNIDGYFKIYSKHTPINLVRDLPQGFSALEPLVDLPIGINITRFQTLLALHRSYLTPGDSSSG<br>WTAGAAAYYVGYLQPRTFLLKYNENGTITDAVDCALDPLSETKCTLKSFTVEKGIYQTSNFRV<br>QPTESIVRFPNITNLCPFGEVFNATRFASVYAWNRKRISNCVADYSVLYNSASFSTFKCYGVSPT<br>KLNDLCFTNVYADSFVIRGDEVRQIAPGQTGKIADYNYKLPDDFTGCVIAWNSNNLDSKVGG<br>NYNYLYRLFRKSNLKPFERDISTEIYQAGSTPCNGVEGFNCYFPLQSYGFQPTNGVGYQPYRV<br>VVLSFELLHAPATVCGPKKSTNLVKNKCVNFNFNGLTGTGVLTESNKKFLPFQQFGRDIADTT<br>DAVRDPQTLEILDITPCSFGGVSVITPGTNTSNQVAVLYQDVNCTEVPVAIHADQLTPTWRVYS<br>TGSNVFQTRAGCLIGAEHVNNSYECDIPIGAGICASYQTQTNSPRRARSVASQSIIAYTMSLGAE<br>NSVAYSNNSIAIPTNFTISVTTEILPVSMTKTSVDCTMYICGDSTECSNLLLQYGSFCTQLNRALT<br>GIAVEQDKNTQEVFAQVKQIYKTPPIKDFGGFNFSQILPDPSKPSKRSFIEDLLFNKVTLADAGFI<br>KQYGDCLGDIAARDLICAQKFNGLTVLPPLLTDEMIAQYTSALLAGTITSGWTFGAGAALQIPF<br>AMQMAYRFNGIGVTQNVLYENQKLIANQFNSAIGKIQDSLSSTASALGKLQDVVNQNAQALN<br>TLVKQLSSNFGAISSVLNDILSRLDKVEAEVQIDRLITGRLQSLQTYVTQQLIRAAEIRASANLA<br>ATKMSECVLGQSKRVDFCGKGYHLMSFPQSAPHGVVFLHVTYVPAQEKNFTTAPAICHDGKA<br>HFPREGVFVSNGTHWFVTQRNFYEPQIITTDNTFVSGNCDVVIGIVNNTVYDPLQPELDSFKEE<br>LDKYFKNHTSPDVDLGDISGINASVVNIQKEIDRLNEVAKNLNESLIDLQELGKYEQYIKWPW<br>YIWLGFIAGLIAIVMVTIMLCCMTSCCSCLKGCCSCGSCCKFDEDDSEPVLKGVKLHYT |
| SEQ ID NO: 2 | MGVQVETISPGDGRTFPKRGQTCVVHYTGMLEDGKKVDSSRDRNKPFKFMLGKQEVIRGWE<br>EGVAQMSVGQRAKLTISPDYAYGATGHPGIIPPHATLVFDVELLKPEGTQLPPAYTNSFTRGVY<br>YPDKVFRSSVLHSTQDLFLPFFSNVTWFHAIHVSGTNGTKRFDNPVLPFNDGVYFASTEKSNIIR<br>GWIFGTTLDSKTQSLLIVNNATNVVIKVCEFQFCNDPFLGVYYHKNNKSWMESEFRVYSSANN<br>CTFEYVSQPFLMDLEGKQGNFKNLREFVFKNIDGYFKIYSKHTPINLVRDLPQGFSALEPLVDL<br>PIGINITRFQTLLALHRSYLTPGDSSSGWTAGAAAYYVGYLQPRTFLLKYNENGTITDAVDCAL<br>DPLSETKCTLKSFTVEKGIYQTSNFRVQPTESIVRFPNITNLCPFGEVFNATRFASVYAWNRKRI<br>SNCVADYSVLYNSASFSTFKCYGVSPTKLNDLCFTNVYADSFVIRGDEVRQIAPGQTGKIADY<br>NYKLPDDFTGCVIAWNSNNLDSKVGGNYNYLYRLFRKSNLKPFERDISTEIYQAGSTPCNGVE<br>GFNCYFPLQSYGFQPTNGVGYQPYRVVVLSFELLHAPATVCGPKKSTNLVKNKCVNFNFNGL<br>TGTGVLTESNKKFLPFQQFGRDIADTTDAVRDPQTLEILDITPCSFGGVSVITPGTNTSNQVAVL<br>YQDVNCTEVPVAIHADQLTPTWRVYSTGSNVFQTRAGCLIGAEHVNNSYECDIPIGAGICASY<br>QTQTNSPRRARSVASQSIIAYTMSLGAENSVAYSNNSIAIPTNFTISVTTEILPVSMTKTSVDCTM<br>YICGDSTECSNLLLQYGSFCTQLNRALTGIAVEQDKNTQEVFAQVKQIYKTPPIKDFGGFNFSQI<br>LPDPSKPSKRSFIEDLLFNKVTLADAGFIKQYGDCLGDIAARDLICAQKFNGLTVLPPLLTDEMI<br>AQYTSALLAGTITSGWTFGAGAALQIPFAMQMAYRFNGIGVTQNVLYENQKLIANQFNSAIGK<br>IQDSLSSTASALGKLQDVVNQNAQALNTLVKQLSSNFGAISSVLNDILSRLDKVEAEVQIDRLIT<br>GRLQSLQTYVTQQLIRAAEIRASANLAATKMSECVLGQSKRVDFCGKGYHLMSFPQSAPHGV<br>VFLHVTYVPAQEKNFTTAPAICHDGKAHFPREGVFVSNGTHWFVTQRNFYEPQIITTDNTFVSG |

TABLE 1-continued

| | |
|---|---|
| | NCDVVIGIVNNTVYDPLQPELDSFKEELDKYFKNHTSPDVDLGDISGINASVVNIQKEIDRLNE<br>VAKNLNESLIDLQELGKLE |
| SEQ<br>ID<br>NO: 3 | MAAPGSARRPLLLLLLLLLGLMHCASAAMFMVKNGNGTACIMANFSAAFSVNYDTKSGPK<br>NMTFDLPSDATVVLNRSSCGKENTSDPSLVIAFGRGHTLTLNFTRNATRYSVQLMSFVYNLSD<br>THLFPNASSKEIKTVESITDIRADIDKKYRCVSGTQVHMNNVTVTLHDATIQAYLSNSSFSRGET<br>RCEQDRPSPTTAPPAPPSPSPSPVPKSPSVDKYNVSGTNGTCLLASMGLQLNLTYERKDNTTVT<br>RLLNINPNKTSASGSCGAHLVTLELHSEGTTVLLPFQFGMNASSSRFFLQGIQLNTILPDARDPAF<br>KAANGSLRALQATVGNSYKCNAEEHVRVTKAFSVNIFKVWVQAFKVEGGQFGSGTQLPPAY<br>TNSFTRGVYYPDKVFRSSVLHSTQDLFLPFFSNVTWFHAIHVSGTNGTKRFDNPVLPFNDGVYF<br>ASTEKSNIIRGWIFGTTLDSKTQSLLIVNNATNVVIKVCEFQFCNDPFLGVYYHKNNKSWMESE<br>FRVYSSANNCTFEYVSQPFLMDLEGKQGNFKNLREFVFKNIDGYFKIYSKHTPINLVRDLPQGF<br>SALEPL VDLPIGINITRFQTLLALHRSYLTPGDSSSGWTAGAAAYYVGYLQPRTFLLKYNENGTI<br>TDAVDCALDPLSETKCTLKSFTVEKGIYQTSNFRVQPTESIVRFPNITNLCPFGEVFNATRFASV<br>YAWNRKRISNCVADYSVLYNSASFSTFKCYGVSPTKLNDLCFTNVYADSFVIRGDEVRQIAPG<br>QTGKIADYNYKLPDDFTGCVIAWNSNNLDSKVGGNYNYLRFFKSNLKPFERDISTEIYQAG<br>STPCNGVEGFNCYFPLQSYGFQPTNGVGYQPYRVVVLSFELLHAPATVCGPKKSTNLVKNKC<br>VNFNFNGLTGTGVLTESNKKFLPFQQFGRDIADTTDAVRDPQTLEILDITPCSFGGVSVITPGTN<br>TSNQVAVLYQDVNCTEVPVAIHADQLTPTWRVYSTGSNVFQTRAGCLIGAEHVNNSYECDIPI<br>GAGICASYQTQTNSPRRARSVASQSIIAYTMSLGAENSVAYSNNSIAIPTNFTISVTTEILPVSMT<br>KTSVDCTMYICGDSTECSNLLLQYGSFCTQLNRALTGIAVEQDKNTQEVFAQVKQIYKTPPIKD<br>FGGFNFSQILPDPSKPSKRSFIEDLLFNKVTLADAGFIKQYGDCLGDIAARDLICAQKFNGLTVL<br>PPLLTDEMIAQYTSALLAGTITSGWTFGAGAALQIPFAMQMAYRFNGIGVTQNVLYENQKLIA<br>NQFNSAIGKIQDSLSSTASALGKLQDVVNQNAQALNTLVKQLSSNFGAISSVLNDILSRLDKVE<br>AEVQIDRLITGRLQSLQTYVTQQLIRAAEIRASANLAATKMSECVLGQSKRVDFCGKGYHLMS<br>FPQSAPHGVVFLHVTYVPAQEKNFTTAPAICHDGKAHFPREGVFVSNGTHWFVTQRNFYEPQII<br>TTDNTFVSGNCDVVIGIVNNTVYDPLQPELDSFKEELDKYFKNHTSPDVDLGDISGINASVVNI<br>QKEIDRLNEVAKNLNESLIDLQELGKLEGSVEECLLDENSMLIPIAVGGALAGLVLIVLIAYLVG<br>RKRSHAGYQTI |
| SEQ<br>ID<br>NO: 4 | MAAPGSARRPLLLLLLLLLGLMHCASAAMFMVKNGNGTACIMANFSAAFSVNYDTKSGPK<br>NMTFDLPSDATVVLNRSSCGKENTSDPSLVIAFGRGHTLTLNFTRNATRYSVQLMSFVYNLSD<br>THLFPNASSKEIKTVESITDIRADIDKKYRCVSGTQVHMNNVTVTLHDATIQAYLSNSSFSRGET<br>RCEQDRPSPTTAPPAPPSPSPSPVPKSPSVDKYNVSGTNGTCLLASMGLQLNLTYERKDNTTVT<br>RLLNINPNKTSASGSCGAHLVTLELHSEGTTVLLPFQFGMNASSSRFFLQGIQLNTILPDARDPAF<br>KAANGSLRALQATVGNSYKCNAEEHVRVTKAFSVNIFKVWVQAFKVEGGQFGSGTSDNGPQ<br>NQRNAPRITFGGPSDSTGSNQNGERSGARSKQRRPQGLPNNTASWFTALTQHGKEDLKFPRGQ<br>GVPINTNSSPDDQIGYYRRATRRIRGGDGKMKDLSPRWYFYYLGTGPEAGLPYGANKDGIIWV<br>ATEGALNTPKDHIGTRNPANNAAIVLQLPQGTTLPKGFYAEGSRGGSQASSRSSSRSRNSSRNS<br>TPGSSRGTSPARMAGNGGDAALALLLLDRLNQLESKMSGKGQQQQGQTVTKKSAAEASKKP<br>RQKRTATKAYNVTQAFGRRGPEQTQGNFGDQELIRQGTDYKHWPQIAQFAPSASAFFGMSRI<br>GMEVTPSGTWLTYTGAIKLDDKDPNFKDQVILLNKHIDAYKTFPPTEPKKDKKKKADETQALP<br>QRQKKQQTVTLLPAADLDDFSKQLQQSMSSADSTQALEGSVEECLLDENSMLIPIAVGGALAG<br>LVLIVLIAYLVGRKRSHAGYQTI |
| SEQ<br>ID<br>NO: 5 | MADSNGTITVEELKKLLEQWNLVIGFLFLTWICLLQFAYANRNRFLYIIKLIFLWLLWPVTLAC<br>FVLAAVYRINWITGGIAIAMACLVGLMWLSYFIASFRLFARTRSMWSFNPETNILLNVPLHGTI<br>LTRPLLESELVIGAVILRGHLRIAGHHLGRCDIKDLPKEITVATSRTLSYYKLGASQRVAGDSGF<br>AAYSRYRIGNYKLNTDHSSSSDNIALLVQ |
| SEQ<br>ID<br>NO: 6 | MYSFVSEETGTLIVNSVLLFLAFVVFLLVTLAILTALRLCAYCCNIVNVSLVKPSFYVYSRVKN<br>LNSSRVPDLLV |
| SEQ<br>ID<br>NO: 7 | MGVQVETISPGDGRTFPKRGQTCVVHYTGMLEDGKKVDSSRDRNKPFKFMLGKQEVIRGWE<br>EGVAQMSVGQRAKLTISPDYAYGATGHPGIIPPHATLVFDVELLKPEGTQLPPAYTNSFTRGVY<br>YPDKVFRSSVLHSTQDLFLPFFSNVTWFHAIHVSGTNGTKRFDNPVLPFNDGVYFASTEKSNIIR<br>GWIFGTTLDSKTQSLLIVNNATNVVIKVCEFQFCNDPFLGVYYHKNNKSWMESEFRVYSSANN<br>CTFEYVSQPFLMDLEGKQGNFKNLREFVFKNIDGYFKIYSKHTPINLVRDLPQGFSALEPLVDL<br>PIGINITRFQTLLALHRSYLTPGDSSSGWTAGAAAYYVGYLQPRTFLLKYNENGTITDAVDCAL<br>DPLSETKCTLKSFTVEKGIYQTSNFRVQPTESIVRFPNITNLCPFGEVFNATRFASVYAWNRKRI<br>SNCVADYSVLYNSASFSTFKCYGVSPTKLNDLCFTNVYADSFVIRGDEVRQIAPGQTGKIADY<br>NYKLPDDFTGCVIAWNSNNLDSKVGGNYNYLRLFRKSNLKPFERDISTEIYQAGSTPCNGVE<br>GFNCYFPLQSYGFQPTNGVGYQPYRVVVLSFELLHAPATVCGPKKSTNLVKNKCVNFNFNGL<br>TGTGVLTESNKKFLPFQQFGRDIADTTDAVRDPQTLEILDITPCSFGGVSVITPGTNTSNQVAVL<br>YQDVNCTEVPVAIHADQLTPTWRVYSTGSNVFQTRAGCLIGAEHVNNSYECDIPIGAGICASY<br>QTQTNSPRRARSVASQSIIAYTMSLGAENSVAYSNNSIAIPTNFTISVTTEILPVSMTKTSVDCTM<br>YICGDSTECSNLLLQYGSFCTQLNRALTGIAVEQDKNTQEVFAQVKQIYKTPPIKDFGGFNFSQI<br>LPDPSKPSKRSFIEDLLFNKVTLADAGFIKQYGDCLGDIAARDLICAQKFNGLTVLPPLLTDEMI<br>AQYTSALLAGTITSGWTFGAGAALQIPFAMQMAYRFNGIGVTQNVLYENQKLIANQFNSAIGK<br>IQDSLSSTASALGKLQDVVNQNAQALNTLVKQLSSNFGAISSVLNDILSRLDKVEAEVQIDRLIT<br>GRLQSLQTYVTQQLIRAAEIRASANLAATKMSECVLGQSKRVDFCGKGYHLMSFPQSAPHGV<br>VFLHVTYVPAQEKNFTTAPAICHDGKAHFPREGVFVSNGTHWFVTQRNFYEPQIITTDNTFVSG<br>NCDVVIGIVNNTVYDPLQPELDSFKEELDKYFKNHTSPDVDLGDISGINASVVNIQKEIDRLNE<br>VAKNLNESLIDLQELGK |
| SEQ<br>ID<br>NO: 8 | MGVQVETISPGDGRTFPKRGQTCVVHYTGMLEDGKKVDSSRDRNKPFKFMLGKQEVIRGWE<br>EGVAQMSVGQRAKLTISPDYAYGATGHPGIIPPHATLVFDVELLKPEGTMSDNGPQNQRNAPR<br>ITFGGPSDSTGSNQNGERSGARSKQRRPQGLPNNTASWFTALTQHGKEDLKFPRGQGVPINTN<br>SSPDDQIGYYRRATRRIRGGDGKMKDLSPRWYFYYLGTGPEAGLPYGANKDGIIWVATEGAL |

TABLE 1-continued

| | |
|---|---|
| | NTPKDHIGTRNPANNAAIVLQLPQGTTLPKGFYAEGSRGGSQASSRSSSRSRNSSRNSTPGSSRG<br>TSPARMAGNGGDAALALLLLDRLNQLESKMSGKGQQQQGQTVTKKSAAEASKKPRQKRTAT<br>KAYNVTQAFGRRGPEQTQGNFGDQELIRQGTDYKHWPQIAQFAPSASAFFGMSRIGMEVTPSG<br>TWLTYTGAIKLDDKDPNFKDQVILLNKHIDAYKTFPPTEPKKDKKKKADETQALPQRQKKQQ<br>TVTLLPAADLDDFSKQLQQSMSSADSTQA |
| SEQ ID NO: 9 | MNITNLCPFGEVFNATRFASVYAWNRKRISNCVADYSVLYNSASFSTFKCYGVSPTKLNDLCF<br>TNVYADSFVIRGDEVRQIAPGQTGKIADYNYKLPDDFTGCVIAWNSNNLDSKVGGNYNYLYR<br>LFRKSNLKPFERDISTEIYQAGSTPCNGVEGFNCYFPLQSYGFQPTNGVGYQPYRVVVLSFELL<br>HAPATVSDNGPQNQRNAPRITFGGPSDSTGSNQNGERSGARSKQRRPQGLPNNTASWFTALTQ<br>HGKEDLKFPRGQGVPINTNSSPDDQIGYYRRATRRIRGGDGKMKDLSPRWYFYYLGTGPEAG<br>LPYGANKDGIIWVATEGALNTPKDHIGTRNPANNAAIVLQLPQGTTLPKGFYAEGSRGGSQAS<br>SRSSSRSRNSSRNSTPGSSRGTSPARMAGNGGDAALALLLLDRLNQLESKMSGKGQQQQGQT<br>VTKKSAAEASKKPRQKRTATKAYNVTQAFGRRGPEQTQGNFGDQELIRQGTDYKHWPQIAQF<br>APSASAFFGMSRIGMEVTPSGTWLTYTGAIKLDDKDPNFKDQVILLNKHIDAYKTFPPTEPKKD<br>KKKKADETQALPQRQKKQQTVTLLPAADLDDFSKQLQQSMSSADSTQAADSNGTITVEELKK<br>LLEQRLFARTRSMWSFNPETNILLNVPLHGTILTRPLLESELVIGAVILRGHLRIAGHHLGRCDIK<br>DLPKEITVATSRTLSYYKLGASQRVAGDSGFAAYSRYRIGNYKLNTDHSSSSDNIALLVQMYSF<br>VSEETGTLIVNSRLCAYCCNIVNVSLVKPSFYVYSRVKNLNSSRVPDLLVLE |
| SEQ ID NO: 10 | MAAPGSARRPLLLLLLLLLGLMHCASAAMFMVKNGNGTACIMANFSAAFSVNYDTKSGPK<br>NMTFDLPSDATVVLNRSSCGKENTSDPSLVIAFGRGHTLTLNFTRNATRYSVQLMSFVYNLSD<br>THLFPNASSKEIKTVESITDIRADIDKKYRCVSGTQVHMNNVTVTLHDATIQAYLSNSSFSRGET<br>RCEQDRPSPTTAPPAPPSPSPSPVPKSPSVDKYNVSGTNGTCLLASMGLQLNLTYERKDNTTVT<br>RLLNINPNKTSASGSCGAHLVTLELHSEGTTVLLFQFGMNASSSRFFLQGIQLNTILPDARDPAF<br>KAANGSLRALQATVGNSYKCNAEEHVRVTKAFSVNIFKVWVQAFKVEGGQFGSGTMNITNL<br>CPFGEVFNATRFASVYAWNRKRISNCVADYSVLYNSASFSTFKCYGVSPTKLNDLCFTNVYAD<br>SFVIRGDEVRQIAPGQTGKIADYNYKLPDDFTGCVIAWNSNNLDSKVGGNYNYLYRLFRKSNL<br>KPFERDISTEIYQAGSTPCNGVEGFNCYFPLQSYGFQPTNGVGYQPYRVVVLSFELLHAPATVS<br>DNGPQNQRNAPRITFGGPSDSTGSNQNGERSGARSKQRRPQGLPNNTASWFTALTQHGKEDL<br>KFPRGQGVPINTNSSPDDQIGYYRRATRRIRGGDGKMKDLSPRWYFYYLGTGPEAGLPYGAN<br>KDGIIWVATEGALNTPKDHIGTRNPANNAAIVLQLPQGTTLPKGFYAEGSRGGSQASSRSSSRS<br>RNSSRNSTPGSSRGTSPARMAGNGGDAALALLLLDRLNQLESKMSGKGQQQQGQTVTKKSA<br>AEASKKPRQKRTATKAYNVTQAFGRRGPEQTQGNFGDQELIRQGTDYKHWPQIAQFAPSASA<br>FFGMSRIGMEVTPSGTWLTYTGAIKLDDKDPNFKDQVILLNKHIDAYKTFPPTEPKKDKKKA<br>DETQALPQRQKKQQTVTLLPAADLDDFSKQLQQSMSSADSTQAADSNGTITVEELKKLLEQRL<br>FARTRSMWSFNPETNILLNVPLHGTILTRPLLESELVIGAVILRGHLRIAGHHLGRCDIKDLPKEI<br>TVATSRTLSYYKLGASQRVAGDSGFAAYSRYRIGNYKLNTDHSSSSDNIALLVQMYSFVSEET<br>GTLIVNSRLCAYCCNIVNVSLVKPSFYVYSRVKNLNSSRVPDLLVLEGSVEECLLDENSMLIPIA<br>VGGALAGLVLIVLIAYLVGRKRSHAGYQTI |
| SEQ ID NO: 11 | ggtaccATGTTTGTTTTTCTTGTTTTATTGCCACTAGTCTCTAGTCAGTGTGTTAATCTTACAAC<br>CAGAACTCAATTACCCCCTGCATACACTAATTCTTTCACACGTGGTGTTTATTACCCTGACA<br>AAGTTTTCAGATCCTCAGTTTTACATTCAACTCAGGACTTGTTCTTACCTTTCTTTTCCAAT<br>GTTACTTGGTTCCATGCTATACATGTCTCTGGGACCAATGGTACTAAGAGGTTTGATAACC<br>CTGTCTCTACCATTTAATGATGGTGTTTATTTTGCTTCCACTGAGAAGTCTAACATAATAAGA<br>GGCTGGATTTTTGGTACTACTTTAGATTCGAAGACCCAGTCCCTACTTATTGTTAATAACGC<br>TACTAATGTTGTTATTAAAGTCTGTGAATTTCAATTTTGTAATGATCCATTTTTGGGTGTTT<br>ATTACCACAAAACAACAAAAGTTGGATGGAAAGTGAGTTCAGAGTTTATTCTAGTGCGA<br>ATAATTGCACTTTTGAATATGTCTCTCAGCCTTTTCTTATGGACCTTGAAGGAAAACAGGG<br>TAATTTCAAAAATCTTAGGGAATTTGTGTTTAAGAATATTGATGGTTATTTTAAAATATATT<br>CTAAGCACACGCCTATTAATTTAGTGCGTGATCTCCCTCAGGGTTTTTCGGCTTTAGAACC<br>ATTGGTAGATTTGCCAATAGGTATTAACATCACTAGGTTTCAAACTTTACTTGCTTTACATA<br>GAAGTTATTTGACTCCTGGTGATTCTTCTTCAGGTTGGACGGCTGGTGCTGCAGCTTATTAT<br>GTGGGTTATCTTCAACCTAGGACTTTTCTATTAAAATATAATGAAAATGGAACCATTACAG<br>ATGCTGTAGACTGTGCACTTGACCCTCTCTCAGAAACAAAGTGTACGTTGAAATCCTTCAC<br>TGTAGAAAAGGAATCTATCAAACTTCTAACTTTAGAGTCCAACCAACAGAATCTATTGTT<br>AGATTTCCTAATATTACAAACTTGTGCCCTTTTGGTGAAGTTTTTAACGCCACCAGATTTGC<br>ATCTGTTTATGCTTGGAACAGGAAGAGAATCAGCAACTGTGTTGCTGATTATTCTGTCCTA<br>TATAATTCCGCATCATTTTCCACTTTTAAGTGTTATGGAGTGTCTCCTACTAAATTAAATGA<br>TCTCTGCTTTACTAATGTCTATGCAGATTCATTTGTAATTAGAGGTGATGAAGTCAGACAA<br>ATCGCTCCAGGGCAAACTGGAAAGATTGCTGATTATAATTATAAATTACCAGATGATTTA<br>CAGGCTGCGTTATAGCTTGGAATTCTAACAATCTTGATTCTAAGGTTGGTGGTAATTATAA<br>TTACCTGTATAGATTGTTTAGGAAGTCTAATCTCAAACCTTTTGAGAGAGATATTTCAACT<br>GAAATCTATCAGGCCGGTAGCACACCTTGTAATGGTGTTGAAGGTTTTAATTGTTACTTTC<br>CTTTACAATCATATGGTTTCCAACCCACTAATGGTGTTGGTTACCAACCATACAGAGTAGT<br>AGTACTTTCTTTTGAACTTCTACATGCACCAGCAACTGTTTGTGGACCTAAAAAGTCTACT<br>AATTTGGTTAAAAACAAATGTGTCAATTTCAACTTCAATGGTTTAACAGGCACAGGTGTTC<br>TTACTGAGTCTAACAAAAGTTTCTGCCTTTCCAACAATTTGGCAGAGACATTGCTGACAC<br>TACTGATGCTGTCCGTGATCCACAGACACTTGAGATTCTTGACATTACACCATGTTCTTTTG<br>GTGGTGTCAGTGTTATAACACCAGGAACAAATACTTCTAACCAGGTTGCTGTTCTTTATCA<br>GGATGTTAACTGCACAGAAGTCCCTGTTGCTATTCATGCAGATCAACTTACTCCTACTTGG<br>CGTGTTTATTCTACAGGTTCTAATGTTTTCAAACACGTGCAGGCTGTTTAATAGGGGCTG<br>AACATGTCAACAACTCATATGAGTGTGACATACCCATTGGTGCAGGTATATGCGCTAGTTA<br>TCAGACTCAGACTAATTCTCCTCGGCGGGCACGTAGTGTAGCTGTAGTCAATCATCATTGCC<br>TACACTATGTCACTTGGTGCAGAAAATTCAGTTGCTTACTCTAATAACTCTATTGCCATACC<br>CACAAATTTTACTATTAGTGTTACCACAGAAATTCTACCAGTGTCTATGACCAAGACATCA<br>GTAGATTGTACAATGTACATTTGTGGTGATTCAACTGAATGCAGCAATCTTTTGTTGCAAT<br>ATGGCAGTTTTTGTACACAATTAAACCGTGCTTTAACTGGAATAGCTGTTGAACAAGACAA<br>AAACACCCAAGAAGTTTTTGCACAAGTCAAACAAATTTACAAAACACCACCAATTAAAGA |

TABLE 1-continued

|  |  |
|---|---|
|  | TTTTGGTGGTTTTAATTTTTCACAAATATTACCAGATCCATCAAAACCAAGCAAGAGGTCA<br>TTTATTGAgGATCTACTTTTCAACAAAGTGACACTTGCAGATGCTGGCTTCATCAAACAAT<br>ATGGTGATTGCCTTGGTGATATTGCTGCTAGAGACCTCATTTGTGCACAAAAGTTTAACGG<br>CCTTACTGTTTTGCCACCTTTGCTCACAGATGAAATGATTGCTCAATACACTTCTGCACTGT<br>TAGCGGGTACAATCACTTCTGGTTGGACCTTTGGTGCAGGTGCTGCATTACAAATACCATT<br>TGCTATGCAAATGGCTTATAGGTTTAATGGTATTGGAGTTACACAGAATGTTCTCTATGAG<br>AACCAAAAATTGATTGCCAACCAATTTAATAGTGCTATTGGCAAAATTCAAGACTCACTTT<br>CTTCCACAGCAAGTGCACTTGGAAAACTTCAAGATGTGGTCAACCAAAATGCACAAGCTT<br>TAAACACGCTTGTTAAACAACTTAGCTCCAATTTTGGTGCAATTTCAAGTGTTTTAAATGA<br>TATCCTTTCACGTCTTGACAAAGTTGAGGCTGAAGTGCAAATTGATAGGTTGATCACAGGC<br>AGACTTCAAAGTTTGCAGACATATGTGACTCAACAATTAATTAGAGCTGCAGAAATCAGA<br>GCTTCTGCTAATCTTGCTGCTACTAAAATGTCAGAGTGTGTACTTGGACAATCAAAAAGAG<br>TTGATTTTTGTGGAAAGGGCTATCATCTTATGTCCTTCCCTCAGTCAGCACCTCATGGTGTA<br>GTCTTCTTGCATGTGACTTATGTCCCTGCACAAGAAAAGAACTTCACAACTGCTCCTGCCA<br>TTTGTCATGATGGAAAAGCACACTTTCCTCGTGAAGGTGTCTTTGTTTCAAATGGCACACA<br>CTGGTTTGTAACACAAAGGAATTTTTATGAACCACAAATCATTACTACAGACAACACATTT<br>GTGTCTGGTAACTGTGATGTTGTAATAGGAATTGTCAACAACACAGTTTATGATCCTTTGC<br>AACCTGAATTAGACTCATTCAAGGAGGAGTTAGATAAATATTTTAAGAATCATACATCACC<br>AGATGTTGATTTAGGTGACATCTCTGGCATTAATGCTTCAGTTGTAAACATTCAAAAAGAA<br>ATTGACCGCCTCAATGAGGTTGCCAAGAATTTAAATGAATCTCTCATaGATCTCCAAGAAC<br>TTGGAAAGTATGAGCAGTATATAAAATGGCCATGGTACATTTGGCTAGGTTTTATAGCTGG<br>CTTGATTGCCATAGTAATGGTGACAATTATGCTTTGCTGTATGACCAGTTGCTGTAGTTGTC<br>TCAAGGGCTGTTGTTCTTGTGGATCCTGCTGCAAATTTGATGAAGACGACTCTGAGCCAGT<br>GCTCAAAGGAGTCAAATTACATTACACAtaactcgag |
| SEQ<br>ID<br>NO: 12 | ggtaccATGAACATTACTAACCTCTGCCCGTTCGGCGAGGTATTTAATGCAACACGATTTGCA<br>AGTGTCTATGCGTGGAATAGAAAACGCATTTCAAATTGTGTCGCCGATTACTCCGTACTCT<br>ATAACAGCGCCTCATTTAGCACGTTTAAATGTTATGGTGTCTCCCCCACAAAGCTCAATGA<br>TCTCTGCTTCACTAACGTGTATGCTGATAGCTTCGTGATCCGAGGGTGACGAAGTGAGGCAA<br>ATTGCTCCGGGTCAAACCGGGAAGATCGCAGATTATAACTATAAGTTGCCAGACGATTTC<br>ACTGGATGTGTTATTGCGTGGAACTCTAATAACCTGGACTCAAAAGTGGGAGGGAATTAC<br>AATTACCTCTACAGGCTGTTTCGCAAAAGCAATTTGAAACCCTTCGAGAGGGACATCAGTA<br>CTGAGATATACCAGGCAGGGTCAACCCCCTGCAATGGAGTCGAAGGATTTAATTGCTACTT<br>CCCGCTTCAGAGCTATGGGTTCCAGCCAACGAACGGAGTGGGcTACCAACCCTATCGGGTC<br>GTAGTTTTGAGTTTTGAGCTGCTCCACGCCCTGCGACGGTTTCTGATAATGGGCCCCAGA<br>ATCAGAGGAATGCCCCAAGAATCACTTTCGGAGGTCCATCCGATTCAACGGGCAGCAACC<br>AGAACGGAGAACGGTCTGGCGCCAGGTCAAAGCAACGCCGGCCCCAGGGGCTTCCGAAC<br>AATACAGCAAGCTGGTTTACTGCACTCACGCAACATGGGAAAGAAGATCTGAAATTCCCA<br>AGGGGCCAAGGTGTCCCAATCAACACCAACAGCAGTCCTGATGATCAAATAGGATACTAT<br>CGACGCGCGACTCGCAGAATACGAGGGGGGGACGGTAAATGAAAGATCTCTCTCCACGC<br>TGGTACTTCTACTATCTGGGGACGGGACCCGAAGCAGGGCTTCCATATGGAGCTAACAAG<br>GATGGCATTATTTGGGTGGCTACCGAGGGCGCTCTGAATACACCAAAAGACCATATAGGG<br>ACTAGAAATCCAGCGAATAACGCAGCAATCGTGCTGCAGCTCCCGCAAGGTACGACCTTG<br>CCGAAAGGGTTCTATGCAGAGGGAAGCAGAGGAGGGTCACAAGCATCATCACGAAGTTCC<br>AGCCGCTCCAGAAATAGCTCAAGAAACAGCACTCCAGGGAGCAGTAGAGGAACATCACC<br>CGCTCGAATGGCAGGTAATGGAGGTGATGCCGCGCGTTGGCGCTTTTGCTGCTGGATCGGTTG<br>AATCAACTTGAGTCTAAAATGTCTGGGAAGGGACAGCAGCAACAAGGCCAGACGGTCACC<br>AAAAAATCCGCTGCCGAGGCATCAAAGAAACCGCGCCAAAAGAGGACTGCGACAAAGGC<br>CTATAATGTGACACAAGCATTTGGACGACGGGGCCCTGAGCAGACGCAAGGGAACTTTGG<br>CGACCAGGAGCTTATTCGCCAAGGCACCGACTACAAACATTGGCCACAAATAGCCCAATT<br>TGCACCCTCAGCCTCAGCATTCTTTGGAATGAGTCGGATTGGTATGGAGGTTACACCGAGC<br>GGTACTTGGTTGACCTACACTGGCGCAATAAAGTGGATGACAAGGAcCCAAACTTCAAA<br>GACCAGGTAATACTCTTGAACAAACACATTGACGCTTACAAAACTTTCCCCCCCACGGAGC<br>CGAAGAAGGACAAGAAGAAAAAGGCAGATGAGACTCAGGCGCTTCCGCAACGGCAGAAG<br>AAGCAACAAACGGTTACTCTCCTGCCGGCTGCGGATCTGGACGACTTTAGTAAGCAGCTG<br>CAACAGAGCATGAGCTCTGCTGACTCAACTCAGGCAGCAGATAGCAATGGTACAATCACA<br>GTAGAGGAGTTGAAGAAGCTGTTGGAACAGCGACTTTTCGCCAGAACTCGAAGCATGTGG<br>AGTTTCAACCCTGAAACCAACATCCTTTTGAACGTTCCGCTTCACGGAACTATTCTTACCC<br>GGCCACTTCTTGAATCCGAGCTCGTCATAGGTGCTGTAATCCTTAGGGGTCACCTGAGAAT<br>TGCTGGGCACCATCTCGGTCGGTGTGATATCAAGGACCTTCCCAAGGAGATTACGGTAGC<br>AACGAGCAGAACGTTGTCATATTACAAGTTGGGGGCTTCACAGAGAGTAGCGGGAGACTC<br>CGGTTTCGCAGCATACTCCCGATACCGGATAGGAAACTACAAATTGAACACTGACCATTCT<br>TCCTCTAGTGACAATATAGCTTTGCTTGTTCAAATGTATTCCTTCGTTTCTGAGGAAACAGG<br>CACTCTGATTGTAAACTCTAGGCTTTGTGCATACTGCTGTAATATCGTAAACGTATCTCTCG<br>TGAAGCCTAGCTTCTACGTCTACAGTCGCGTCAAGAACCTTAATAGTTCCCGAGTGCCTGA<br>TTTGTTGGTTtaactcgag |
| SEQ<br>ID<br>NO: 13 | ggtaccATGGCTGCGCCAGGAAGTGCACGACGCCCGCTGTTGTTGCTTCTTCTTCTTCTTCTCC<br>TCGGATTGATGCACTGTGCTAGTGCAGCCATGTTTATGGTAAAGAATGGCAACGGTACTGC<br>gTGCATTATGGCCAATTTTAGCGCGGCTTTTTCCGTAAACTACGATACAAAAAGTGGGCCC<br>AAGAACATGACTTTTGATCTTCCCTCCGATCGAACCGTCGTACTGAATAGATCcTCCTGCG<br>GAAAAGAGAACACGAGCGACCCGTCTCTGGTCATTGCCTTCGGGAGAGGTCATACCCTTA<br>CTCTTAATTTTACAAGAAACGCTACGAGATACTCCGTTCAGCTTATGAGCTTTGTATATAA<br>TCTGTCAGACACACACCTTTTTCCTAACGCCTCCTCAAGGAAATTAAGACAGTAGAATCA<br>ATAACGGACATAAGAGCGGATATTGATAAAAAGTATCGGTGCGTTTCCGGACACACAGGTG<br>CACATGAATAACGTGACGGTCACTTTGCATGATGCGACCATCCAAGCCTACCTCTCCAACA<br>GCTCTTTTTCCCGAGGAGAAACCCGATGCGAACAAGATCGGCCCTCACCTACCACTGCCCC<br>TCCCGCCCCGCCCTCCCCATCCCCCTCTCCGGTGCCCAAATCCCCCTCCGTCGACAAATAT<br>AACGTTTCTGGTACGAACGGGACGTGCCTTCTGGCAAGCATGGGTCTCCAACTGAATCTTA<br>CTTATGAGAGAAAAGATAACACCACCGTCACGCGACTGCTCAACATTAATCCCAACAAGA |

TABLE 1-continued

```
                CGTCTGCCTCAGGTTCATGTGGGGCTCATCTCGTGACTCTTGAGTTGCACTCCGAGGGCAC
                CACTGTTTTGCTTTTCCAATTTGGTATGAATGCGAGCTCAAGTCGATTTTTTCTGCAGGGTA
                TTCAgTTGAACACGATTCTGCCGGATGCCAGGGAcCCCGCGTTCAAAGCTGCGAATGGCAG
                CTTGAGAGCACTCCAGGCGACGTCGGTAATAGCTACAAGTGTAATGCCGAAGAACAcGT
                CCGAGTCACCAAAGCGTTTTCAGTCAATATTTTTAAAGTATGGGTACAAGCGTTTAAAGTT
                GAGGGGGGTCAATTCGGTAGTggtaccATGAACATTACTAACCTCTGCCCGTTCGGCGAGGTA
                TTTAATGCAACACGATTTGCAAGTGTCTATGCGTGGAATAGAAAACGCATTTCAAATTGTG
                TCGCCGATTACTCCGTACTCTATAACAGCGCCTCATTTAGCACGTTTAAATGTTATGGTGTC
                TCCCCCACAAAGCTAATGATCTCTGCTTCACTAACGTGTATGCTGATAGCTTCGTGATCC
                GAGGTGACGAAGTGAGGCAAATTGCTCCGGGTCAAACCGGGAAGATCGCAGATTATAACT
                ATAAGTTGCCAGACGATTTCACTGGATGTGTTATTGCGTGGAACTCTAATAACCTGGACTC
                AAAAGTGGGAGGGAATTACAATTACCTCTACAGGCTGTTTCGCAAAAGCAATTTGAAACC
                CTTCGAGAGGGACATCAGTACTGAGATATACCAGGCAGGGTCAACCCCCTGCAATGGAGT
                CGAAGGATTTAATTGCTACTTCCCGCTTCAGAGCTATGGGTTCCAGCCAACGAACGGAGTG
                GGcTACCAACCCTATCGGGTCGTAGTTTTGAGTTTTGAGCTGCTCCACGCCCCTGCGACGGT
                TTCTGATAATGGGCCCCAGAATCAGAGGAATGCCCCAAGAATCACTTTCGGAGGTCCATC
                CGATTCAACGGGCAGCAACCAGAACGGAGAACGGTCTGGCGCCAGGTCAAAGCAACGCC
                GGCCCCAGGGGCTTCCGAACAATACAGCAAGCTGGTTTACTGCACTCACGCAACATGGGA
                AGAAGATCTGAAATTCCCAAGGGGCCAAGGTGTCCCAATCAACACCAACAGCAGTCCTG
                ATGATCAAATAGGATACTATCGACGCGCGACTCGCAGAATACGAGGGGGGACGGTAAA
                ATGAAAGATCTCTCTCCACGCTGGTACTTCTACTATCTGGGGACGGGACCCGAAGCAGGG
                CTTCCATATGGAGCTAACAAGGATGGCATTATTTGGGTGGCTACCGAGGGCGCTCTGAATA
                CACCAAAAGACCCATATAGGGACTAGAAATCCAGCGAATAACGCAGCAATCGTGCTGCAGC
                TCCCGCAAGGTACGACCTTGCCGAAAGGGTTCTATGCAGAGGGAAGCAGAGGAGGGTCAC
                AAGCATCATCACGAAGTTCCAGCCGCTCCAGAAATAGCTCAAGAAACAGCACTCCAGGGA
                GCAGTAGAGGAACATCACCCGCTCGAATGGCAGGTAATGGAGGTGATGCCGCGCTGGCGC
                TTTTGCTGCTGGATCGGTTGAATCAACTTGAGTCTAAAATGTCTGGGAAGGGACAGCAGCA
                ACAAGGCCAGACGGTCACCAAAAAATCCGCTGCCGAGGCATCAAAGAAACCGCGCCAAA
                AGAGGACTGCGACAAAGGCCTATAATGTGACACAAGCATTTGGACGACGGGGCCCTGAGC
                AGACGCAAGGGAACTTTGGCGACCAGGAGCTTATTCGCAAGGCACCGACTACAAACATT
                GGCCACAAATAGCCCCAATTTGCACCCTCAGCCTCAGCATTCTTTGGAATGAGTCGGATTGG
                TATGGAGGTTACACCGAGCGGTACTTGGTTGACCTACACTGGCGCAATAAAGTTGGATGA
                CAAGGAcCCAAACTTCAAAGACCAGGTAATACTCTTGAACAAACACATTGACGCTTACAA
                AACTTTCCCCCCCACGGAGCCGAAGAAGGACAAGAAGAAAAAGGCAGATGAGACTCAGG
                CGCTTCCGCAACGGCAGAAGAAGCAACAAACGGTTACTCTCCTGCCGGCTGCGGATCTGG
                ACGACTTTAGTAAGCAGCTGCAACAGAGCATGAGCTCTGCTGACTCAACTCAGGCAGCAG
                ATAGCAATGGTACAATCACAGTAGAGGAGTTGAAGAAGCTGTTGGAACAGCGACTTTTCG
                CCAGAACTCGAAGCATGTGGAGTTTCAACCCTGAAACCAACATCCTTTTGAACGTTCCGCT
                TCACGGAACTATTCTTACCCGGCCACTTCTTGAATCCGAGCTCGTCATAGGTGCTGTAATC
                CTTAGGGGTCACCTGAGAATTGCTGGGCACCATCTCGGTCGGTGTGATATCAAGGACCTTC
                CCAAGGAGATTACGGTAGCAACGAGCAGAACGTTGTCATATTACAAGTTGGGGCTTCAC
                AGAGAGTAGCGGGAGACTCCGGTTTCGCAGCTACTCCCGATACGGATAGGAAACTACA
                AATTGAACACTGACCATTCTTCCTCTAGTGACAATATAGCTTTGCTTGTTCAAATGTATTCC
                TTCGTTTCTGAGGAAACAGGCACTCTGATTGTAAACTCTAGGCTTTGTGCATACTGCTGTA
                ATATCGTAAACGTATCTCTCGTGAAGCCTAGCTTCTACGTCTACAGTCGCGTCAAGAACCT
                TAATAGTTCCCGAGTGCCTGATTTGTTGGTTctcgagggatccGTAGAGGAATGCTTGCTGGATG
                AAAATTCTATGCTCATCCCGATTGCCGTAGGCGGTGCTCTGGCCGGACTGGTTCTGATAGT
                GCTCATAGCTTACCTGGTGGGCGCAAGCGAAGCCATGCGGGCTACCAGACCATAtaagcggcc
                gc SEQ           ATGgtgagcaagggcgaggagctgatcaaggagaacatgagaagcaagctgtacctggaaggcagcgtgaacggccaccagttcaagtg
 ID            cacccacgaagggggagggcaagccctacgagggcaagcagaccaacaggatcaaggtggtggagggaggccccctgccgttcgcattcg
 NO: 14        acatcctggccacccactttatgtacgggagcaaggtgttcatcaagtaccccgccgacctccccgattattttaagcagtccttccct
                gagggcttcacatgggagagagtcatggtgttcgaagacggggcgtgtgaccgcaccaggacaccagtctccaggacggcgagc
                catctacaacgtcaaggtcaaggtgaacttcccagccaacggccccgtgatgcagaagaaaacactgggctggagcccagcaccg
                agaccatgtacccgctgacggcggcctggaaggcagatgcgcaaggccctgaagctcgtggcgggggccacctgcacgtcaacttc
                aagaccacatacaagtccaagaaacccgtgaagatgcccggcgtccactacgtggaccgcagactggaaagaatcaaggaggccgacaa
                cgagacctacgtcgagcagtacgagcacgctgtggccagatactccaacctgggcggaggcttcacactcgaagatttcgttggggact
                ggcgacagacagccggctacaacttgagtcaagtccttgaacagggagggtgtgtccagtttctttcagaatctcggggtgtccgtaact
                ccgatccaaaggattgtcctgagcggtgaaaatgggctgaagatcgacatccatgtcatcatcccgtatgaaggtctgagcggcgacca
                aatgggccagatcgaaaaaatttttaaggtggtgtaccctgtgataatcatcactttaaggtgatcctgcactatggcacactggtaa
                tcgacggggttacgccgaacatgatcgactatttcggacggccgtatgaaggcatcgccgtgttcgacggcaaaaagatcactgtaaca
                gggaccctgtggaacggcaacaaaattatcgacgagcgcctcatcaaccccgacgcctccctgctgttccgagtaaccatcaacggagt
                gaccggctggcgtctgcatgaacgcattctggcgaggcacgagctgatcaaggagaacatgagaagcaagctgtacctggaaggcagcg
                tgaacggccaccagttcaagtgcacccacgaaggggagggcaagccctacgagggcaagcagaccaacaggatcaaggtggtggaggga
                ggccccctgccgttcgcattcgacatcctggccacccactttatgtacgggagcaaggtgttcatcaagtaccccgccgacctccccga
                ttattttaagcagtccttccctgagggcttcacatgggagagagtcatggtgttcgaagacggggcgtgtgaccgcaccacggaca
                ccagcctccaggacggcgagctcatctacaacgtcaaggtcagagggtgaacttcccagccaacggccccgtgatgcagaagaaaaca
                ctgggctgggagcccagcaccgagaccatgtaccccgctgacggcggcctggaaggcagatgcgacaaggccctgaagctcgtgggcgg
                gggccacctgcacgtcaacttcaagaccacatacaagtccaagaaacccgtgaagatgcccggcgtccactacgtggaccgcagactgg
                aaagaatcaaggaggccgacaacgagacctacgtcgagcagtacgagcacgctgtggccagatactccaacctgggcggaggcatggac
                gagctgtacaag SEQ           MVSKGEELIKENMRSKLYLEGSVNGHQFKCTHEGEGKPYEGKQTNRIKVVEGGPLPFAFDILA
 ID            THFMYGSKVFIKYPADLPDYFKQSFPEGFTWERVMVFEDGGVLTATQDTSLQDGELIYNVKV
 NO: 15        RGVNFPANGPVMQKKTLGWEPSTETMYPADGGLEGRCDKALKLVGGGHLHVNFKTTYKSK
                KPVKMPGVHYVDRRLERIKEADNETYVEQYEHAVARYSNLGGGFTLEDFVGDWRQTAGYNL
                SQVLEQGGVSSLFQNLGVSVTPIQRIVLSGENGLKIDIHVIIPYEGLSGDQMGQIEKIFKVVYPVD
                NHHFKVILHYGTLVIDGVTPNMIDYFGRPYEGIAVFDGKKITVTGTLWNGNKIIDERLINPDGSL
                LFRVTINGVTGWRLHERILARHELIKENMRSKLYLEGSVNGHQFKCTHEGEGKPYEGKQTNRI
```

TABLE 1-continued

```
KVVEGGPLPFAFDILATHFMYGSKVFIKYPADLPDYFKQSFPEGFTWERVMVFEDGGVLTATQ
DTSLQDGELIYNVKVRGVNFPANGPVMQKKTLGWEPSTETMYPADGGLEGRCDKALKLVGG
GHLHVNFKTTYKSKKPVKMPGVHYVDRRLERIKEADNETYVEQYEHAVARYSNLGGGMDEL
YK
```

BRIEF DESCRIPTION OF THE FIGURES

FIGS. 1A-1E shows exosome purification and characterization. (FIG. 1A) Schematic of exosome purification from cultures of 293F cells grown in chemically defined media. (FIG. 1B) NTA analysis of purified exosomes showing a mean exosome diameter of ~115 nm. (FIG. 1C) Negative stain electron micrograph of purified exosomes. Bar, 100 nm. (FIG. 1D) Immunofluorescent NTA analysis of 293F-derived exosomes that had been labeled previously using fluorescently labeled anti-CD63 antibody. (FIG. 1E) Immunoblot analysis of equal proportions of 293F cell and exosome lysates using antibodies specific for the exosomal markers CD81, CD9, & CD63, as well as the control cytoplasmic protein Hsp90.

(FIG. 3A) H&E staining of tissue sections from BALB/c mice that had been injected three days earlier with 50 ml of PBS, exosomes ($10^{12}$/ml), or LNPs ($10^{12}$/ml). (FIG. 3B) Body mass measurements prior to and at 3 days after injection. All animals were subjected to analysis by an independent pathology service, which noted spleen abnormalities in 4/5 LNP-treated animals but no abnormalities in control or exosome-treated animals.

(FIG. 4A) Mean luciferase activities (+/−standard error of the mean) of cells exposed to different exosome-RNA formulations. Cells were exposed to formulations in which (brown/top) RNA and lipid were pre-mixed prior to exosome loading, (orange/middle) exosomes and RNA were mixed prior to lipid addition, (grey/bottom) exosomes and lipid were mixed prior to addition of RNA, and (black) RNA alone was added. Exosomes were varied over a range of 100-fold. (FIGS. 4B, 4C) Light micrographs of HEK293 cells exposed to the exosome-RNA formulation containing the highest amount of exosomes; (FIG. 4B) fluorescence microscopy showing Antares2 fluorescence and (FIG. 4C) merged fluorescence and transmission light microscopy showing the cell-to-cell variability in Antares2 expression. Bar, 75 µm.

(FIGS. 6A, 6B) Fluorescence micrographs of HEK293 cells stained with DAPI and a plasma from a COVID-19 patient. (FIGS. 6C-6F) Fluorescence micrographs of HEK293 cells stained with DAPI and plasmas from a COVID-19 patient following their transfection with the (FIGS. 6C, 6D) S$^{W1}$-encoding mRNA and (FIGS. 6E, 6F) the LSNME-encoding mRNA. Bar, 50 µm.

(FIG. 7A) Schematic of immunization and blood/tissue collection timeline. (FIG. 7B) Anti-N ELISA results of diluted plasma from (grey/left bars and black circles) individual six control mice, (orange/middle bars and black squares) six mice immunized with 0.25 µg equivalents of each mRNA, and (rust/right bars and black triangles) six mice immunized with 4 µg equivalents of each mRNA. (FIG. 7C) Anti-S1 ELISA results of diluted plasma from (grey/left bars and black circles) six control mice, (orange/middle bars and black squares) six mice immunized with 0.25 µg equivalents of each mRNA, and (rust/right bars and black triangles) six mice immunized with 4 µg equivalents of each mRNA. Height of bars represents the mean, error bars represent+/−one standard error of the mean, and the statistical significance of differences between different groups is reflected in Student's t-test values of * for <0.05,  for <0.005, and * for <0.0005.

FIG. 13 also schematically shows how an extracellular vesicle-based nucleic acid vaccine (NAV) for SARS-CoV-2 was administered intramuscularly in C57BL6 mice to study the host immune responses against the antigen.

DETAILED DESCRIPTION OF THE INVENTION

Figure 1A:
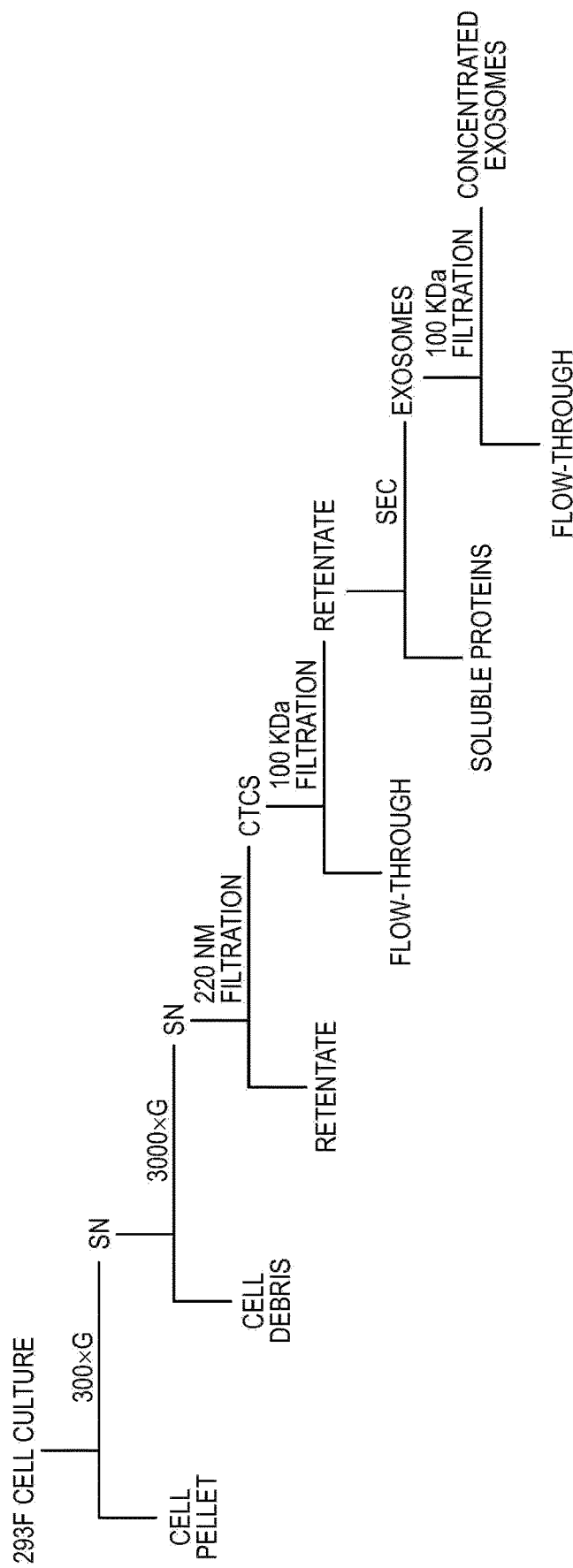
Figure 1B:
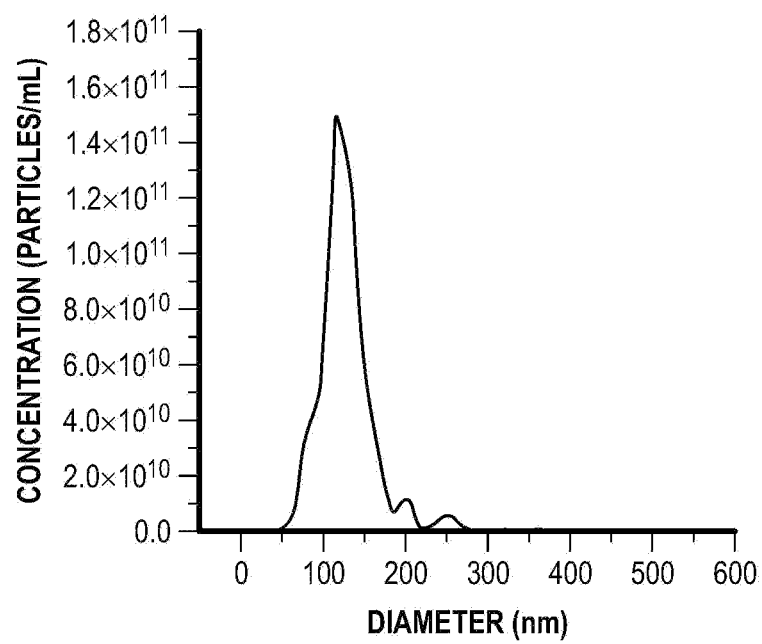
Figure 1E:
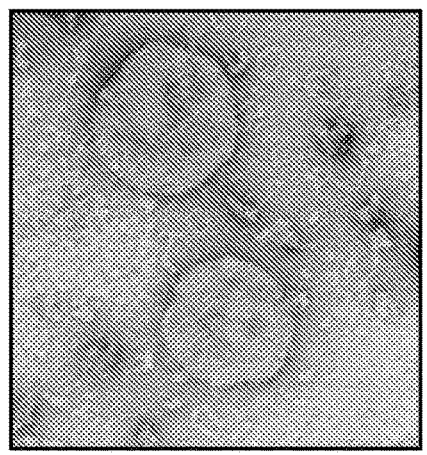
Figure 1E:
Figure 1E:
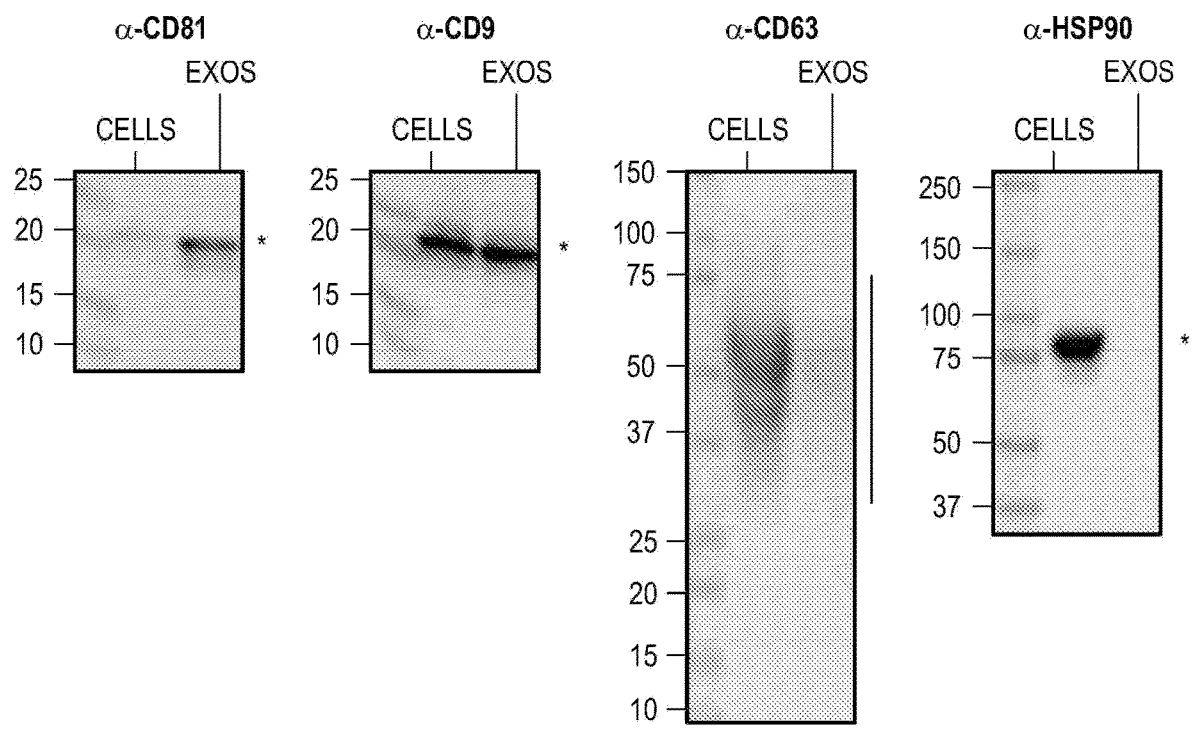

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

As used herein, "and/or" refers to and encompasses any and all possible combinations of one or more of the associated listed items, as well as the lack of combinations when interpreted in the alternative (or).

The terms "about" and "approximate", as used herein when referring to a measurable value such as an amount, dose, time, temperature, activity, level, number, frequency, percentage, dimension, size, amount, weight, position, length and the like, is meant to encompass variations of ±15%, ±10%, ±5%, ±1%, ±0.5%, or even ±0.1% of the specified amount, dose, time, temperature, activity, level, number, frequency, percentage, dimension, size, amount, weight, position, length and the like. In instances in which the terms "about" and "approximate" are used in connection with the location or position of regions within a reference polypeptide, these terms encompass variations of ±up to 20 amino acid residues, ±up to 15 amino acid residues, ±up to 10 amino acid residues, ±up to 5 amino acid residues, ±up to 4 amino acid residues, ±up to 3 amino acid residues, ±up to 2 amino acid residues, or even ±1 amino acid residue.

The term "derived from" as in "A is derived from B" means that A is obtained from B in such a manner that A is not identical to B.

The terms "treat", "therapeutic", "prophylactic" and "prevent" are not intended to be absolute terms. Treatment, prevention and prophylaxis can refer to any delay in onset, amelioration of symptoms, improvement in patient survival, increase in survival time or rate, etc. Treatment, prevention, and prophylaxis can be complete or partial. The term "prophylactic" means not only "prevent", but also minimize illness and disease. For example, a "prophylactic" agent can be administered to subject to prevent infection, or to minimize the extent of illness and disease caused by such infection. The effect of treatment can be compared to an individual or pool of individuals not receiving the treatment, or to the same patient prior to treatment or at a different time during treatment. In some aspects, the severity of disease is reduced by at least 10%, as compared, e.g., to the individual before administration or to a control individual not undergoing treatment. In some aspects, the severity of disease is reduced by at least 25%, 50%, 75%, 80%, or 90%, or in some cases, no longer detectable using standard diagnostic techniques.

A treatment can be considered "effective," as used herein, if one or more of the signs or symptoms of a condition described herein are altered in a beneficial manner, other clinically accepted symptoms are improved, or even ameliorated, or a desired response is induced e.g., by at least 2%, 3%, 4%, 5%, 10%, or more, following treatment according to the methods described herein. Efficacy can be assessed, for example, by measuring a marker, indicator, symptom, and/or the incidence of a condition treated according to the methods described herein or any other measurable parameter appropriate. Efficacy can also be measured by a failure of an individual to worsen as assessed by hospitalization, or need for medical interventions (e.g., progression of the disease is halted). Treatment includes any treatment of a disease in an individual or an animal (some non-limiting examples include a human or an animal) and includes: (1) inhibiting the disease, e.g., preventing a worsening of symptoms (e.g. pain or inflammation); or (2) relieving the severity of the disease, e.g., causing regression of symptoms. An effective amount for the treatment of a disease means that amount which, when administered to a subject in need thereof, is sufficient to result in effective treatment as that term is defined herein, for that disease. Efficacy of an agent can be determined by assessing physical indicators of a condition or desired response. One skilled in the art can monitor efficacy of administration and/or treatment by measuring any one of such parameters, or any combination of parameters.

The term "effective amount" as used herein refers to the amount of a composition or an agent needed to alleviate at least one or more symptom of the disease or disorder, and relates to a sufficient amount of therapeutic composition to provide the desired effect. The term "therapeutically effective amount" refers to an amount of a composition or therapeutic agent that is sufficient to provide a particular effect when administered to a typical subject. An effective amount as used herein, in various contexts, can include an amount sufficient to delay the development of a symptom of the disease, alter the course of a symptom disease (for example but not limited to, slowing the progression of a symptom of the disease), or reverse a symptom of the disease. For example, for the given parameter, a therapeutically effective amount will show an increase or decrease of therapeutic effect at least any of 5%, 10%, 15%, 20%, 25%, 40%, 50%, 60%, 75%, 80%, 90%, or at least 100%. Therapeutic efficacy can also be expressed as "-fold" increase or decrease. For example, a therapeutically effective amount can have at least any of a 1.2-fold, 1.5-fold, 2-fold, 5-fold, or more effect over a control. The therapeutically effective amount may be administered in one or more doses of the therapeutic agent. The therapeutically effective amount may be administered in a single administration, or over a period of time in a plurality of doses.

"Administering" as used herein can include any suitable routes of administering a therapeutic agent or composition as disclosed herein. Suitable routes of administration include, without limitation, oral, parenteral, intravenous, intramuscular, subcutaneous, transdermal, airway (aerosol), pulmonary, cutaneous, injection or topical administration. Administration can be local or systemic.

As used herein, the term "pharmaceutically acceptable" refers to a carrier that is compatible with the other ingredients of the formulation and not deleterious to the recipient thereof. The term is used synonymously with "physiologically acceptable" and "pharmacologically acceptable". A pharmaceutical composition will generally comprise agents for buffering and preservation in storage, and can include buffers and carriers for appropriate delivery, depending on the route of administration. The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The terms "dose" and "dosage" are used interchangeably herein. A dose refers to the amount of active ingredient given to an individual at each administration. For the present invention, the dose can refer to the concentration of the extracellular vesicles or associated components, e.g., the amount of therapeutic agent or dosage of radiolabel. The dose will vary depending on a number of factors, including frequency of administration; size and tolerance of the individual; severity of the condition; risk of side effects; the route of administration; and the imaging modality of the detectable moiety (if present). One of skill in the art will recognize that the dose can be modified depending on the above factors or based on therapeutic progress. The term "dosage form" refers to the particular format of the pharmaceutical, and depends on the route of administration. For example, a dosage form can be in a liquid, e.g., a saline solution for injection.

"Subject," "patient," "individual" and like terms are used interchangeably and refer to, except where indicated, mammals such as humans and non-human primates, as well as rabbits, rats, mice, goats, pigs, and other mammalian species. The term does not necessarily indicate that the subject has been diagnosed with a particular disease, but typically refers to an individual under medical supervision. A patient can be an individual that is seeking treatment, monitoring, adjustment or modification of an existing therapeutic regimen, etc.

As used herein, the following meanings apply unless otherwise specified. The word "may" is used in a permissive sense (i.e., meaning having the potential to), rather than the mandatory sense (i.e., meaning must). The words "include", "including", and "includes" and the like mean including, but not limited to. The singular forms "a," "an," and "the" include plural referents. Thus, for example, reference to "an element" includes a combination of two or more elements, notwithstanding use of other terms and phrases for one or more elements, such as "one or more." The term "or" is, unless indicated otherwise, non-exclusive, i.e., encompassing both "and" and "or." The term "any of" between a modifier and a sequence means that the modifier modifies each member of the sequence. So, for example, the phrase "at least any of 1, 2 or 3" means "at least 1, at least 2 or at least 3". The phrase "at least one" includes "a plurality".

Definitions of common terms in cell biology and molecular biology can be found in "The Merck Manual of Diagnosis and Therapy", 19th Edition, published by Merck Research Laboratories, 2006 (ISBN 0-91 1910-19-0); Robert S. Porter et al. (eds.), The Encyclopedia of Molecular Biology, published by Blackwell Science Ltd., 1994 (ISBN 0-632-02182-9); Benjamin Lewin, Genes X, published by Jones & Bartlett Publishing, 2009 (ISBN-10: 0763766321); Kendrew et al. (eds.), Molecular Biology and Biotechnology: a Comprehensive Desk Reference, published by VCH Publishers, Inc., 1995 (ISBN 1-56081-569-8) and Current Protocols in Protein Sciences 2009, Wiley Intersciences, Coligan et al., eds.

The term "native form" corresponds to the polypeptide as it is understood to be encoded by the infectious agent's genome. The term "exosomal form" corresponds to any derivative of the protein that, in whole or in part, is fused to an exosome-associated protein. The term "cytoplasmic form" corresponds to any derivative of the protein that, in whole or in part, is designed to be expressed within the cytoplasm of the cell, rather than entering the canonical secretory pathway.

The term "extracellular vesicle" (EV) refers to lipid bilayer-delimited particles that are naturally released from cells. EVs range in diameter from around 20-30 nanometers to about 10 microns or more. EVs can comprise proteins, nucleic acids, lipids and metabolites from the cells that produced them. EVs include exosomes (about 50 to about 100 nm), microvesicles (about 100 to about 300 nm), ectosomes (about 50 to about 1000 nm), apoptotic bodies (about 50 to about 5000 nm) and lipid-protein aggregates of the same dimensions.

The term "chemical lipofection reagent" or "chemical transfection reagent" refers to a cationic-lipid transfection reagent, e.g. Lipofectamine® MessengerMAX™, Lipofectamine® 2000, Lipofectamine® 3000, used to increase the transfection efficiency of RNA (including mRNA and siRNA) or plasmid DNA into in vitro cell cultures by lipofection.

An extracellular vesicle can carry a cargo, which can be a polynucleotide (nucleic acid), for example, that encodes a protein of interest. The cargo molecule can be present within the lumen of the EV or on its surface. A protein of interest can be a protein that is naturally produced by a cell that generates an EV, or it can be a recombinant protein, including a non-naturally occurring protein, such as a fusion protein. The POI can be an antigen of interest, or AOI. The POI can be a viral protein, e.g., capable of eliciting an immune response. The protein of interest can comprise SARS-CoV-2 spike (S) protein, nucleocapsid (N) protein, membrane (M) protein, envelope (E) protein, orf3a-encoded protein, and/or orf7a-encoded protein. Polynucleotides include, without limitation, DNA and RNA. RNA can be mRNA. When delivered to a target cell, mRNA may be expressed as protein and presented on the cell surface to elicit an immune response. Nucleic acids are typically incorporated into EVs by contacting the EVs and the nucleic acid in the presence of a lipofection reagent, as described herein.

The protein of interest can be a protein from a virus that infects animals, e.g., mammals, e.g., humans. These include, by way of example, DNA viruses, RNA viruses, influenza, flu, coronaviruses, SARS, MERS, Ebola, Zika, West Nile Virus and the like.

The contents of exosomes depends, in part, on the character of the cells that produce them. Cells can be genetically modified to configure exosomes produced by them. Fang et al., (PLOS, June 2007 vol. 5:1267-1283) describe methods of engineering proteins to preferentially target them toward exosomes. It was observed that (1) addition of both monoclonal mouse IgG to CD43 and polyclonal anti-mouse IgG antibodies were sufficient to induce the sorting of CD43 to exosomes, (2) addition of a plasma membrane anchor was sufficient to target a protein to exosomes, (3) a synthetic cargo comprised of a plasma membrane anchor and two heterologous oligomerization domains (Acyl-LZ-DsRED) was sorted to exosomes, (4) highly oligomeric, plasma membrane-associated retroviral Gag proteins (from EIAV, HTLV-1, RSV, MLV, MPMV, and HERV-K) were all sorted to ELDs and exosomes, and (5) a pair of heterologous oligomerization domains was necessary and sufficient to target HIV Gag to ELDs and exosomes. Elements, such as these, that traffic proteins to EVs, are referred to as "EV-trafficking elements." Accordingly, any protein of interest can be modified in this way to traffic the protein towards exosomes.

The nucleotide and amino acid sequences of the SARS-CoV-2 Wuhan-1 strain spike (S) protein, and the Wuhan-1 strain S protein with an amino acid change of D614G are well known in the art, and are described in, e.g., Plante, J. A., Liu, Y., Liu, J. et al. Spike mutation D614G alters SARS-CoV-2 fitness. Nature (2020), the contents of which are each incorporated herein by reference in their entirety.

The term "nucleic acid" refers to polynucleotides such as deoxyribonucleic acid (DNA) or ribonucleic acid (RNA). Nucleic acids include but are not limited to genomic DNA, cDNA, mRNA, iRNA, miRNA, tRNA, ncRNA, rRNA, and recombinantly produced and chemically synthesized molecules such as aptamers, plasmids, anti-sense DNA strands, shRNA, ribozymes, nucleic acids conjugated and oligonucleotides. According to the invention, a nucleic acid may be present as a single-stranded or double-stranded and linear or covalently circularly closed molecule. A nucleic acid might be employed for introduction into, e.g., transfection of, cells, e.g., in the form of RNA which can be prepared by in vitro transcription from a DNA template. The RNA can moreover be modified before application by stabilizing sequences, capping, and polyadenylation. Generally, nucleic acid can be extracted, isolated, amplified, or analyzed by a variety of techniques such as those described by, e.g., Green and Sambrook, Molecular Cloning: A Laboratory Manual (Fourth Edition), Cold Spring Harbor Laboratory Press, Woodbury, NY 2,028 pages (2012).

The term "open reading frame" (ORF) refers to a nucleotide sequence, typically positioned between a start codon and a stop codon, that has the ability to be translated into a polypeptide.

A variety of host cells are known in the art and suitable for proteins expression and extracellular vesicles production. Non-limiting examples of typical cell used for transfection include, but are not limited to, a bacterial cell, a eukaryotic cell, a yeast cell, an insect cell, or a plant cell. For example, human embryonic kidney 293 (HEK293), *E. coli, Bacillus, Streptomyces, Pichia pastoris, Salmonella typhimurium, Drosophila* S2, *Spodoptera* SJ9, CHO, COS (e.g. COS-7), 3T3-F442A, HeLa, HUVEC, HUAEC, NIH 3T3, Jurkat, 293, 293H, or 293F.

A pathogen, which can be a bacteria, virus, or any other microorganism that can cause a disease in a subject, can elicit an immune response (i.e., an integrated bodily response to a pathogen antigen, which can include a cellular immune response and/or a humoral immune response) in the subject. For example, upon contact and/or exposure to a pathogen, a subject may respond with a humoral immune response, characterized by the production of antibody, specifically directed against one or more pathogen antigens.

As used herein the term "antibody" refers to immunoglobulin (Ig) molecules and immunologically active portions of immunoglobulin molecules, i.e., molecules that contain an antigen-binding site that specifically binds an antigen. Antibodies are usually heterotetrameric glycoproteins of about 150,000 Daltons, composed of two identical light (L) chains and two identical heavy (H) chains. The light chains from any vertebrate species can be assigned to one of two clearly distinct types, called kappa (κ) and lambda (λ), based on the amino acid sequences of their constant domains. Depending on the amino acid sequence of the constant domain of their heavy chains, immunoglobulins can be assigned to different classes. There are five major classes of immunoglobulins: IgA, IgD, IgE, IgG, and IgM, and several of these may be further divided into subclasses (isotypes), e.g., IgG1, IgG2, IgG3, IgG4, IgA, and IgA2. The heavy-chain constant domains that correspond to the different classes of immunoglobulins are called α, δ, ε, γ, and μ, respectively. The subunit structures and three-dimensional configurations of different classes of immunoglobulins are well known. The antibody may have one or more effector functions which refer to those biological activities attributable to the Fc region (a native sequence Fc region or amino acid sequence variant Fc region or any other modified Fc region) of an antibody. Non-limiting examples of antibody effector functions include C1q binding; complement dependent cytotoxicity; Fc receptor binding; antibody-dependent cell-mediated cytotoxicity (ADCC); phagocytosis; down regulation of cell surface receptors (e.g., B cell receptor (BCR); and cross-presentation of antigens by antigen presenting cells or dendritic cells).

The term "neutralizing antibody" (Nab) refers an antibody that defends a cell from a pathogen or infectious particle by neutralizing any effect it has biologically. Neutralization renders the particle no longer infectious or pathogenic. Neutralizing antibodies are part of the humoral response of the adaptive immune system against viruses, intracellular bacteria and microbial toxin. By binding specifically to surface antigen on an infectious particle, neutralizing antibodies prevent the particle from interacting with its host cells it might infect and destroy. Immunity due to neutralizing antibodies is also known as sterilizing immunity, as the immune system eliminates the infectious particle before any infection took place.

The term "antigen" refers to any substance that will elicit an immune response. For instance, an antigen relates to any substance, preferably a peptide or protein, that reacts specifically with antibodies or T-lymphocytes (T cells). As used herein, the term "antigen" comprises any molecule which comprises at least one epitope. For instance, an antigen is a molecule which, optionally after processing, induces an immune reaction. For instance, any suitable antigen may be used, which is a candidate for an immune reaction, wherein the immune reaction may be a cellular immune reaction. For instance, the antigen may be presented by a cell, which results in an immune reaction against the antigen. For example, an antigen is a product which corresponds to or is derived from a naturally occurring antigen. Such antigens include, but are not limited to, SARS-CoV-2 structural proteins S, N, M, and E, and any variants or mutants thereof.

The terms "peptide", "polypeptide" and "protein" are used interchangeably herein and refer to any chain of at least two amino acids, linked by a covalent chemical bound. As used herein a peptide can refer to the complete amino acid sequence coding for an entire protein or to a portion thereof. A "protein coding sequence" or a sequence that "encodes" a particular polypeptide or peptide, is a nucleic acid sequence that is transcribed (in the case of DNA) and is translated (in the case of mRNA) into a polypeptide in vitro or in vivo when placed under the control of appropriate regulatory sequences. The boundaries of the coding sequence are determined by a start codon at the 5' (amino) terminus and a translation stop codon at the 3' (carboxyl) terminus. A coding sequence can include, but is not limited to, cDNA from prokaryotic or eukaryotic mRNA, genomic DNA sequences from prokaryotic or eukaryotic DNA, and even synthetic DNA sequences. A transcription termination sequence will usually be located 3' to the coding sequence.

The term "pharmaceutical composition" refers to a formulation comprising an active ingredient, and optionally a pharmaceutically acceptable carrier, diluent or excipient. The term "active ingredient" can interchangeably refer to an "effective ingredient," and is meant to refer to any agent that is capable of inducing a sought-after effect upon administration. By "pharmaceutically acceptable" it is meant the carrier, diluent or excipient must be compatible with the other ingredients of the formulation and not deleterious to the recipient thereof, nor to the activity of the active ingredient of the formulation. Pharmaceutically acceptable carriers, excipients or stabilizers are well known in the art, for example Remington's Pharmaceutical Sciences, 16th edition, Osol, A. Ed. (1980). Pharmaceutically acceptable carriers, excipients, or stabilizers are nontoxic to recipients at the dosages and concentrations employed, and may include buffers such as phosphate, citrate, and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (for example, Zn-protein complexes); and/or non-ionic surfactants such as TWEEN™, PLURONICS™ or polyethylene glycol (PEG). Examples of carrier include, but are not limited to, liposome, nanoparticles, ointment, micelles, microsphere, microparticle, cream, emulsion, and gel. Examples of excipient include, but are not limited to, anti-adherents such as magnesium stearate, binders such as saccharides and their derivatives (sucrose, lactose, starches, cellulose, sugar alcohols and the like) protein like gelatin and synthetic polymers, lubricants such as talc and silica, and preservatives such as antioxidants, vitamin A, vitamin E, vitamin C, retinyl palmitate, selenium, cysteine, methionine, citric acid, sodium sulfate and parabens. Examples of diluent include, but are not limited to, water, alcohol, saline solution, glycol, mineral oil and dimethyl sulfoxide (DMSO).

The term "vaccine" relates to a pharmaceutical preparation (pharmaceutical composition) or product that upon administration induces an immune response, e.g., a cellular immune response, which recognizes and attacks a pathogen or a diseased cell. The term "immune response" refers to an integrated bodily response to an antigen and refers to a cellular immune response and/or a humoral immune response. The immune response may be protective/preventive/prophylactic and/or therapeutic.

A "cellular immune response" can include a cellular response directed to cells characterized by presentation of an antigen with class I or class II MEW, or a humoral response directed to the production of antibodies. The cellular response relates to cells called T cells or T-lymphocytes which act as either "helpers" or "killers". The helper T cells (also termed $CD4^+$ T cells) play a central role by regulating the immune response and the killer cells (also termed cytotoxic T cells, cytolytic T cells, $CD8^+$ T cells or CTLs) kill diseased cells such as cancer cells, preventing the production of more diseased cells.

The terms "immunoreactive cell" "immune cells" or "immune effector cells" relate to a cell which exerts effector functions during an immune reaction. An "immunoreactive cell" preferably is capable of binding an antigen or a cell characterized by presentation of an antigen or an antigen peptide derived from an antigen and mediating an immune response. For example, such cells secrete cytokines and/or chemokines, secrete antibodies, recognize cancerous cells, and optionally eliminate such cells. For example, immunoreactive cells comprise T cells (cytotoxic T cells, helper T cells, tumor infiltrating T cells), B cells, natural killer cells, neutrophils, macrophages, and dendritic cells.

The term "adjuvant" refers to a pharmacological or immunological agent that modifies the effect of other agents. An adjuvant may be added to the vaccine composition of the invention to boost the immune response to produce more antibodies and longer-lasting immunity, thus minimizing the dose of antigen needed. Adjuvants may also be used to enhance the efficacy of a vaccine by helping to modify the immune response to particular types of immune system cells: for example, by activating T cells instead of antibody-secreting B cells depending on the purpose of the vaccine. Immunologic adjuvants are added to vaccines to stimulate the immune system's response to the target antigen, but do not provide immunity themselves. Examples of adjuvants include, but are not limited to analgesic adjuvants; inorganic compounds such as alum, aluminum hydroxide, aluminum phosphate, calcium phosphate hydroxide; mineral oil such as paraffin oil; bacterial products such as killed bacteria (*Bordetella pertussis, Mycobacterium bovis*, toxoids); non-bacterial organics such as squalene; delivery systems such as detergents (Quil A); plant saponins from Quillaja, soybean, or Polygala senega; cytokines such as IL-1, IL-2, IL-12; combination such as Freund's complete adjuvant, Freund's incomplete adjuvant; food-based oil such as Adjuvant 65, which is based on peanut oil.

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Cardiospheres

Cardiospheres are undifferentiated cardiac cells that grow as self-adherent clusters as described in WO 2005/012510, and Messina et al., "Isolation and Expansion of Adult Cardiac Stem Cells from Human and Murine Heart," Circulation Research, 95:911-921 (2004), the disclosures of which are herein incorporated by reference in their entirety.

Briefly, heart tissue can be collected from a patient during surgery or cardiac biopsy. The heart tissue can be harvested from the left ventricle, right ventricle, septum, left atrium, right atrium, crista terminalis, right ventricular endocardium, septal or ventricle wall, atrial appendages, or combinations thereof. A biopsy can be obtained, e.g., by using a percutaneous bioptome as described in, e.g., U.S. Patent Application Publication Nos. 2009/012422 and 2012/0039857, the disclosures of which are herein incorporated by reference in their entirety.

The tissue can then be cultured directly, or alternatively, the heart tissue can be frozen, thawed, and then cultured. The tissue can be digested with protease enzymes such as collagenase, trypsin and the like. The heart tissue can be cultured as an explant such that cells including fibroblast-like cells and cardiosphere forming cells grow out from the explant. In some instances, an explant is cultured on a culture vessel coated with one or more components of the extracellular matrix (e.g., fibronectin, laminin, collagen, elastin, or other extracellular matrix proteins). The tissue explant can be cultured for about 1, 2, 3, 4, or more weeks prior to collecting the cardiosphere-forming cells. A layer of fibroblast-like cells can grow from the explant onto which cardiosphere-forming cells appear.

Cardiosphere-forming cells can appear as small, round, phase-bright cells under phase contrast microscopy. Cells surrounding the explant including cardiosphere-forming cells can be collected by manual methods or by enzymatic digestion. The collected cardiosphere-forming cells can be cultured under conditions to promote the formation of cardiospheres. In some aspects, the cells are cultured in cardiosphere-growth medium comprising buffered media, amino acids, nutrients, serum or serum replacement, growth factors including but not limited to EGF and bFGF, cytokines including but not limited to cardiotrophin, and other cardiosphere promoting factors such as but not limited to thrombin. Cardiosphere-forming cells can be plated at an appropriate density necessary for cardiosphere formation, such as about 20,000-100,000 cells/mL. The cells can be cultured on sterile dishes coated with poly-D-lysine, or other natural or synthetic molecules that hinder the cells from attaching to the surface of the dish. Cardiospheres can appear spontaneously about 2-7 days or more after cardiosphere-forming cells are plated.

Cardiosphere-Derived Cells (CDCs)

CDCs are a population of cells generated by manipulating cardiospheres in the manner as described in, e.g., U.S. Patent Application Publication No. 2012/0315252, the disclosures of which are herein incorporated by reference in their entirety. For example, CDCs can be generated by plating cardiospheres on a solid surface which is coated with a substance which encourages adherence of cells to a solid surface of a culture vessel, e.g., fibronectin, a hydrogel, a polymer, laminin, serum, collagen, gelatin, or poly-D-lysine, and expanding same as an adherent monolayer culture. CDCs can be repeatedly passaged, e.g., passaged two times or more, according to standard cell culturing methods.

Activated-Specialized Tissue-Effector Cells (ASTECs) and ASTEC-Derived Exosomes (ASTEX)

ASTECs and ASTEX are activation-specialized tissue-effector cells and EVs, e.g, exosomes, derived therefrom, respectively, as described in WO 2019/152409, and Ibrahim et al., Augmenting canonical Wnt signalling in therapeutically inert cells converts them into therapeutically potent exosome factories, *Nat Biomed Eng.*, 2019 September; 3(9):695-705, the disclosures of which are herein incorporated by reference in their entirety.

Exosomes

Exosomes are defined herein as all small, secreted vesicles of ~20-150 nm that are released by mammalian cells, and made either by budding into endosomes or by budding from the plasma membrane of a cell. Exosomes can range in size from approximately 20-150 nm in diameter. In some cases, they have a characteristic buoyant density of approximately 1.1-1.2 g/mL, and a characteristic lipid composition. Their lipid membrane is typically rich in cholesterol and contains sphingomyelin, ceramide, lipid rafts and exposed phosphatidylserine. Exosomes express certain marker proteins, such as integrins and cell adhesion molecules, but generally lack markers of lysosomes, mitochondria, or caveolae. In some embodiments, the exosomes contain cell-derived components, such as but not limited to, proteins, DNA and RNA (e.g., microRNA and noncoding RNA). In some embodiments, exosomes can be obtained from cells obtained from a source that is allogeneic, autologous, xenogeneic, or syngeneic with respect to the recipient of the exosomes.

Certain types of RNA, e.g., microRNA (miRNA), are known to be carried by exosomes. miRNAs function as post-transcriptional regulators, often through binding to complementary sequences on target messenger RNA transcripts (mRNAs), thereby resulting in translational repression, target mRNA degradation and/or gene silencing. For example, as described in WO/2014/028493, miR146a exhibits over a 250-fold increased expression in CDCs, and miR210 is upregulated approximately 30-fold, as compared to the exosomes isolated from normal human dermal fibroblasts.

Exosomes derived from cardiospheres and CDCs are described in, e.g., WO/2014/028493, the disclosures of which are herein incorporated by reference in their entirety. Methods for preparing exosomes can include the steps of: culturing cardiospheres or CDCs in conditioned media, isolating the cells from the conditioned media, purifying the exosome by, e.g., sequential centrifugation, and optionally, clarifying the exosomes on a density gradient, e.g., sucrose density gradient. In some instances, the isolated and purified exosomes are essentially free of non-exosome components, such as components of cardiospheres or CDCs. Exosomes can be resuspended in a buffer such as a sterile PBS buffer containing 0.01-1% human serum albumin. The exosomes may be frozen and stored for future use.

Exosomes can be collected, concentrated and/or purified using methods known in the art. For example, differential centrifugation has become a leading technique wherein secreted exosomes are isolated from the supernatants of cultured cells. This approach allows for separation of exosomes from larger extracellular vesicles and from most non-particulate contaminants by exploiting their size. Exosomes can be prepared as described in a wide array of papers, including but not limited to, Fordjour et al., "A shared pathway of exosome biogenesis operates at plasma and endosome membranes", bioRxiv, preprint posted Feb. 11, 2019, at https://www.biorxiv.org/content/10.1101/545228v1; Booth et al., "Exosomes and HIV Gag bud from endosome-like domains of the T cell plasma membrane", *J Cell Biol.*, 172:923-935 (2006); and, Fang et al., "Higher-order oligomerization targets plasma membrane proteins and HIV gag to exosomes", *PLoS Biol.*, 5:e158 (2007). Exosomes using a commercial kit such as, but not limited to the ExoSpin™ Exosome Purification Kit, Invitrogen® Total Exosome Purification Kit, PureExo® Exosome Isolation Kit, and ExoCap™ Exosome Isolation kit. Methods for isolating exosome from stem cells are found in, e.g., Tan et al., *Journal of Extracellular Vesicles*, 2:22614 (2013); Ono et al., Sci Signal, 7(332):ra63 (2014) and U.S. Application Publication Nos. 2012/0093885 and 2014/0004601. Methods for isolating exosome from cardiosphere-derived cells are found in, e.g., Ibrahim et al., Exosomes as critical agents of cardiac regeneration triggered by cell therapy, Stem Cell Reports, 2014. Specific methodologies include ultracentrifugation, density gradient, HPLC, adherence to substrate based on affinity, or filtration based on size exclusion.

Size exclusion allows for their separation from biochemically similar, but biophysically different microvesicles, which possess larger diameters of up to 1,000 nm. Differences in flotation velocity further allows for separation of differentially sized exosomes. In general, exosome sizes will possess a diameter ranging from 30-200 nm, including sizes of 40-100 nm. Further purification may rely on specific properties of the particular exosomes of interest. This includes, e.g., use of immunoadsorption with a protein of interest to select specific vesicles with exoplasmic or outward orientations.

Among current methods, e.g., differential centrifugation, discontinuous density gradients, immunoaffinity, ultrafiltration and high performance liquid chromatography (HPLC), differential ultracentrifugation is the most commonly used for exosome isolation. This technique utilizes increasing centrifugal force from 2000×g to 10,000×g to separate the medium- and larger-sized particles and cell debris from the exosome pellet at 100,000×g. Centrifugation alone allows for significant separation/collection of exosomes from a conditioned medium, although it is insufficient to remove various protein aggregates, genetic materials, particulates from media and cell debris that are common contaminants. Enhanced specificity of exosome purification may deploy sequential centrifugation in combination with ultrafiltration, or equilibrium density gradient centrifugation in a sucrose density gradient, to provide for the greater purity of the exosome preparation (flotation density 1.1-1.2 g/mL) or application of a discrete sugar cushion in preparation.

Importantly, ultrafiltration can be used to purify exosomes without compromising their biological activity. Membranes with different pore sizes—such as 100 kDa molecular weight cutoff (MWCO) and gel filtration to eliminate smaller particles—have been used to avoid the use of a nonneutral pH or non-physiological salt concentration. Currently available tangential flow filtration (TFF) systems are scalable (to >10,000 L), allowing one to not only purify, but concentrate the exosome fractions, and such approaches are less time consuming than differential centrifugation. HPLC can also be used to purify exosomes to more uniformly sized particle preparations and preserve their biological activity as the preparation is maintained at a physiological pH and salt concentration. Other chemical methods have exploit differential solubility of exosomes for precipitation techniques, addition to volume-excluding polymers (e.g., polyethylene glycols (PEGs)), possibly combined additional rounds of centrifugation or filtration. For example, a precipitation reagent, ExoQuick®, can be added to conditioned cell media to quickly and rapidly precipitate a population of exosomes, although re-suspension of pellets prepared via this technique may be difficult. Flow field-flow fractionation (FlFFF) is an elution-based technique that is used to separate and characterize macromolecules (e.g., proteins) and nano- to micro-sized particles (e.g., organelles and cells) and which has been successfully applied to fractionate exosomes from culture media.

Beyond these techniques relying on general biochemical and biophysical features, focused techniques may be applied to isolate specific exosomes of interest. This includes relying on antibody immunoaffinity to recognizing certain exosome-associated antigens. As described, exosomes further express the extracellular domain of membrane-bound receptors at the surface of the membrane. This presents a ripe opportunity for isolating and segregating exosomes in connections with their parental cellular origin, based on a shared antigenic profile. Conjugation to magnetic beads, chromatography matrices, plates or microfluidic devices allows isolating of specific exosome populations of interest as may be related to their production from a parent cell of interest or associated cellular regulatory state. Other affinity-capture methods use lectins which bind to specific saccharide residues on the exosome surface.

10 KDa & 1000 KDa Method

CDC-EV (10 KDa 5 or 1000 KDa) drug substance is obtained after filtering CDC conditioned medium (CM) containing EVs through a 10 KDa or 1000 KDa pore size filter, wherein the final product, composed of secreted EVs and concentrated CM, is formulated in PlasmaLyte A by diafiltration and stored frozen.

MSC-EVs

EVs originating from human bone marrow mesenchymal stem cells (MSC-EVs) are obtained after filtering MSC CM containing EVs through a 10 KDa pore size filter following a similar process as for CDC-EV production. MSC-EVs are a non-cellular, filter sterilized product obtained from human MSCs cultured under defined, serum-free conditions. The final product, composed of secreted EVs and concentrated CM, is formulated in PlasmaLyte A and stored frozen. The frozen final product is "ready to use" for direct subconjunctival injection after thawing.

Examples

It will be appreciated by persons skilled in the art that numerous variations and/or modifications may be made to the present invention as shown in the specific embodiments without departing from the spirit or scope of the present invention as broadly described. The present embodiments are, therefore, to be considered in all respects as illustrative and not restrictive. In order that the present invention may be readily understood and put into practical effect, particular preferred embodiments will now be described by way of the following non-limiting examples.

Cell Culture 293F cells (Gibco, Cat. #51-0029) were tested for pathogens and found to be free of viral (cytomegalovirus, human immunodeficiency virus I and II, Epstein Barr virus, hepatitis B virus, and parvovirus B19) and bacterial (*Mycoplasma*) contaminants. Cells were maintained in FreeStyle 293 Expression Medium (Gibco, Cat. #12338-018) and incubated at 37° C. in 8% $CO_2$. For exosome production, 293F cells were seeded at a density of $1.5 \times 10^6$ cells/ml in shaker flasks in a volume of ~¼ the flask volume and grown at a shaking speed of 110 rpm. HEK293 cells were grown in Dulbecco's modified Eagle's medium (DMEM) supplemented with 10% fetal calf serum.

Exosome Purification 293F cells were grown in shaker cultures for a period of three days. Cells and large cell debris were removed by centrifugation at 300×g for 5 minutes followed by 3000×g for 15 minutes. The resulting supernatant was passed through a 0.22 μm sterile filtration filter unit (Thermo Fisher, Cat. #566-0020) to generate a clarified tissue culture supernatant (CTCS). The CTCS was concentrated by centrifugal filtration (Centricon Plus-70, Ultracel-PL Membrane, 100 kDa size exclusion, Millipore Sigma, Cat. #UFC710008), with ~120 mls CTCS concentrated to ~0.5 mls. Concentrated CTCS was then purified by size exclusion chromatography (SEC) in 1×PBS (qEV original columns/35 nm: Izon Science, Cat. #SP5), with the exosomes present in each 0.5 ml starting sample eluting in three 0.5 ml fractions. Purified exosomes were reconcentrated using Amicon® Ultra-4 100 kDa cutoff spin columns (Cat. #UFC810024). This process yielded a population of exosomes/small EVs that have the expected ultrastructure and size distribution profile of human exosomes and contain the exosomal marker proteins CD9 and CD63 (FIG. 1), at a concentrating effect of ~500-fold, to a final concentration of ~$2 \times 10^{12}$ exosomes/ml, representing an average recovery of 35%.

Figures 13, 14:
FIG. 13 schematically shows how exosomes were derived from suspension cultures of 293F cells.
FIG. 14 schematically shows that four groups (6 mice/group) of 13 weeks old male C57BL6 mice (the Jackson Labs) were used in all vaccination experiments as described herein.

Exosome Derivation with Reference to FIG. 13

Exosomes were derived from suspension cultures of 293F cells at concentration of $1.5 \times 10^6$ cells/mL (e.g., Thermo Fisher Cat. #R79007) grown for 3 days in chemically defined 500 mLs media (e.g., FreeStyle™) in tissue culture shaker (110 rpm) flasks (FIG. 13). Following removal of cells and large cell debris by progressive centrifugation at 500×g (5 mins), the conditioned media was clarified by passage the total volume of 500 mLs through a 0.22 micron sterile filtration unit. Exosomes were recovered from this clarified tissue culture supernatant/conditioned media (CTCS/CM) by concentrating the volume using filtration, size exclusion chromatography, and a second round of concentrating filtration. The Exosomes were collected into total volume of 500 uls. The concentration and size was measured using NanoSight technology.

Nanoparticle Tracking Analysis (NTA)

Vesicle concentrations and size distribution profiles of exosome preparations were measured by nanoparticle tracking analysis (NTA) using a NanoSight NS300 (Malvern Panalytical, United Kingdom) in 1×PBS clarified by filtration through a 0.22 μm sterile filtration unit. Measurements were carried out in triplicates at ambient temperature with fixed camera settings (level of 14, screen gain of 10, detection threshold 3, and temperature of 21.7-22.2° C.). Immunostaining nanoparticle tracking analysis (NTA) was performed using fluorescently labeled antibody conjugate directed against human CD63 (AlexaFluor488-conjugated clone 460305; R&D Systems (Minneapolis, USA)). The fluorescently labeled anti-CD63-antibody (1 μl) was incubated with exosomes (9 μl) for 2 hours at room temperature in the dark, then diluted by addition of 1 ml of sterile-filtered PBS (Thermo Fisher, USA) and examined for exosome abundance, size, and CD63 immunoreactivity using a Particle Metrix ZetaView® TWIN device. Samples were visualized in scatter mode using the 488 nm laser and standard instrument settings (sensitivity: 80, shutter: 100, min. brightness: 30; min. area: 10; max. area: 1000) in fluorescence mode with standard fluorescence settings (sensitivity: 88, shutter: 100, min. brightness: 25; min. area: 10; max. area: 1000). The resulting videos were analysed with the ZetaView® software 8.05.10 (Particle Metrix, Germany).

Immunoblots

Exosomes and cell lysates were separated by SDS-PAGE using pre-cast, 4-15% gradient gels (Bio-Rad, Cat. #4561086) and transferred to PVDF membranes (ThermoFisher, Cat. #88518). Membranes were blocked, and probed using antibodies directed against CD9 (clone HI9a; BioLegend), CD63 (MX-49.129.5), CD81 (555675; BD Pharmingen), or HSP90 (sc-13119; Santa Cruz Biotechnology), then washed, exposed to HRP-conjugates of goat secondary antibodies (Jackson Immunoresearch), washed, and processed for chemiluminescence imaging using HRP-activated chemiluminescence detection solution (Amersham ECL Western Blotting Detection Reagents; Cat. #RPN2106), and imaged using a GE Amersham Imager 600. Images were exported as JPEG files, analyzed using ImageJ software, and processed using Photoshop (Adobe).

Electron Microscopy and Light Microscopy

Exosomes were fixed by addition of formaldehyde to a final concentration of 4%. Carbon-coated grids were placed on top of a drop of the exosome suspension. Next, grids were placed directly on top of a drop of 2% uranyl acetate. The resulting samples were examined with a Tecnai-12 G2 Spirit Biotwin transmission electron microscope (Johns Hopkins University, USA). Fluorescence micrographs of Antares2 expression in transfected HEK293 cells were captured as PNG files using an EVOS M7000 microscope equipped with an Olympus UPlanSAPo 40×/0.95 objective.

Production of mRNA-Loaded Exosomes and LNPs mRNAs were obtained from a commercial provider (Trilink). mRNAs were purified using RNeasy columns (Qiagen) and resuspended in DNase-free, RNase-free water using nuclease-free tips and tubes. Purified mRNAs were pre-incubated with a coating of polycationic lipids and then mixed with equal amounts of either purified exosomes or LNPs (DOTAP/DOPE, Cat. #F50102, FormuMAx Scientific Inc) at 4° C. for 10 minutes. Formulations were either used immediately or frozen at −80° C. and thawed rapidly prior to use.

mRNA Synthesis mRNA synthesis was programmed by synthetic genes designed to encode AOIs that are (i) displayed at the cell surface, (ii) expressed in the cell cytoplasm, or (iii) displayed within and/or on the surface of exosomes, other extracellular vesicles, and/or in endosomes. This is accomplished by expressing AOIs in their native forms, in forms that are synthesized in the cytoplasm, or are targeted to exosomes and/or endosomes, by removing targeting information from the antigen(s) or by fusing them to proteins that target them to the cytoplasm, to endosomes, to exosomes, or to other extracellular vesicles. For optimal mRNA synthesis in vitro and optimal protein translation in vivo, each synthetic gene is created so that it contains a codon-optimized ORF, an optimized 3'UTR, an optimized 5'UTR, and a polyadenylated tail. mRNAs synthesis is carried out in an in vitro transcription and processing system using modified reagents (e.g. ribonucleotides, capping substrates, enzymes, etc.) to ensure (i) high-level mRNA synthesis, (ii) resistance of the mRNA to nuclease digestion, and (iii) high-level translation in human cells.

The cognate mRNAs according to SEQ ID NOs:11-13 were synthesized in a fully processed form, and modified to resist ribonucleases.

RNA Loading mRNAs were purified using RNeasy (Qiagen) and resuspended in DNase-free, RNase-free water using nuclease-free tips and tubes. RNAs were then combined with different combinations and amounts of polycationic lipids and exosomes, as well as in different orders of addition. RNA loading of exosomes for vaccine formulation involved premixing of mRNAs with polycationic lipids followed by addition of exosomes.

Combination with Lipofection Reagents

Exosomes and mRNAs were combined with mRNA MAX transfection reagent and incubated to form the vaccination reagent, e.g., a suspension of exosome-mRNA-lipid hybrid, or an exosome-liposome hybrid vesicle loaded with, or combined with, synthetic mRNAs, that combines (i) the protective and anti-inflammatory properties of exosomes with (ii) the cell membrane-penetrating properties of lipofection reagent lipids. The ratios and amounts of exosome, mRNA, and lipofectamine, were optimized using mRNAs designed to express luciferase and/or fluorescent proteins, and the expression of these reporters were tested in (a) cultured human cells, and (b) mice injected intramuscularly, and their expression was assayed by histology 1 week later on both ipsilateral and contralateral muscles. Once formed, the vaccination reagent was stored in liquid form.

Luciferase Measurements and Bioluminescent Imaging

HEK293 cells were incubated with exosome-RNA formulations overnight under standard culture conditions. Antares2 luciferase activity was measured by live cell bioluminescence after incubating with substrate diphenylterazine (MCE, Cat. #HY-111382) at final concentration of 50 µM for 3 minutes. Readings were collected using a SpectraMax i3x (Molecular Devices). Fluorescence micrographs of Antares2 expression in transfected HEK293 cells were captured as PNG files using an EVOS M7000 microscope equipped with an Olympus UPlanSApo 40×/0.95 objective.

For in vivo studies, thirteen months-old, female Balb/c mice (Jackson Laboratory) housed under pathogen-free conditions at the Cedars-Sinai Medical Center animal facility were used to study the expression of exosome-Anteres2 mRNA expression 24 hours after injection. Intramuscular injections were at a volume of 50 µls per mouse containing 5 µg mRNA. After 24 hours the animals were imaged using an IVIS Spectrum imager (PerkinElmer, Waltham, MA) (All animal experimentation was performed following institutional guidelines for animal care and were approved by the Cedars-Sinai Medical Center IACUC (#8602).

Sequences for the Antares2 ORF and protein are provided in Table 1 as SEQ ID NO:14 and SEQ ID NO:15, respectively.

Animal Experimentation

All animal experimentation was performed following institutional guidelines for animal care and were approved by the Cedars-Sinai Medical Center IACUC (#8602). All injections were at a volume of 50 µls. Experiments involved injection of exosomes, LNPS, and Antares2 mRNA-loaded exosomes were performed with BALB/c mice (Jackson Laboratory). Immunization with mRNA-loaded exosomes were performed on thirteen weeks-old, male C57BL/6J mice (Jackson Laboratory) housed under pathogen-free conditions at the Cedars-Sinai Medical Center animal facility. Blood (~0.1 ml) was collected periodically from the orbital vein. At day 84, mice were deeply anesthetized using isoflurane, euthanized by cervical dislocation, and processed using standard surgical procedures to obtain spleen, lung, brain, heart, liver, kidney, muscle, and other tissues. Spleens were processed for splenocyte analysis, and all tissues were processed for histological analysis by fixation in 10% neutral buffered formalin. Histological analysis was performed by the service arm of the HIC/Comparative Pathology Program of the University of Washington.

Immunization with Reference to FIG. 13 and FIG. 14

Exosomes (XO) were combined with mRNAs and loading agent to create a nucleic acid vaccine (NAV) for SARS-CoV-2. This vaccine was administered intramuscularly in C57BL6 mice to study the host immune responses against the antigen (FIG. 13). Four groups (6 mice/group) of 13 weeks old male C57BL6 mice (the Jackson Labs) were used in all vaccination experiments. Animals were housed under specific pathogen-free conditions in the Cedars-Sinai Medical Center's animal facility. All animal experiments were performed in accordance with national and institutional guidelines for animal care and which was approved by the IACUC of the Cedars-Sinai Medical Center's animal facility. Mice were divided into four groups, with the group 1—XO-NAV (0 μg/mouse), group 2—XO-NAV (8 μg/mouse), group 3—XO-NAV (2 μg/mouse), and group 4—XO-NAV (0.5 μg/mouse) (FIG. 14). Equal amounts of the (i) spike-encoding mRNA and (ii) L-$S_{RBD}$NME-L were used. Thus, in the "8 μs" dose there was only 4 μg of each mRNA. Mice was deeply anesthetized with isofluorane and immunized by intramuscular injection (50 μls) in the quadriceps muscle. Each group received treatment three times at seven-day intervals after sequential bleeds. Two weeks after each treatment mice was anesthetized with ketamine-xylazine, and 100 μls blood was drawn by retro-orbital bleeding to extract plasma. The plasma was collected to study adaptive immune response. The humoral and cellular immune response was determined by antigen-specific IgG ELISA and Flow Cytometry assays.

The loading and expression experiments in cultured cells were performed with an mRNA designed to express the Antares2 protein. This is a complex fusion protein. In the middle is a mutant form of NanoLuc, a luciferase, which is flanked by two copies of a long wavelength-emitting fluorescent protein. The primary purpose of the Antares2 mRNA is to provide a flexible reporter for measuring functional mRNA delivery in cells, organoids, and animals. The flexibility arises from the ability to detect Antares2 expression by (a) fluorescence microscopy of cells, tissues, and organs, (b) luciferase assay of cell and tissue lysates, and (c) in vivo bioluminescent imaging in live animals following injection of its substrate, diphenylterazine.

ELISA for SARS-CoV-2 Antigen-Specific Antibody Responses

Mouse IgG antibody production against SARS-CoV-2 antigens was measured by enzyme-linked immunosorbent assays (ELISA). For antigens S1 (RBD) and N, pre-coated ELISA plates from RayBiotech were utilized (IEQ-CoV S RBD-IgG; IEQ-CoVN-IgG), and the experiments were performed according to the manufacturer's instructions, with modification. Briefly, mouse plasmas at dilutions of 1:50 were added to antigen pre-coated wells in duplicates and incubated at room temperature (RT) for 2 hours on a shaker (200 rpm). The plates were washed 4 times with washing buffer followed by blocking for 2 hours at RT with 1% BSA in PBS. Mouse antibodies bound to the antigens coated on the ELISA plates were detected using HRP-conjugated goat anti-mouse secondary antibodies (Jackson Immuno Research Inc.). Plates were washed 4 times with washing buffer, and developed using TMB substrate (RayBiotech). Microplate Reader was used to measure the absorbance at 650 nm (SpectraMaxID3, Molecular Devices, with SoftMax Pro7 software).

Figure 15:
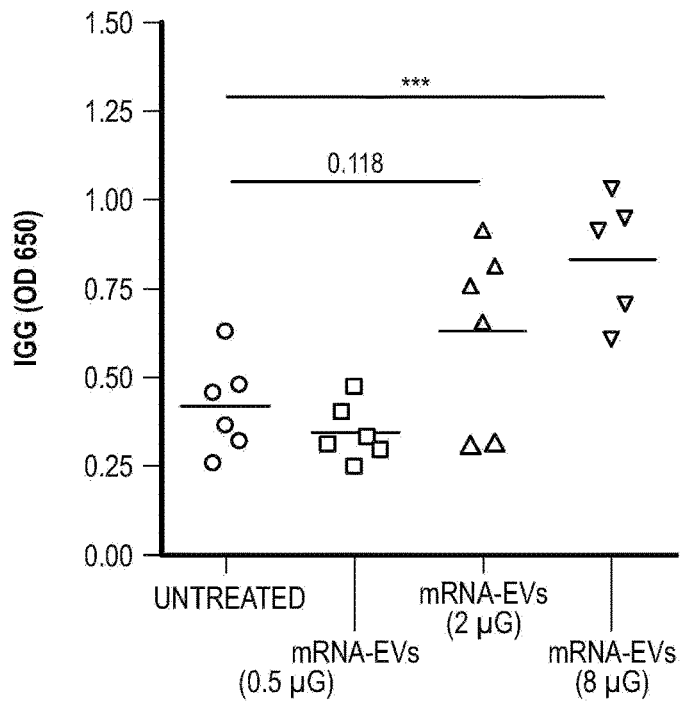
FIG. 15 shows that LSNME/S$^{W1}$ vaccination leads to IgG antibody response to the SARS-CoV-2 spike protein.
Figure 16:
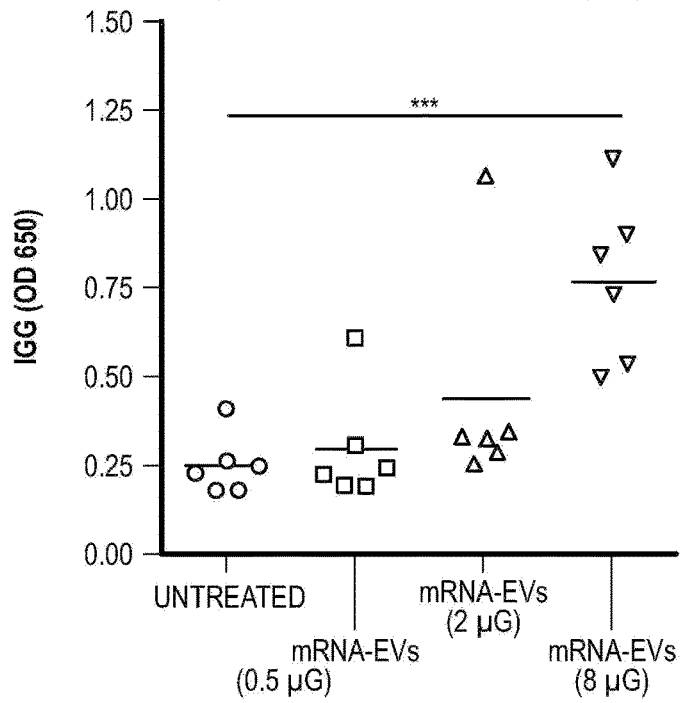
FIG. 16 shows that LSNME/S$^{W1}$ vaccination leads to IgG antibody response to the SARS-CoV-2 nucleocapsid protein.

ELISA for Anti-Viral IgG Responses with Reference to FIG. 15 and FIG. 16

Host antibody production against NAV was measured by ELISA. Commercially available precoated plates with viral peptides were purchased (Ray Biotech) to detect antibody production against NAV in the present inventors' mouse model. Mouse plasmas at varying dilutions was added to antigen-coated wells and incubated at room temperature for 2 hours with shaking. Plates were washed three times with 0.05% PBS Tween™ 20, and antigen-specific IgG antibodies were detected using horseradish peroxidase-conjugated goat anti-mouse IgA, IgG, IgG1, IgG2b, or IgG2a (Jackson ImmunoResearch Inc.). The signal was developed using the SureBlue TMB microwell peroxidase substrate (Kirkegaard & Perry Laboratories, Inc.). Plates were analyzed using a 96-well plate absorbance reader at 650 nm. Endpoint titers were calculated as the highest dilutions with more than twice the background absorbance of control wells. For the quantification of total IgG, a standard curve was used with known amounts of purified mouse IgG.

The avidity of antibodies against the viral peptide corresponding to NAV was determined by a particle disruption ELISA assay using the chaotropic agent sodium thiocyanate (NaSCN). The binding of viral peptide and incubation with mouse plasma was performed as described above. Plates were washed three times with 0.05% PBS Tween™ 20, and the chaotropic agent NaSCN, diluted in PBS, was added to replicate wells (0, 1, 2, 3, 4, or 5 M). Plates were first incubated at room temperature for 30 minutes, and then washed six times with PBS Tween™ 20. Subsequent ELISA steps were performed as detailed above. The avidity index for each mouse sample was recorded as the mean molarity of NaSCN that reduces the optical density at 650 nm (OD650) by 50% of that of wells treated with PBS. The experimental data are shown in FIG. 15 and FIG. 16.

Single Cell Splenocyte Preparation

After terminal blood collection, mice were euthanized, and fresh spleens were harvested. Single cell splenocyte preparation was obtained by machinal passage through a 40 μm nylon cell strainer (BD Falcon, Cat. #352340). Erythrocytes were depleted using ammonium-chloride-potassium (ACK) lysis buffer (Gibco, Cat. #A10492-01), and splenocytes were washed using R10 media by centrifuging at 300×g for 5 minutes at RT. R10 media (RPMI 1640 media (ATCC, Cat. #302001) supplemented with 10% fetal bovine serum (FBS) (Atlas, Cat. #E01C17A1), 50 μM 2-mercaptoethanol (Gibco, Cat. #21985-023), penicillin/streptomycin (VWR Life Sciences, Cat. #K952), and 10 mM HEPES (Gibco, Cat. #15630-080)) was used for all analyses of blood cells. The cells were resuspended in fresh R10 media and counted in hemocytometer counting chamber to be used in subsequent experiments.

Spleen Lymphocyte Population Characterization

Splenocytes ($2\times10^5$ cells/mouse) were resuspended in 100 μl of 10% FBS in 1×PBS and incubated with fluorochrome-conjugated antibodies for surface staining of CD3 (Invitrogen, Cat. #17-0032-82), CD4 (Biolegend, Cat. #100433), CD8 (Biolegend, Cat. #100708), B220 (BD, Cat. #552771), CD11c (Invitrogen, Cat. #17-0114-81), F4/80 (Invitrogen, Cat. #MF48004), Ly6G (Invitrogen, Cat. #11-9668-80), and Ly6C (BD, Cat. #560592)) for 30 minutes at 4° C. in the dark. Following incubation, samples were washed twice with 200 μls of 10% FBS in 1×PBS and centrifuged at 300×g for 5 minutes at RT to remove unbound antibodies. Next the cells were fixed with 100 μls of ICS fixation buffer (Invitrogen, Cat. #00-8222-49). Samples were analyzed on a FACS Canto II (BD Biosciences) with 2,000-10,000 recorded lymphocytes. The data analysis was performed using FlowJo 10 software (FlowJo, LLC) and presented as a percentage change in the immune cell population compared to the vehicle-treated group.

SARS-CoV-2 Antigen-Specific T Cell Proliferation Assay Using CFSE

Splenocytes were resuspended at $10^6$ cells/ml in 10% FBS in 1×PBS and stained with carboxyfluorescein succinimidyl ester (CFSE) (Invitrogen, Cat. #C34554) by rapidly mixing equal volume of cell suspension with 10 μM CFSE in 10% FBS in 1×PBS for 5 minutes at 37° C. The labeled cells were washed three times with R10 complete medium. The cells were incubated for 96 hours in the presence of 10 μg/mL SARS-CoV-2 antigens N or 51 (Acro Biosystems, Cat. #NUN-05227; SIN-052H4) or medium alone as negative control. After 96 hours, cells were washed with 200 μls of 10% FBS in 1×PBS and centrifuged at 300×g for 5 minutes at RT. Cells were then stained with anti-CD3-APC (Invitrogen, Cat. #17-0032-82), anti-CD4-PerCP-Cy5.5 (Biolegend, Cat. #100433), and anti-CD8-PE antibodies (Biolegend, Cat. #MCD0801) for 30 minutes at 4° C. The stained cells were washed twice with 200 μls of 1×PBS and analyzed on a FACS Canto II (BD Biosciences). For analysis, lymphocytes were first gated for $CD3^+$ T-cells, then for $CD4^+/CD8^-$ or $CD8^+/CD4^-$ populations. The data analysis was performed using FlowJo 10 software.

Intracellular Staining for Cytokines $2.0\times10^5$ splenocytes/mouse were incubated for 72 hours in the presence of 10 μg/mL SARs-CoV-2 antigens N or S1 (Acro Biosystems) or R10 medium alone (negative control). After 72 hours, the cells were washed with fresh R10 medium and incubated with phorbol myristate acetate (PMA) at concentration of 50 ng/mL (Sigma, Cat. #P1585), ionomycin at concentration of 350 ng/mL (Invitrogen, Cat. #124222), and GogiPlug at concentration of 0.8 μl/mL (Invitrogen, Cat. #51-2301KZ) for 4 hours to amplify cytokine expression in T cells. The cells were then washed with 10% FBS in 1×PBS and stained with anti-CD3-APC, anti-CD4-PerCP-Cy5.5, and anti-CD8-PE antibodies (added above) for 30 minutes at 4° C. in dark. The cells were washed twice with 1×PBS followed by permeabilization step using ready-to-use buffer (Invitrogen, Cat. #00-8333-56). Next the cells were fixed with ICS fixation buffer (added above) for 10 minutes at RT in dark and stained intracellularly for IFN-γ (eBioscience, Cat. #11-7311-82), IL-10 (eBioscience, Cat. #11-7101-82), IL-4 (Invitrogen, Cat. #12-7041-41), and Foxp3 (Invitrogen, Cat. #12-5773-80) overnight at 4° C. in permeabilization buffer. The stained cells were analyzed on a BD FACS Canto II with 5,000-10,000 recorded lymphocytes. The data analysis was performed using FlowJo 10 software.

Statistical Analysis

Statistical analysis was performed using GraphPad Prism 8 software for Windows/Mac (GraphPad Software, La Jolla, CA) or Excel. Results are reported as mean±standard deviation or mean±standard error, and the differences were analyzed using Student's t-test or one-way analysis of variance.

Figure 2:
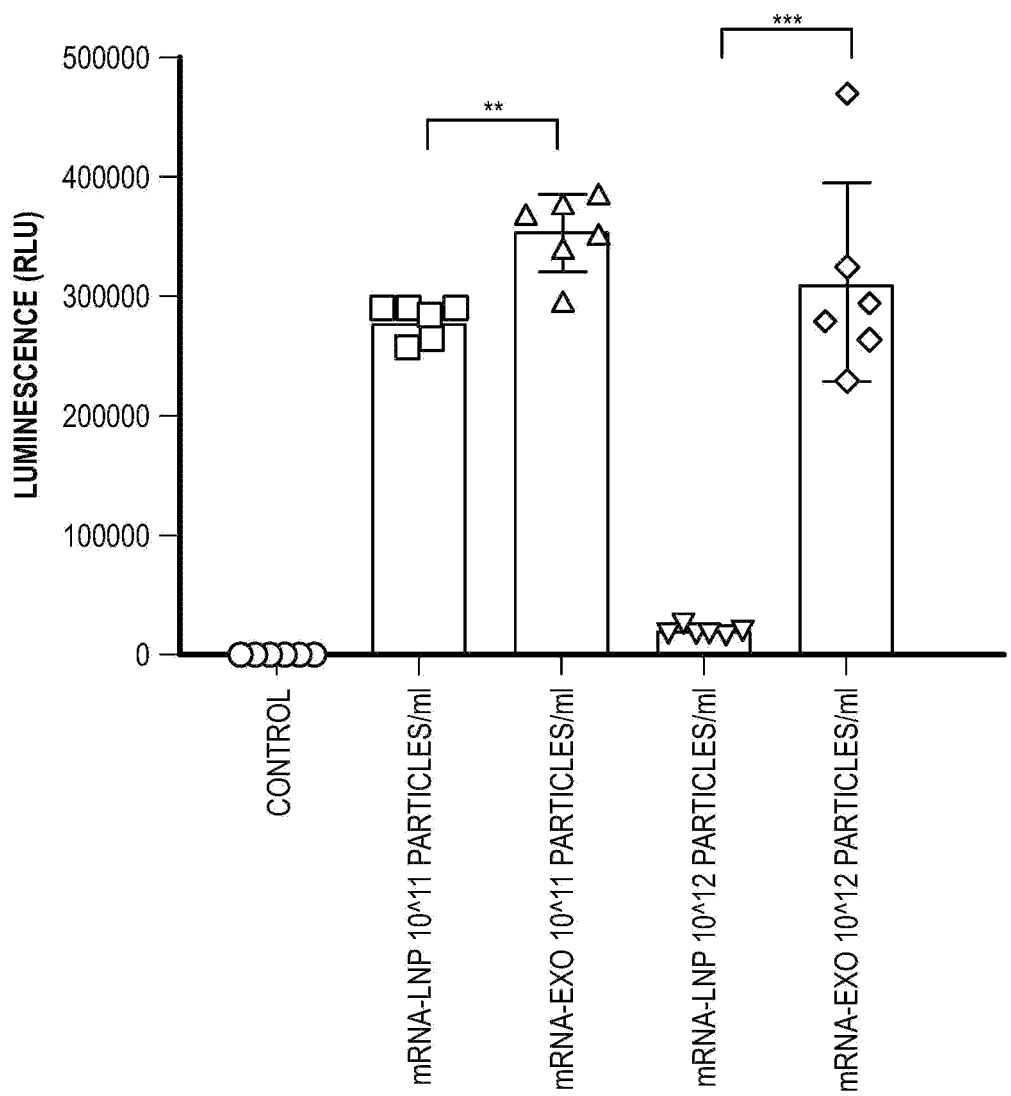
FIG. 2 shows that exosomes display superior mRNA delivery characteristics. Relative luciferase activities (average+/−standard error of the mean) of cells treated with low or high concentrations of mRNA-loaded exosomes or mRNA-loaded LNPs.
Figure 4A:
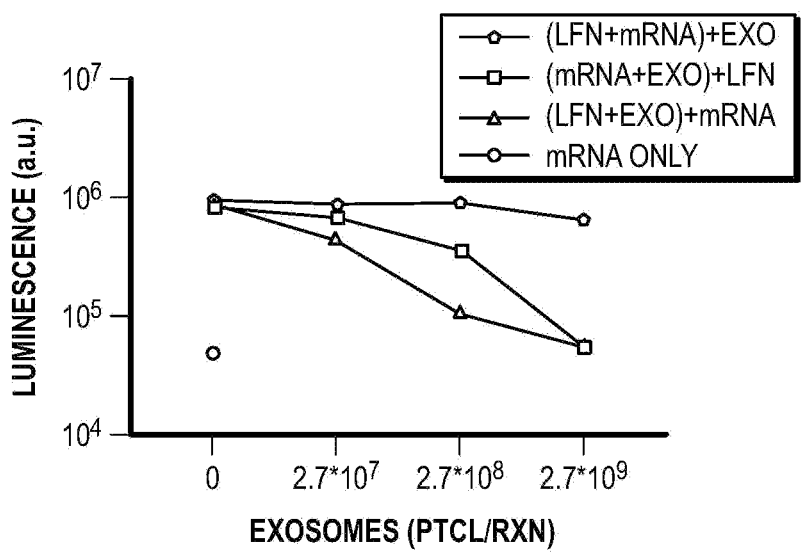
FIGS. 4A-4C shows Antares2 expression levels following exposure to exosome-RNA formulations.
Figure 4B:
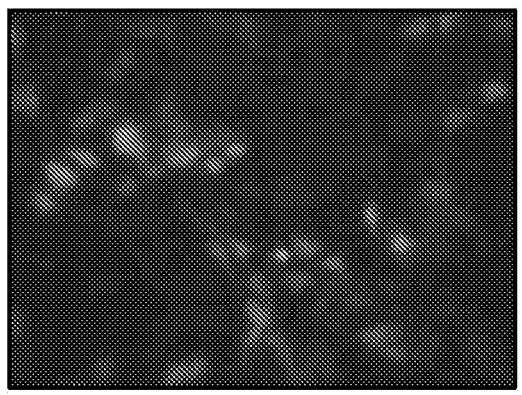
Figure 4C:
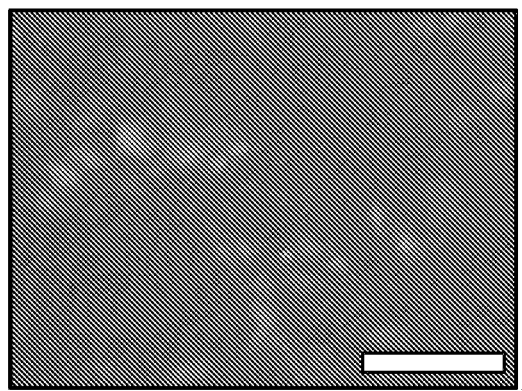

Exosomes Display Robust Ability to Deliver Functional mRNAs In Vitro and In Vivo Exosomes are capable of delivering functional RNAs to target cells, but so too are synthetic lipid vesicles, often referred to as lipid nanoparticles (LNPs). To better understand the dynamics of mRNA delivery by these two natural and synthetic forms of soluble vesicles, the present inventors generated matched formulations of mRNA-loaded exosomes and mRNA-loaded LNPs. Exosomes were purified from the culture of 293F cells (FIG. 1), LNPs were obtained from a commercial provider, and equal amounts of each (by vesicle number) were loaded with a synthetic mRNA encoding the hybrid luciferase/fluorescent protein Antares2 (Antares2 is comprised of the luciferase teLuc fused to two copies of the fluorescent protein CyOFP1 (CyOFP1-teLuc-CyOFP1), emits far-red shift light via bioluminescent resonance energy transfer). Equal amounts of these matched exo-mRNA and LNP-mRNA formulations were then incubated at low and high doses with human cells, followed by an overnight incubation to allow for Antares2 protein expression. The next day, the cells were incubated with diphenylterazine (DTZ), a cell-permeable substrate (luciferin) for Antares2, and assayed for DTZ-dependent, Antares2-catalyzed light emission (FIG. 2). At low-dose administration, Antares2 expression was 25% higher in cells treated with the exo-mRNA formulation than with the LNP-mRNA formulation (n=6, p=0.0016). The difference in Antares2 expression was even more pronounced at high-dose administration, as the exo-mRNA-treated cells expressed far more Antares2 activity than the LNP-exo-treated cells (16-fold; n=6; p=0.00035). Treated cells displayed high levels of Antares2 luciferase activity that was dependent on the specific order of component addition during the formulating process (FIG. 4).

Figure 3A:
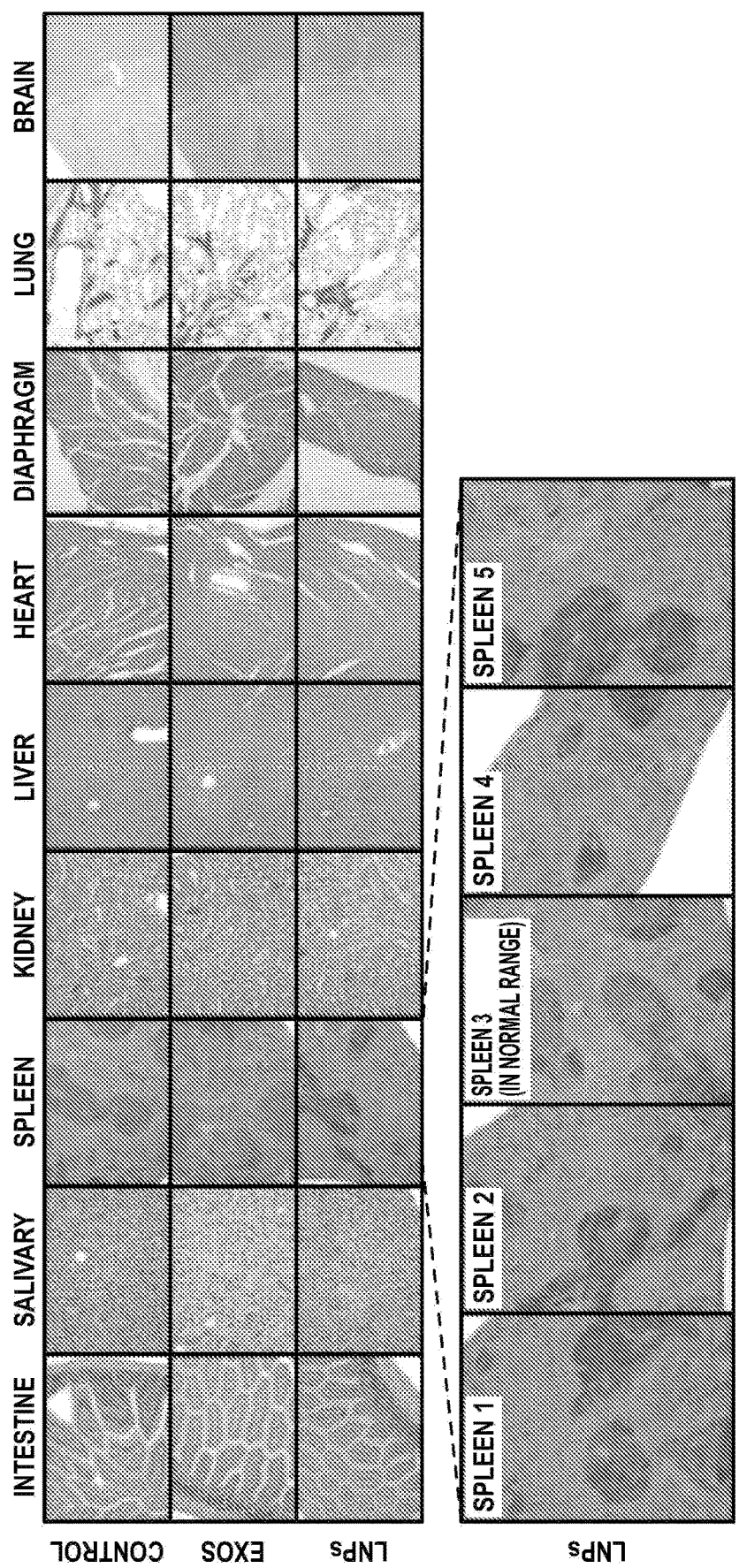
FIGS. 3A-3B shows the effect of exosome and LNP injections on organ histology and body mass.
Figure 3B:
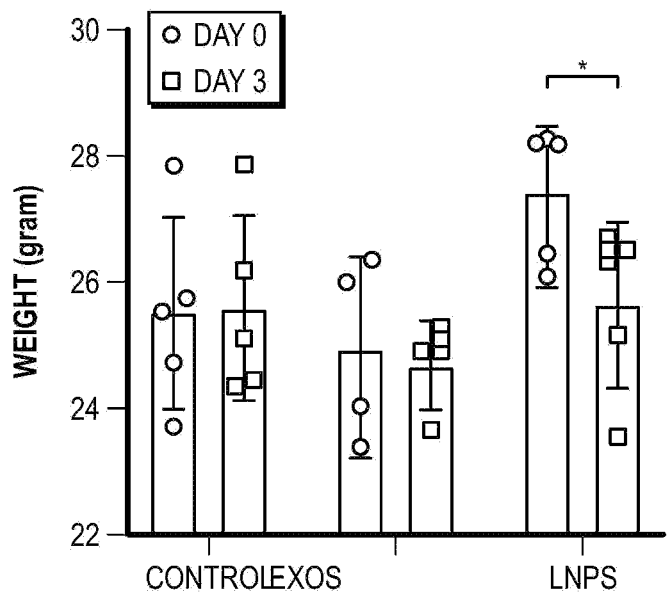

This large difference in particle-mediated Antares2 expression was caused by a drop in LNP-mRNA-mediated expression, raising the possibility that LNP administration is inhibitory at high levels of administration. This in turn raised the possibility of general toxicity of LNP administration, which the present inventors addressed by following the short-term consequences of exosome and LNP injections in mice. Animals were injected intramuscularly with equal numbers of either exosomes or LNPs (50 ml of ??? particles/ml), returned to their cages for three days, and then sacrificed and processed for organ histology by an independent testing laboratory (FIG. 3A). No abnormalities were detected in control animals (5/5) or in animals injected with exosomes (5/5). In contrast, only one of the LNP injected animals (1/5) displayed normal spleen histology, as 4/5 animals showed an increase in red pulp. Adverse LNP effects may also explain the ~5% reduction in body mass (n=5; p=0.05) observed at 3 days post-injection (FIG. 3B).

Figure 5:
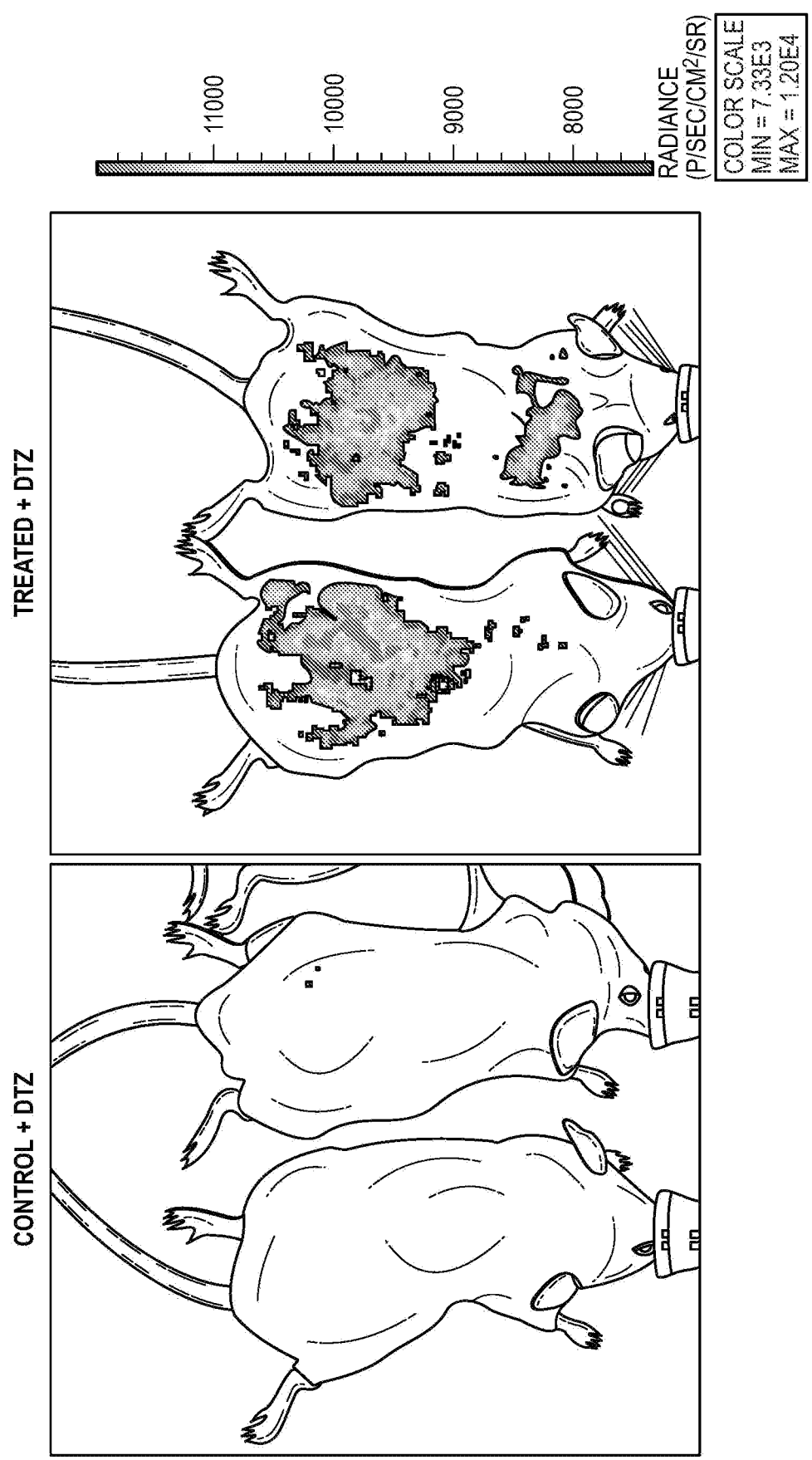
FIG. 5 shows real-time imaging of exosome-mediated, functional mRNA delivery. Combined bioluminescent and light images of control mice and treated mice immediately following i.p. administration of DTZ. Treated mice had been injected with Antares2 mRNA-loaded exosomes 24 hours prior to imaging. Radiance is in photons/second/area (cm$^2$)/steradian.

The robust expression of exosome-delivered mRNA in vitro and the absence of exosome-associated adverse effects led the present inventors to next test whether RNA-loaded exosomes might also be able to drive Antares2 expression in vivo. Towards this end, the present inventors injected adult mice (0.05 ml volume, intramuscular administration) with Antares2 mRNA-loaded exosomes, returned the animals to cages to allow for Antares2 expression. 24 hours later, the control (uninjected) and treated mice were injected (i.p.) with a solution of the Antares2 luciferin DTZ and imaged immediately using a real-time bioluminescent imaging (BLI) system to visualize exosome-mediated, mRNA-directed Antares2 expression. Control animals displayed no significant light emission upon DTZ injections whereas animals that had been injected with the mRNA-loaded exosome formulation displayed robust light emission (FIG. 5). These observations demonstrate that RNA-loaded exosomes can deliver functional mRNAs into cells in live animals in a way that leads to mRNA translation, protein expression, and directed enzyme activity.

Design and Validation of $S^{W1}$ and LSNME mRNAs

Figures 6A, 6B:
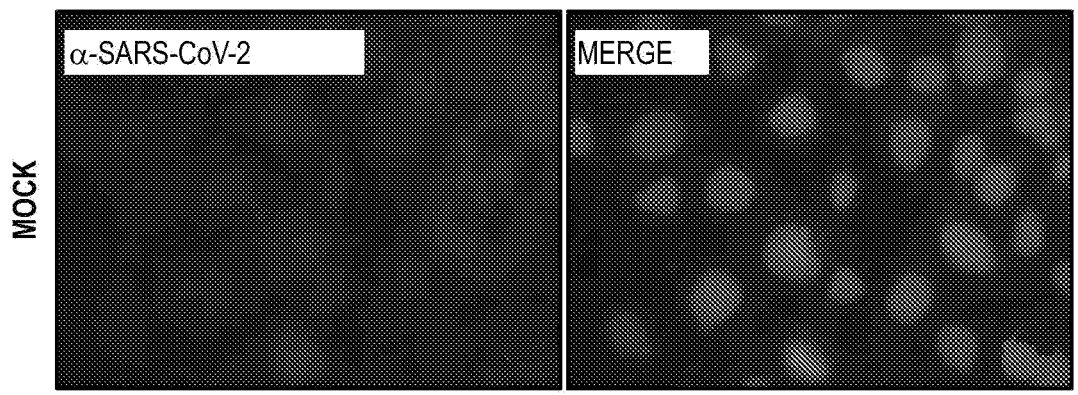
FIGS. 6A-6F shows expression of S$^{W1}$ and LSNME following mRNA transfection.
Figures 6C, 6D:
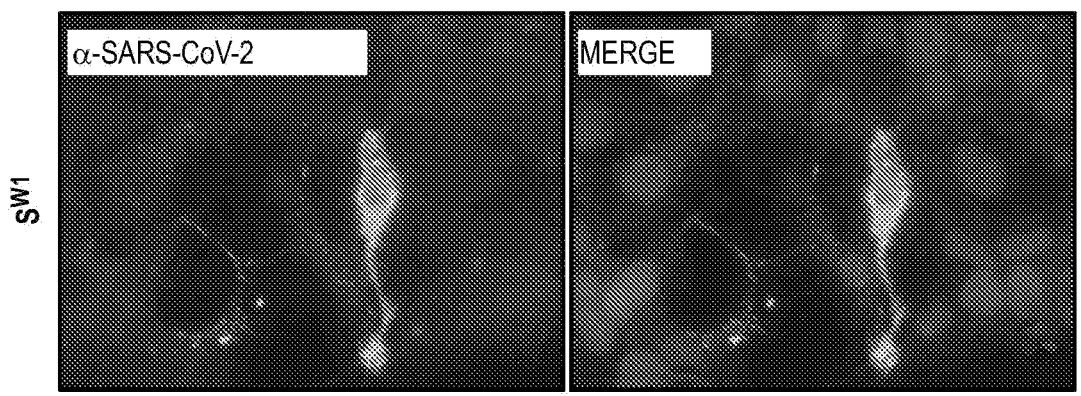
Figures 6E, 6F:
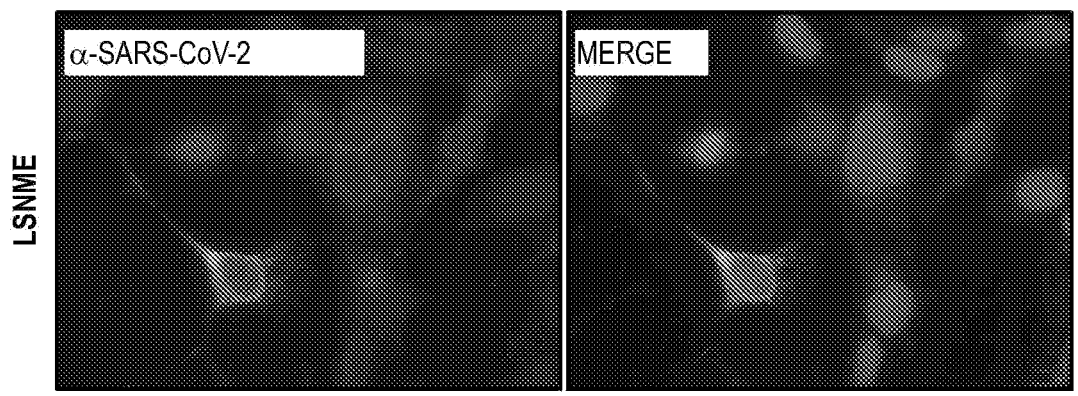
Figure 7A:
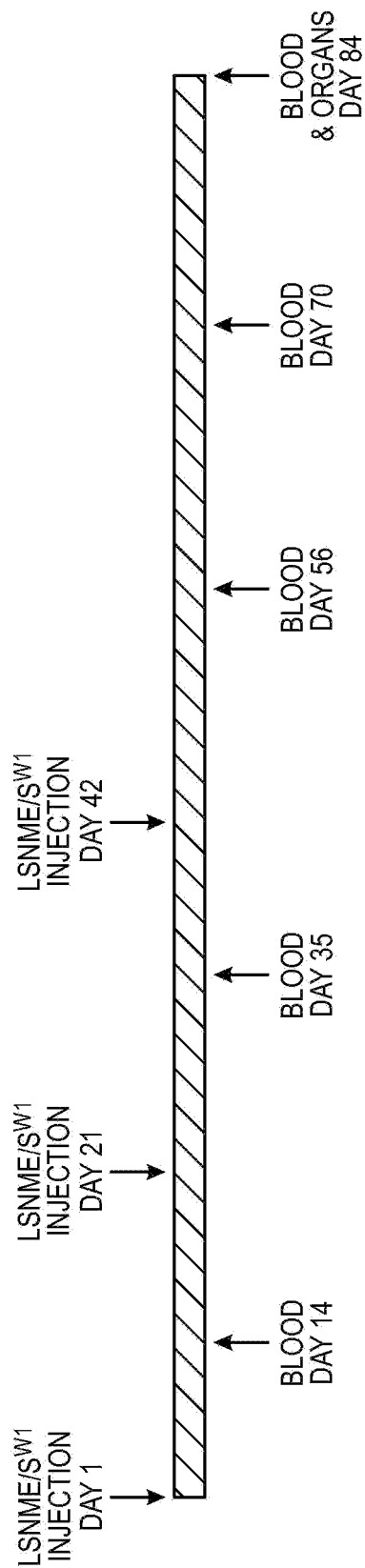
FIGS. 7A-7C shows that LSNME/S$^{W1}$ vaccination induces antibody responses to SARS-CoV-2 N and S proteins.
Figure 7B:
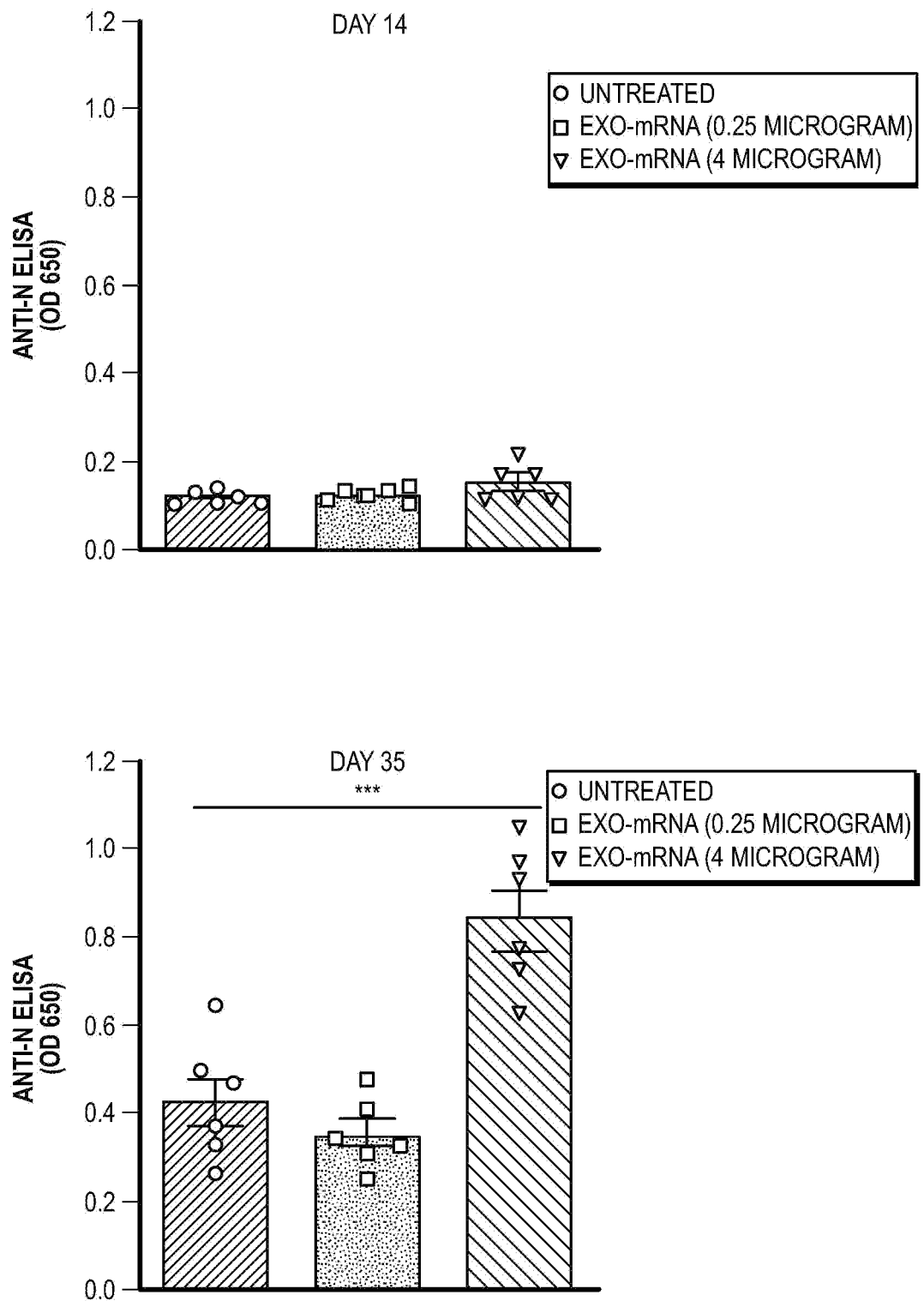
Figure 7B:
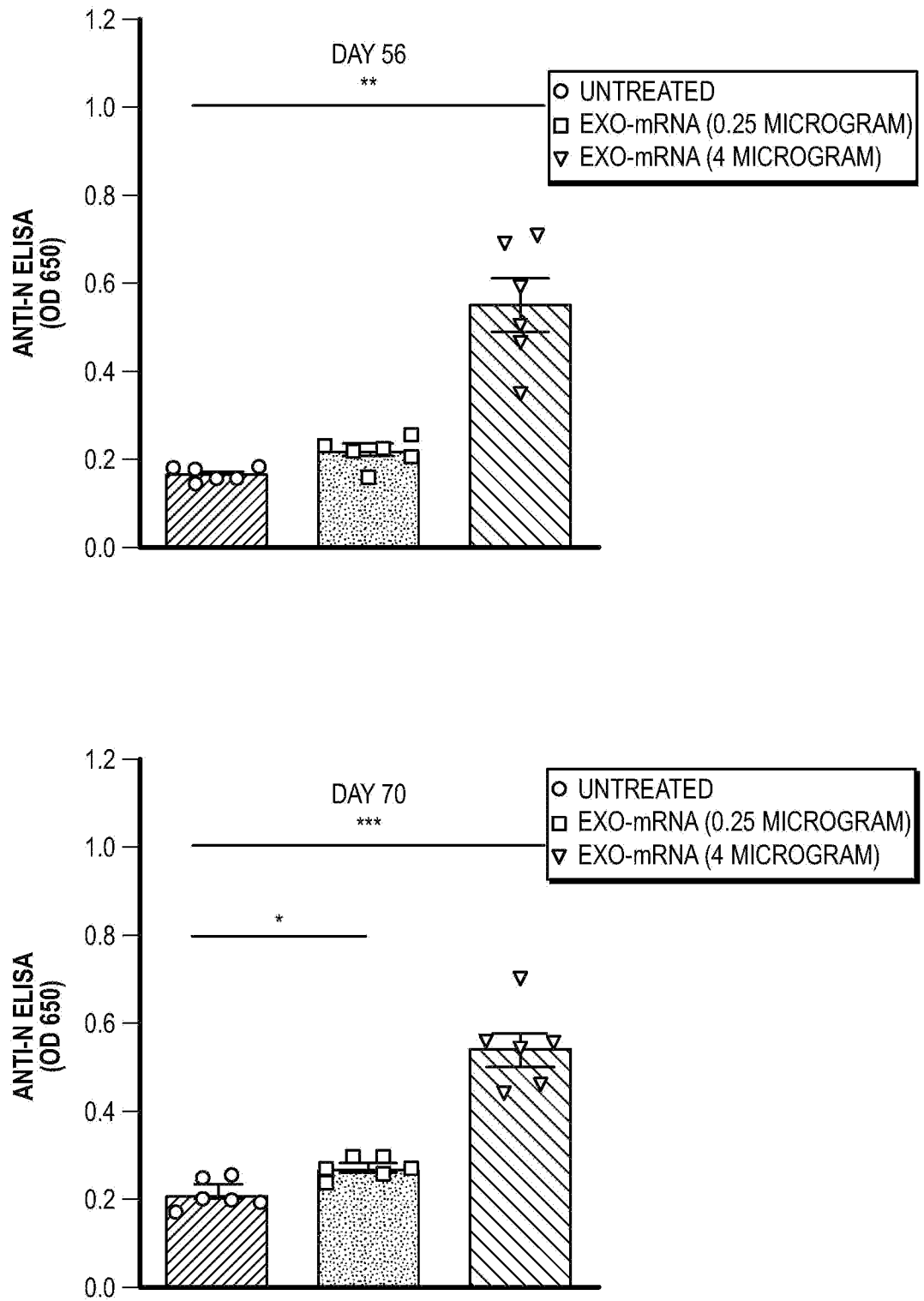
Figure 7B:
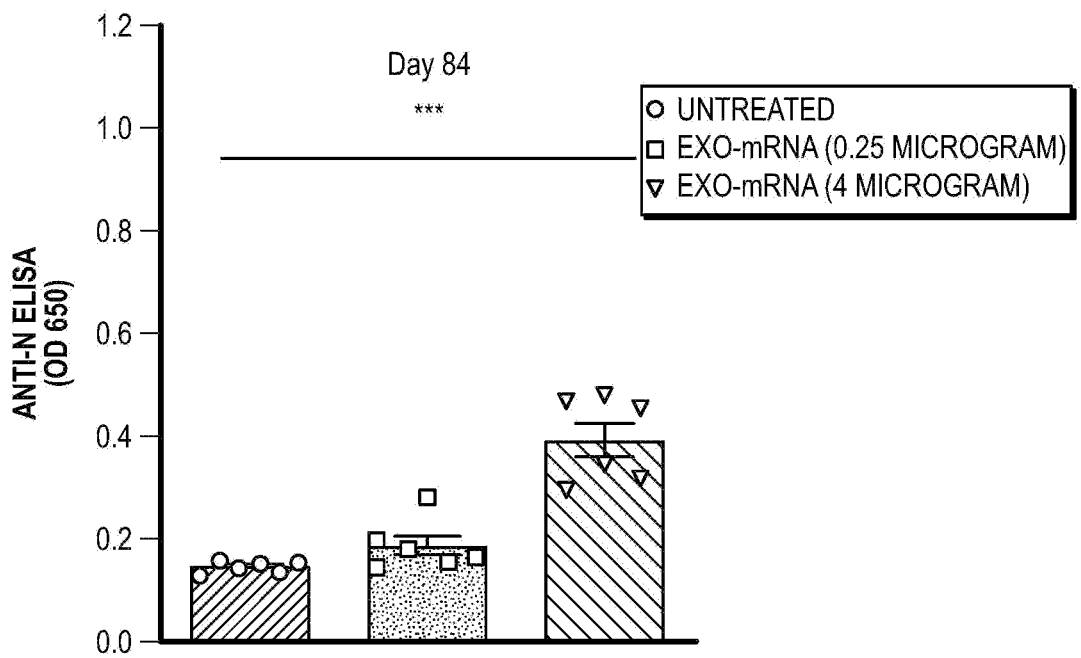
Figure 7C:
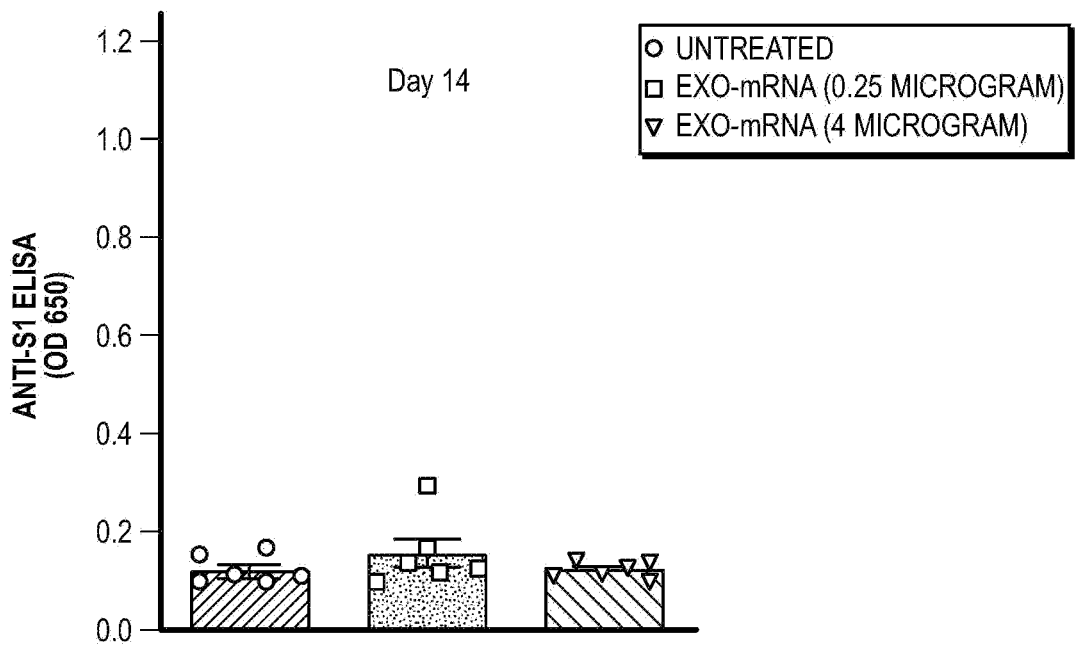
Figure 7C:
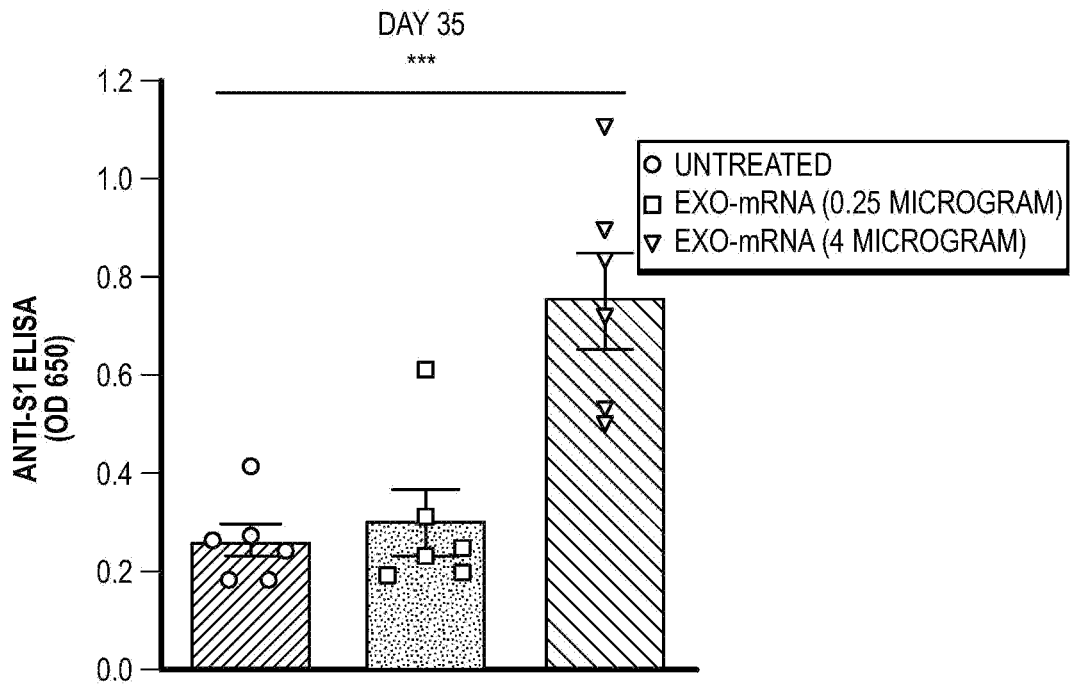
Figure 7C:
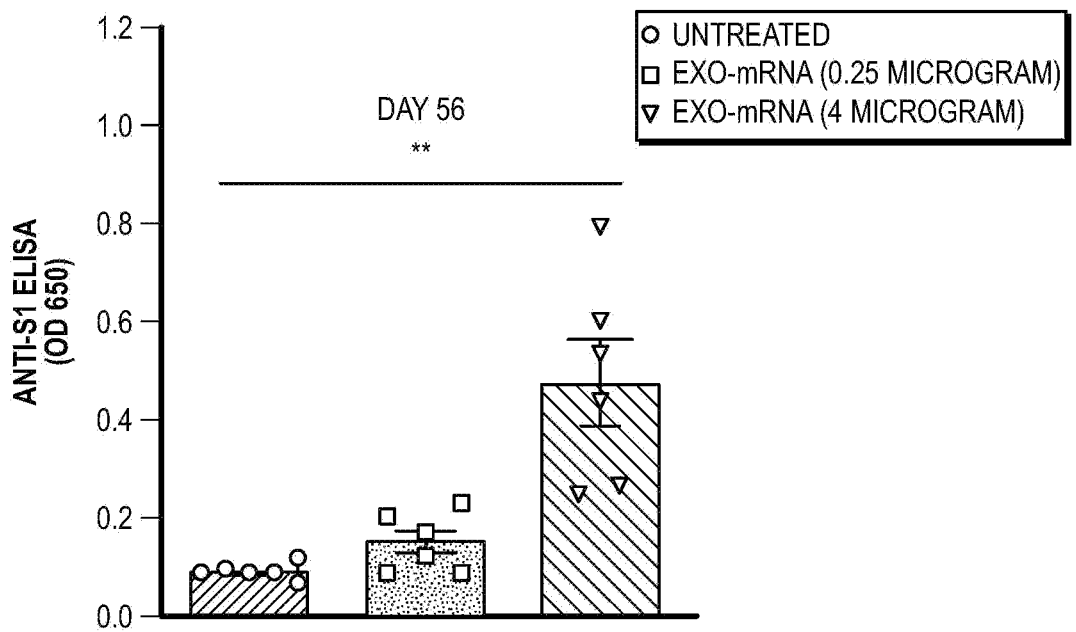
Figure 7C:
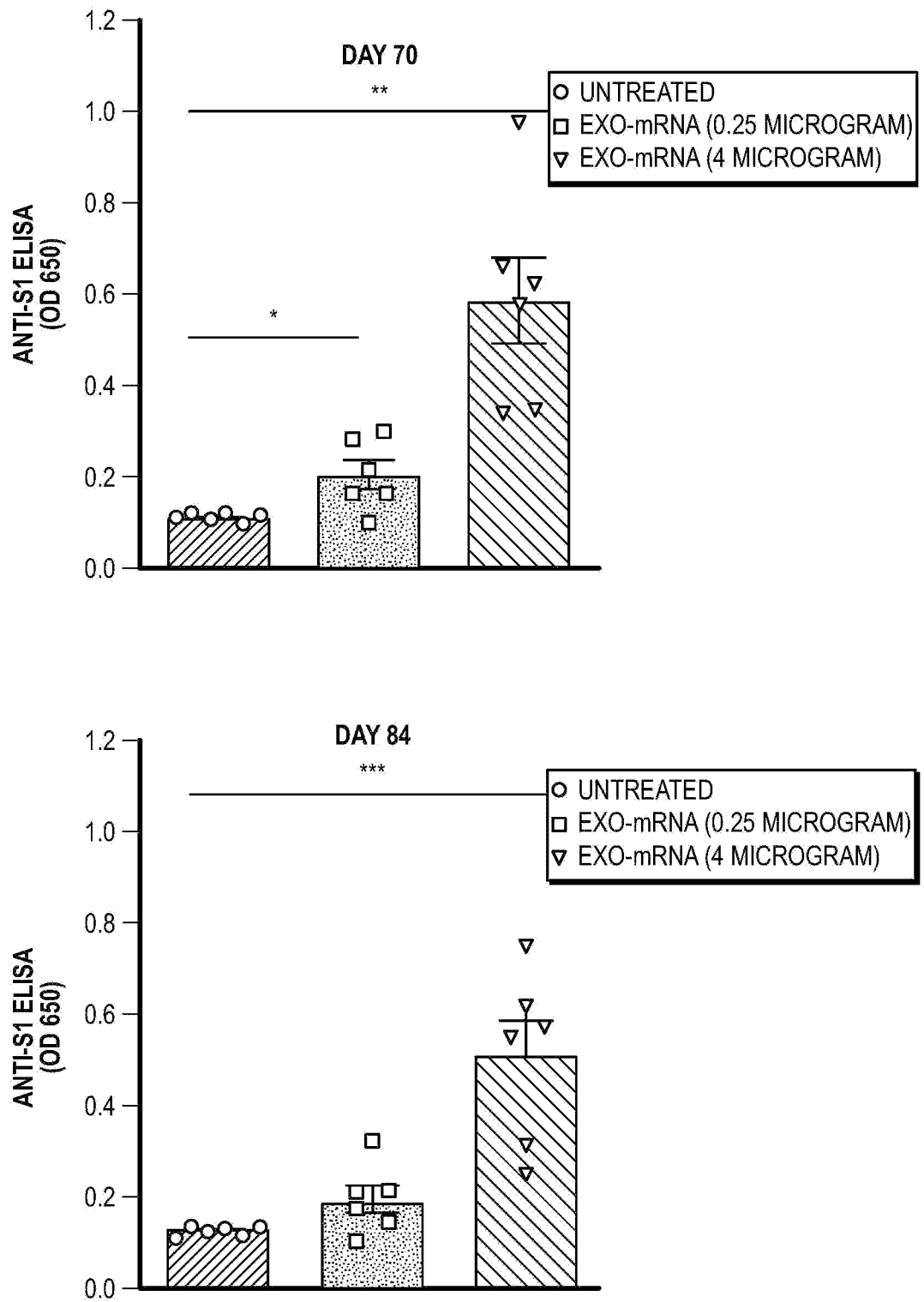
Figure 8A:
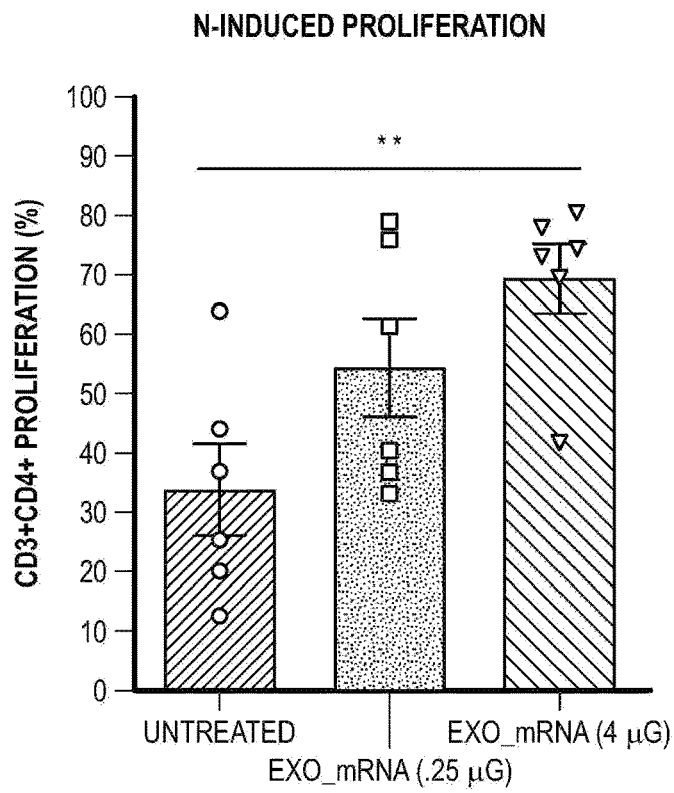
FIGS. 8A-8D shows that LSNME/S$^{W1}$ vaccination induces CD4$^+$ and CD8$^+$ T-cell responses. CFSE-labeled splenocytes were interrogated by flow cytometry following incubation in the absence or presence of (FIGS. 8A, 8B) purified, recombinant N protein or (FIGS. 8C, 8D) purified, recombinant S protein, and for antibodies specific for CD4 and CD8. Differences in proliferation of CD4$^+$ cells and CD8$^+$ cells were plotted for (grey/left bars and black circles) individual six control mice, (orange/middle bars and black squares) six mice immunized with 0.25 µg equivalents of each mRNA, and (rust/right bars and black triangles) six mice immunized with 4 µg equivalents of each mRNA. Height of bars represents the mean, error bars represent+/−one standard error of the mean, and the statistical significance of differences between different groups is reflected in Student's t-test values of * for <0.05 and ** for <0.005.
Figure 8B:
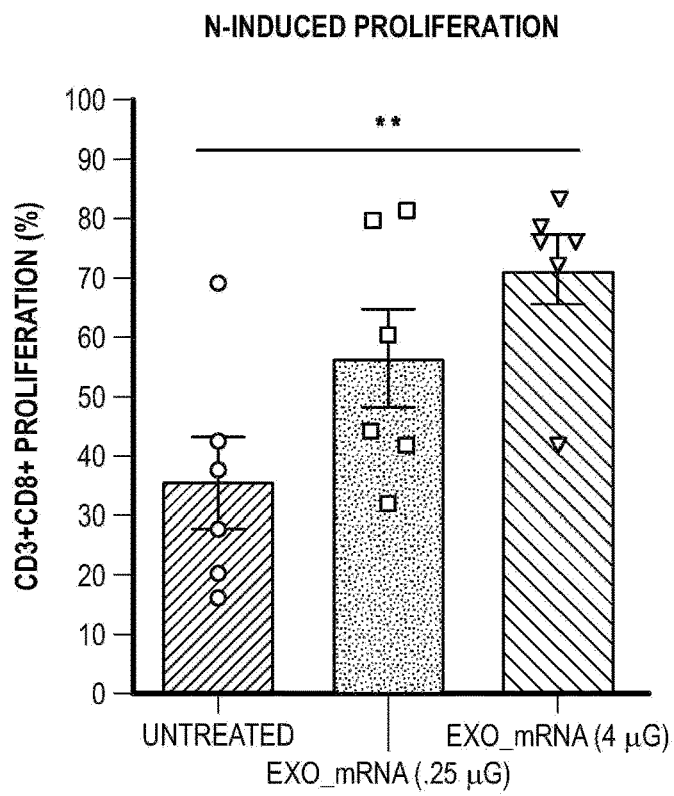
Figure 8C:
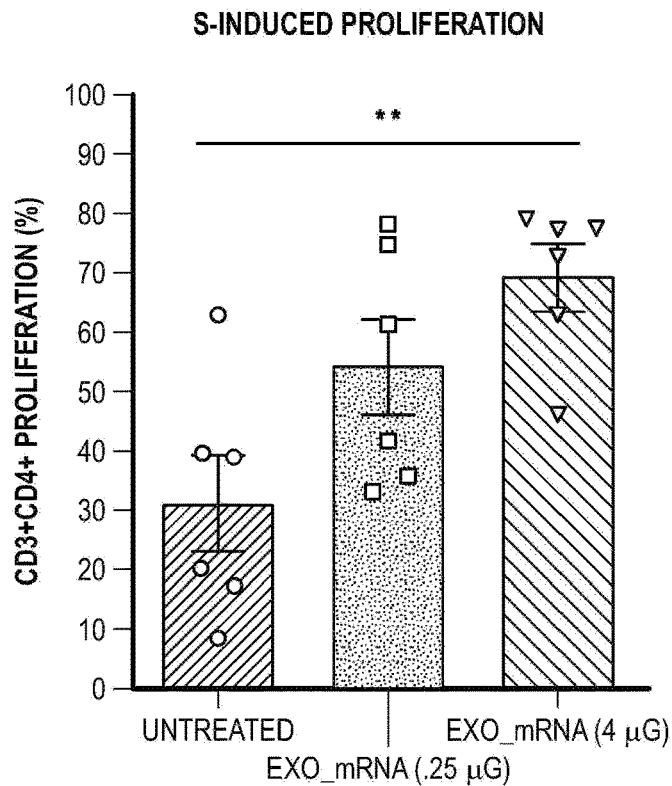
Figure 8D:
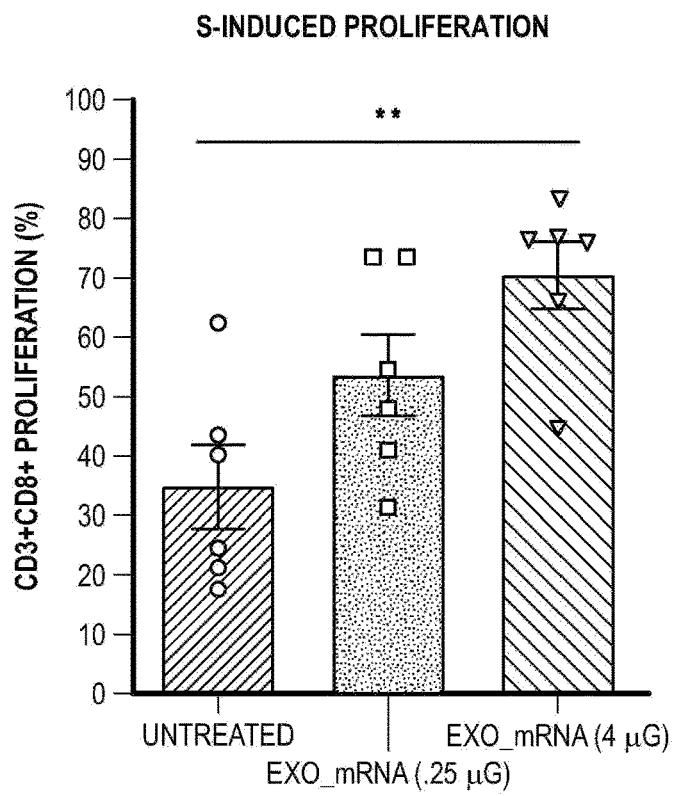
Figure 9A:
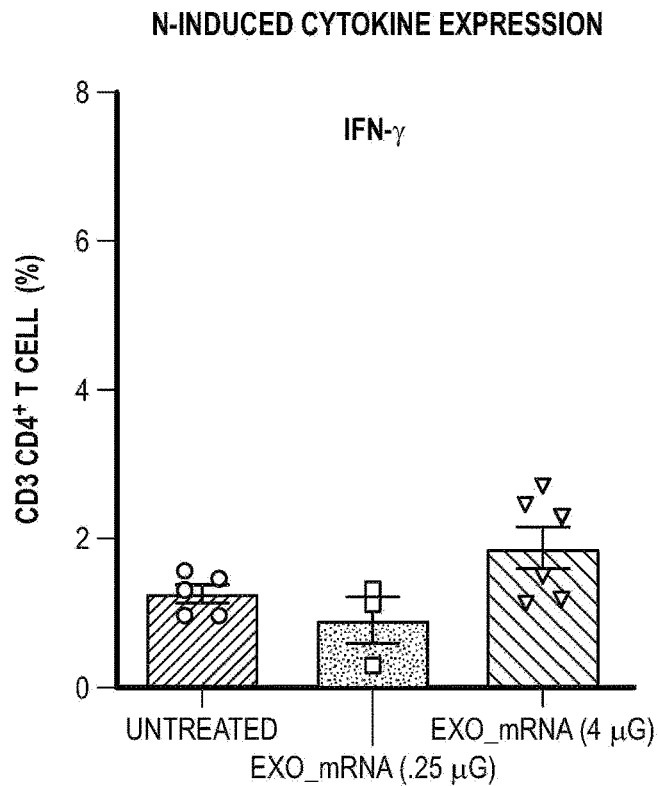
FIG. 9A-9D shows that LSNME/S$^{W1}$ vaccination leads to S-induced expression of IFNγ and IL4 by CD4$^+$ T-cells. Splenocytes were interrogated by flow cytometry following incubation in the absence or presence of (FIGS. 9A, 9B) purified, recombinant N protein or (FIGS. 9C, 9D) purified, recombinant S protein, and labeling with antibodies specific for CD4 or CD8, and for IFNγ or IL4. Differences in labeling for IFNγ or IL4 in CD4$^+$CD8$^+$ cell populations were plotted for (grey/left bars and black circles) individual six control mice, (orange/middle bars and black squares) six mice immunized with 0.25 µg equivalents of each mRNA, and (rust/right bars and black triangles) six mice immunized with 4 µg equivalents of each mRNA. Height of bars represents the mean, error bars represent+/−one standard error of the mean, and the statistical significance of differences between different groups is reflected in Student's t-test values of * for <0.05.
Figure 9B:
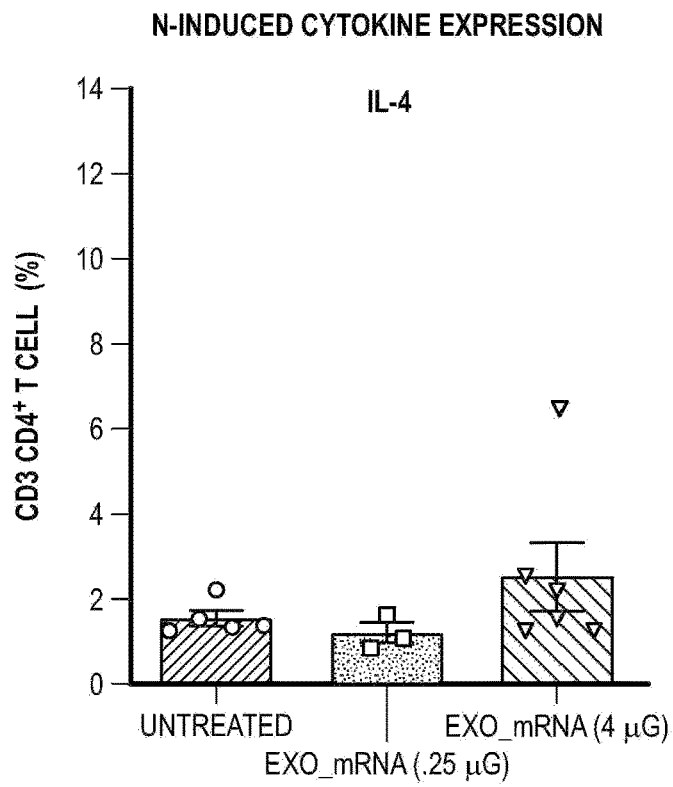
Figure 9C:
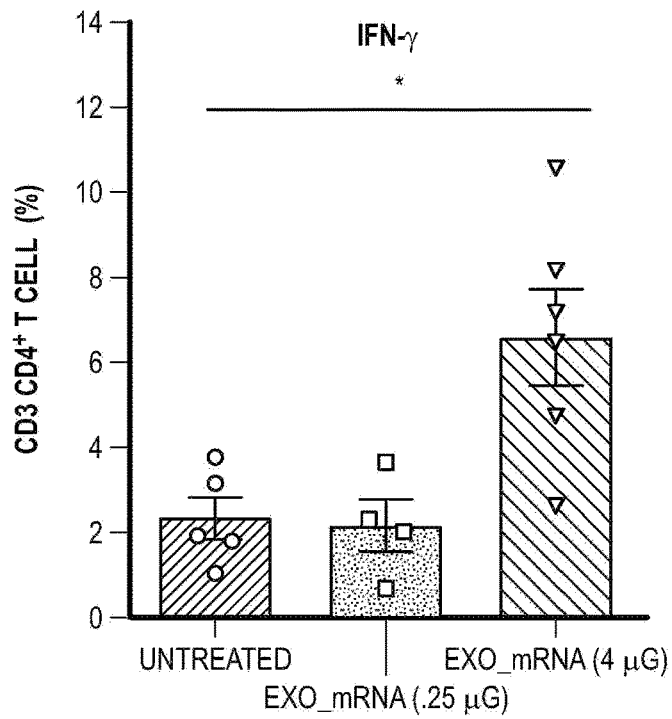
Figure 9D:
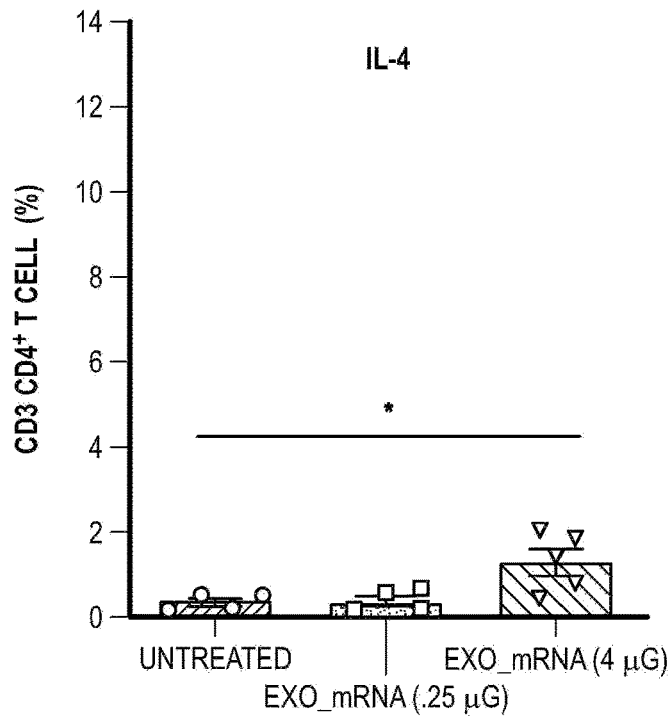

To test whether exosome-mRNA formulations can be used to elicit immune responses to mRNA-encoded antigens, the present inventors synthesized a pair of mRNAs, one of which expresses the full-length, functional form of S from the original Wuhan-1 isolate of SARS-CoV-2 ($S^{W1}$). The term "$S^{W1}$" refers to the same protein as, or is synonymous with, the term "S" as in "the SARS-CoV-2 spike protein (the S protein)" having the amino acid sequence according to SEQ ID NO:1 (Table 1). Transfection of this mRNA into HEK293 cells led to expression of a distinct protein that was also recognized by antibodies present in a COVID-19 patient plasma (FIGS. 6C, 6D). The second mRNA expresses a fusion protein (LSNME) comprised of the receptor binding domain (RBD) of the spike protein, the entire nucleocapsid protein, and soluble portions of the membrane and envelope proteins, all expressed within the extracellular domain of the human Lamp1 protein (this Lamp1-based fusion protein aims to induce anti-SARS-CoV-2 immunity by targeting viral protein fragments to the MHC Class I and II antigen presentation pathways). The term "LSNME" refers to the same protein as, or is synonymous with, the term "L-$S_{RBD}$NME-L" having the having the amino acid sequence according to SEQ ID NO:10 (Table 1). The present inventors hypothesized that the protein encoded by this particular mRNA will be degraded into peptides for antigen presentation by the MHC Class I system, and if expressed in antigen-presenting cells (APCs), will be degraded into peptides for antigen presentation by MHC Class II molecules. Expression of such a protein in a non-APC cell type such as HEK293 is expected to result in its accumulation in the endoplasmic reticulum. Consistent with this hypothesis, transfection of this mRNA into HEK293 cells led to the expression of an ER-localized protein recognized by anti-SARS-CoV-2 antibodies present in COVID-19 patient plasma (FIGS. 6A, 6B). Transfection of these mRNAs into HEK293 cells (FIG. 6) resulted in expression of the spike protein at the cell surface but also at internal organelles (shown elsewhere to be lysosomes), whereas expression of LSNME led to its accumulation in what appears to the endoplasmic reticulum, the site of MHC Class I peptide loading and maturation. Taken together, these results demonstrate that these mRNAs encode proteins with their hypothesized subcellular localizations, and represents antigens to which antibodies in COVID-19 patient plasmas react.

LSNME/S$^{W1}$ Vaccination Induces Antibody Responses to N and S

A single exosome-mRNA formulation containing both the LSNME and S$^{W1}$ mRNAs (hereafter referred to as the LSNME/S$^{W1}$ vaccine) was injected intramuscularly into 13 weeks-old male C57BL/6J mice (FIG. 7). The vaccine was dosed at 4 µg or 0.25 µg equivalents of each mRNA and injections were performed on day 1 (primary immunization), day 21 (1st boost), and day 42 (2nd boost). Blood (0.1 ml) was collected on days 14, 35, 56, 70 and 84. On day 84 the animals were sacrificed to obtain tissue samples for histological analysis and splenocytes for blood cell studies. Using ELISA kits adapted for the detection of mouse antibodies, the present inventors observed that vaccinated animals displayed a dose-dependent antibody response to both the SARS-CoV-2 nucleocapsid and spike proteins. These antibody reactions were not particularly robust, but they were long-lasting, persisting to 7 weeks after the final boost with little evidence of decline. It should be noted that the modest antibody production was expected in the case of the nucleocapsid protein, as the LSNME mRNA is designed to stimulate cellular immune responses rather than the production of anti-N antibodies.

LSNME/S$^{W1}$ Vaccination Induces Cellular Immune Responses to N and S

Vaccinated and control animals were also interrogated for the presence of antigen-reactive CD4$^+$ and CD8$^+$ T cells. This was carried out by collecting splenocytes at the completion of the trial (day 84) using a CFSE proliferation assay in the presence or absence of recombinant SARS-CoV-2 nucleocapsid and spike proteins. These experiments revealed that vaccination had induced a significant increase in the percentages of CD4$^+$ T-cells and CD8$^+$ T cells that proliferated in response to addition of either recombinant nucleocapsid protein or recombinant spike protein to the culture media (FIGS. 8A-D). These vaccine-specific, antigen-induced proliferative responses demonstrate that the LSNME/S$^{W1}$ vaccine achieved its primary goal, which was to prime the cellular arm of the immune system to react to generate N-reactive CD4$^+$ and CD8$^+$ T-cells, and also S-reactive CD4$^+$ and CD8$^+$ T cells. In additional experiments, the present inventors stained antigen-induced T-cells for the expression of interferon gamma (IFNγ) and interleukin 4 (IL4). These experiments revealed that the S-reactive CD4$^+$ T cell population displayed elevated expression of the Th1-associated cytokine IFNγ, and to a lesser extent, the Th2-associated cytokine IL4 (FIG. 9). In contrast, N-reactive T cells failed to display an N-induced expression of either IFNγ or IL4.

Absence of Vaccine-Induced Adverse Reactions

Figure 10:
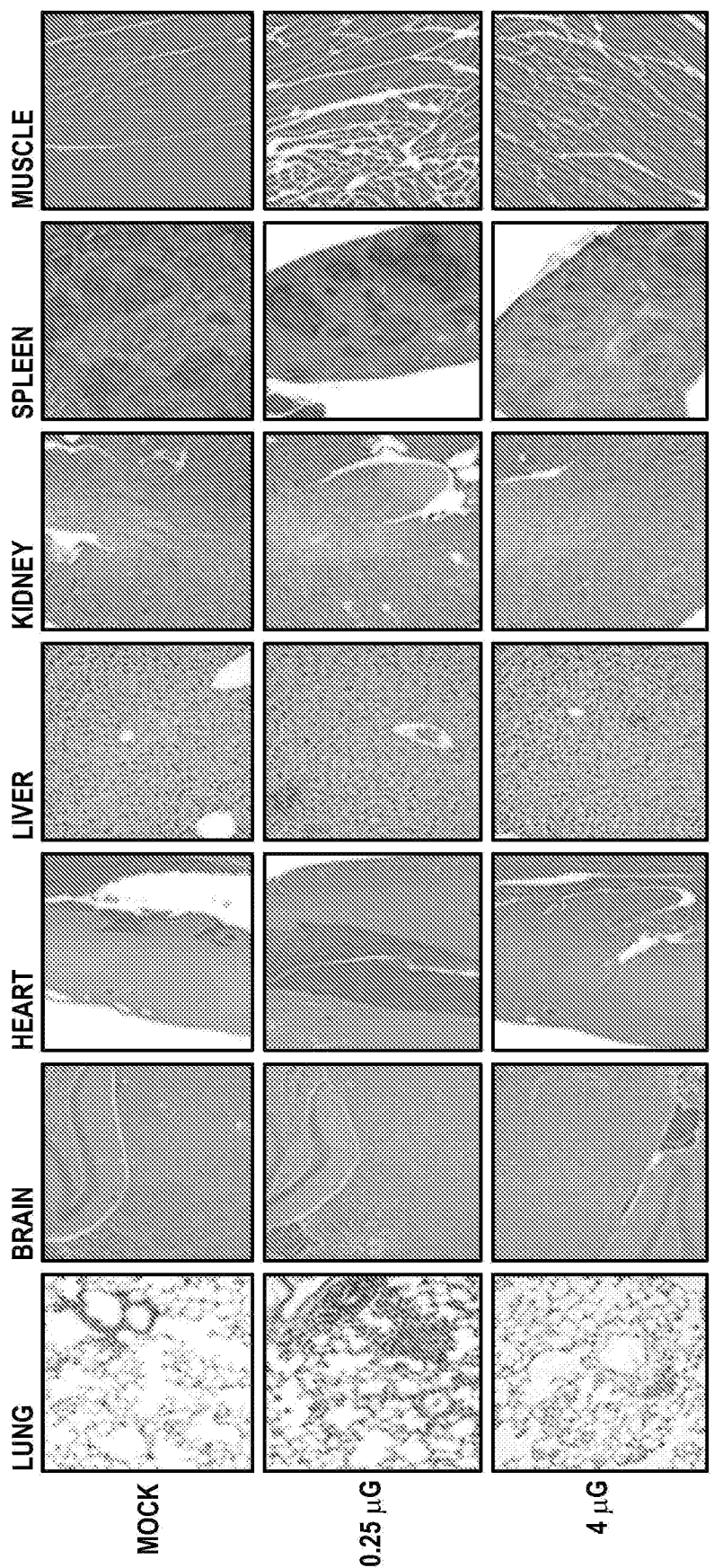
FIG. 10 shows absence of tissue pathology upon LSNME/S$^{W1}$ vaccination. Representative micrographs from histological analysis (hematoxylin and eosin stain) of lung, brain, heart, liver, kidney, spleen, and muscle (side of injection) of animals from (upper row) control mice, (middle row) mice immunized with the lower dose of the LSNME/S$^{W1}$ vaccine, and (lower row) mice immunized with the higher dose of the LSNME/S$^{W1}$ vaccine.
Figure 11:
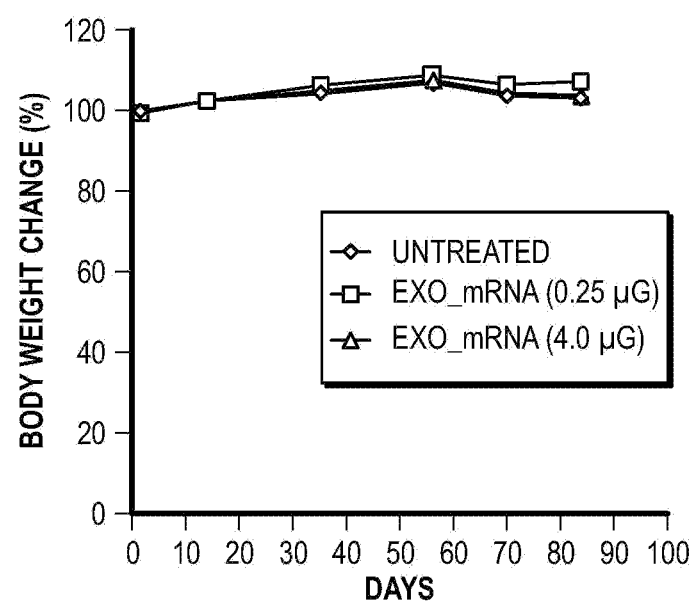
FIG. 11 shows equivalent growth of vaccinated and control animals. Body mass of all mice was measured over the course of the study and plotted as average+/−the standard error of the mean, relative to the body mass at the initiation of the trial, with groups reported as (grey lines and circles) control mice, (orange lines and squares) lower dose-treated mice, and (rust lines and triangles) higher dose-treated mice.
Figure 12A:
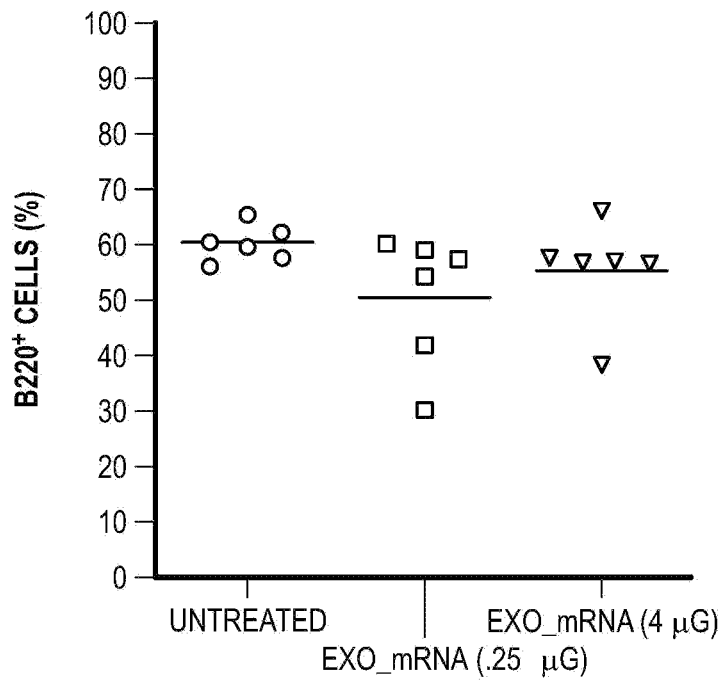
FIGS. 12A-12F shows that vaccination does not induce changes in the proportional representation of key blood cell populations. Splenocytes were interrogated by flow cytometry using antibodies specific for (FIG. 12A) B220, (FIG. 12B) Ly6C, (FIG. 12C) CD11c, and (FIG. 12D) CD3. CD3$^+$ cells were further differentiated by staining for (FIG. 12E) CD4 and (FIG. 12F) CD8. No statistically significant differences were detected in these subpopulations of white blood cells.
Figure 12B:
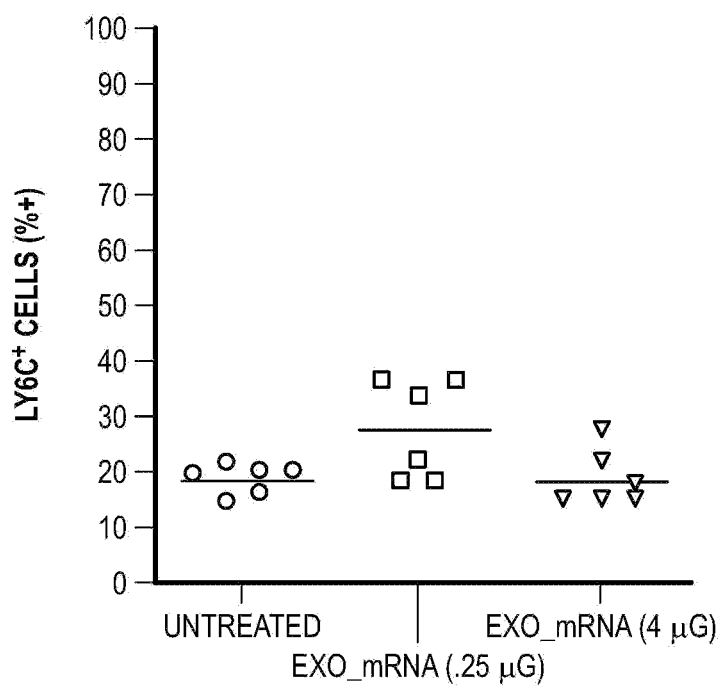
Figure 12C:
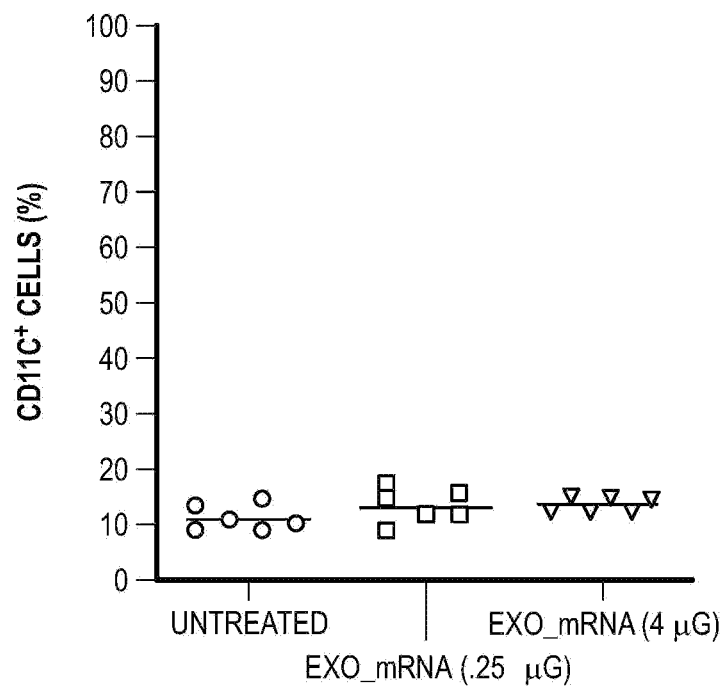
Figure 12D:
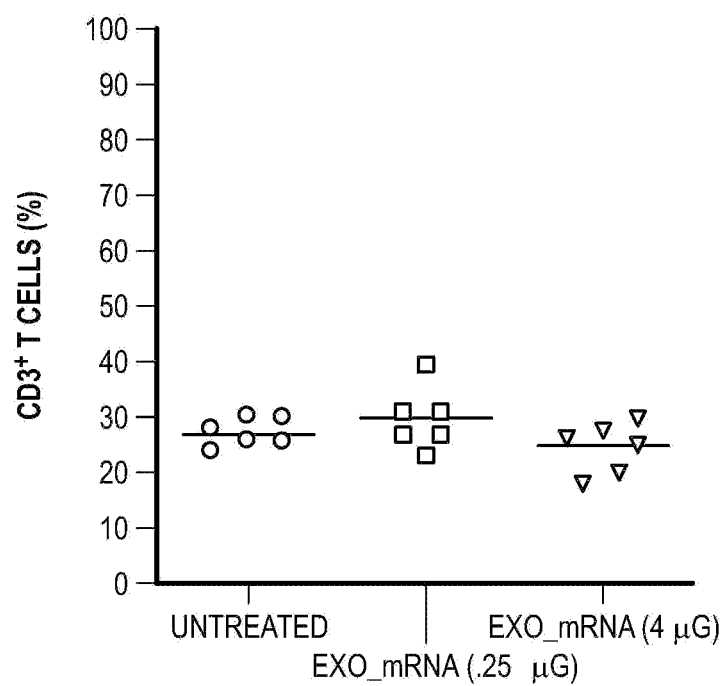
Figure 12E:
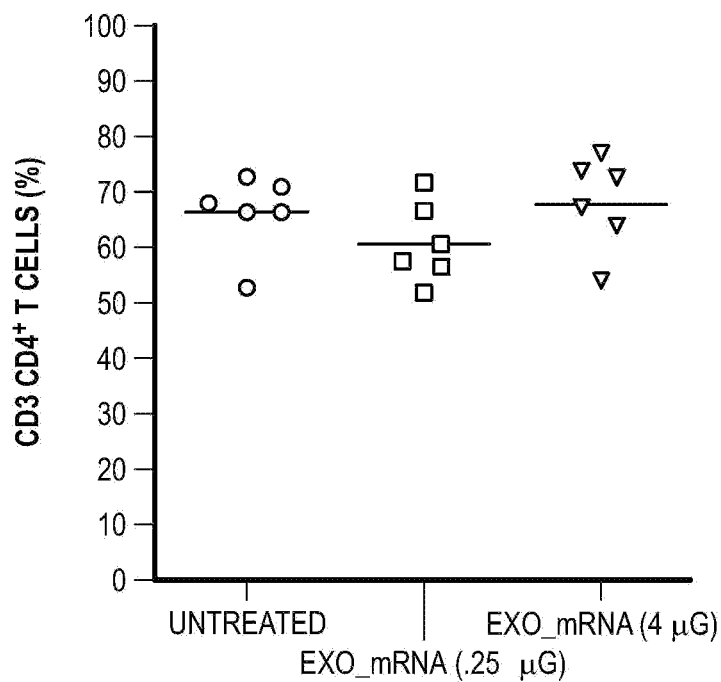
Figure 12F:
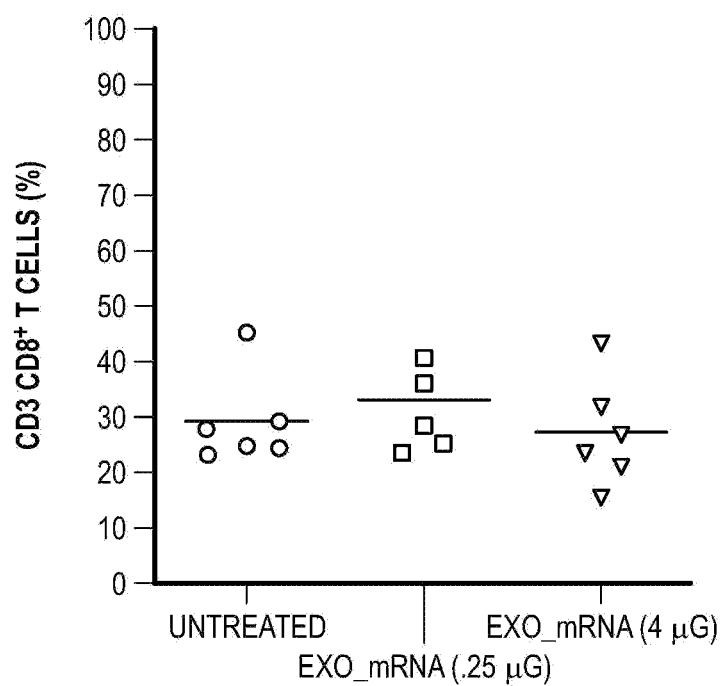

Control and vaccinated animals were examined regularly for overall appearance, general behavior, and injection site inflammation (redness, swelling). No vaccine-related differences were observed in any of these variables, and animals from all groups displayed similar age-related increases in body mass (FIG. 11). Vaccination also had no discernable effect on blood cell counts (FIG. 12). Histological analyses were performed on all animals at the conclusion of the study by an independent histology service, which reported that vaccinated animals showed no difference in overall appearance of any of the tissues that were examined. Representative images are presented for brain, lung, heart, liver, spleen, kidney, and skeletal muscle (side of injection) in an animal from each of the trial groups (FIG. 10).

Discussion

Exosomes represent a novel drug delivery vehicle capable of protecting labile cargoes from degradation and delivering them into the cytoplasm of target cells. This is particularly relevant for the development of RNA-based vaccines and therapeutics, as unprotected RNA-based drugs are subject to rapid turnover, poor targeting, and in some cases unwanted side effects arising from naked nucleic acid injection. Encapsulating RNAs in liposomes and other types of lipid nanoparticles (LNPs) is one approach to solving these problems, but LNPs are known to pose risks of their own, and in some cases have been associated with severe adverse effects. In contrast, exosomes are continually released by all human cells, are abundant components of human blood and all other biofluids, and are therefore well-tolerated drug-delivery vehicles. In addition, exosomes play critical roles in the intercellular delivery of signals and macromolecules, including the functional delivery of mRNAs and other RNAs, making RNA-loaded exosomes an ideal candidate for clinical applications of RNA therapeutics. The data presented herein support this hypothesis by showing that exosome-mRNA formulations can support the in vivo, functional expression of proteins as diverse as soluble cytoplasmic enzymes, viral structural proteins, and synthetic fusion proteins.

The findings presented herein are also relevant to the ongoing battle against SARS-CoV-2. Current vaccine strategies are all centered on inducing immunity to the spike protein, but spike-only vaccines are susceptible to escape effects whenever antigenically shifted spike variants starts to spread in susceptible populations. While the present invention is designed to address this challenge by improved design of expression-dependent Spike vaccines, it also addresses it by providing a multiplexed mRNA vaccine that delivers two or more mRNAs, one encoding the spike protein and the others encoding the nucleocapsid protein and fragments of other proteins as well. One limitation of this approach is that the nucleocapsid is a cytoplasmic protein rather than a surface antigen, a topology that limits its efficacy in vaccination studies. However, this limitation can be overcome by the present invention by expressing the nucleocapsid protein as part of a fusion protein with the lysosomal resident protein Lamp1, which places the nucleocapsid protein in the correct compartments for Class I and Class II antigen presentation (ER and lysosome/MHC Class II compartment, respectively). This approach was realized in the present LSNME/S$^{W1}$ vaccine, which elicited strong cellular immune responses to the nucleocapsid protein as well as to the spike protein.

Herein, the present inventors established that formulations of purified exosomes, in vitro-synthesized mRNAs, and polycationic lipids can mediate mRNA transport into human cells, and functional expression of mRNA-encoded protein products. This was established first for Antares2, a bioluminescent and fluorescent protein that served as a reporter protein for interrogating the effect of exosome-RNA formulation variables that affect exosome-mediated RNA delivery. It was then extended to the functional delivery of mRNAs encoding membrane proteins, including the multiantigen carrier protein LSNME and the functional spike protein, S$^{W1}$. Taken together, these results indicate that mRNAs delivered via exosome-RNA formulations can support cargo protein synthesis, regardless of whether the protein is predicted to be synthesized on free cytosolic ribosomes (e.g. Antares2) or on membrane-bound ribosomes that mediate co-translational translocation of the protein into the endoplasmic reticulum (e.g. LSNME and $S^{W1}$).

An exosome-mRNA formulation containing the LSNME and $S^{W1}$ mRNAs (LSNME/$S^{W1}$) were evaluated for its ability to drive functional mRNA expression in vivo by injecting it into mice at relatively low doses of 4 μg mRNA equivalents and 0.25 μg mRNA equivalents. Injections were spaced at three-week intervals, and blood samples were collected over the course of 12 weeks, at which time the animals were sacrificed for analysis of T-cell responses and organ histology. Consistent with the goal of vaccine-induced development of a balanced T-cell response to multiple viral proteins, LSNME/$S^{W1}$-vaccinated animals displayed an ~40% increase in the percentage of $CD4^+$ and $CD8^+$ T-cell populations that proliferate in response to recombinant N protein, and a similar ~40% increase in the percentage of $CD4^+$ and $CD8^+$ T-cell populations that proliferate in response to recombinant S protein. Moreover, these antigen-responsive $CD4^+$ and $CD8^+$ populations were present nearly two months after the final boost injection, indicating that LSNME/$S^{W1}$ vaccination had elicited a sustained cellular immune response to both the N and S proteins. When these cell populations were interrogated for expression of the cytokines IFNγ and IL4, we detected elevated expression of IFNγ in particular, and to a lesser extent, IL4, consistent with the goal of generating a Th1-skewed immune response. These responses were generated even though the highest dose of LSNME/$S^{W1}$ tested in these studies was less than 1/20 the projected human dose of this vaccine.

The vaccine-induced T-cell responses detected in this study are consistent with the design of the LSNME mRNA. This mRNA expresses portions of multiple SARS-CoV-2 proteins, but within a fusion protein that is designed to be processed by Class I and Class II antigen presentation pathways. Consistent with its design, this protein accumulates in the ER of HEK293 cells, and animals immunized with the LSNME mRNA generated cellular immune responses to the N protein. Although the LSNME/$S^{W1}$ vaccine was designed to elicit cellular immune responses rather than antibody responses, vaccinated animals did develop antibody responses to both the N and the S protein. These responses were durable, as they were sustained at relatively constant levels over the 7 weeks following the final boost. The moderate strength of these immune responses is likely to be amplified significantly by the anticipated 20-fold dose increase in larger animal models and in human trials, and raises the possibility that neutralizing antibodies might even be elicited by this or a similar vaccine. However, the fact that several neutralizing antibody trials have failed to show efficacy raises questions about whether the production of neutralizing antibody is the sole hallmark by which an effective SARS-CoV-2 vaccine should be judged. That being the, the present inventors did expect a stronger anti-S antibody response than what was observed. Fortunately, this aspect of the LSNME/$S^{W1}$ vaccine can be addressed by a combination of the increased dose that will be used in future studies, as well as improved design of the S antigen selected for expression.

In conclusion, the results presented in this study validate the use of multiplexed exosome-mRNA formulations for functional delivery of mRNAs both in cultured cells and in live animals. The successful use of exosomes to deliver Antares2 mRNA opens the door to follow-on studies aimed at optimizing exosome-RNA formulation conditions, as well as for characterizing the time dependence of Antares2 expression, biodistribution of exosome-mediated RNA expression, injection site effects, and exosome-mediated tissue tropism. Furthermore, the fact that exosomes can be deployed at high concentrations without adverse effects on cells or animals bodes well for their future use in dosing regimens that require higher level or ongoing repeated injections.

The disclosure of every patent, patent application, and publication cited herein is hereby incorporated herein by reference in its entirety. The citation of any reference herein should not be construed as an admission that such reference is available as "prior art" to the instant application. Throughout the specification the aim has been to describe the preferred embodiments of the invention without limiting the invention to any one embodiment or specific collection of features. Those of skill in the art will therefore appreciate that, in light of the instant disclosure, various modifications and changes can be made in the particular embodiments exemplified without departing from the scope of the present invention. All such modifications and changes are intended to be included within the scope of the appended claims.

What is claimed is:

1. An extracellular vesicle (EV)-based nucleic acid composition, comprising one or more extracellular vesicles (EVs) each comprising a polynucleotide having an open reading frame (ORF) encoding a fusion protein comprising fragments of each of a plurality of antigenic peptides.

2. The EV-based nucleic acid composition according to claim 1, wherein the polynucleotide is a messenger RNA (mRNA).

3. The EV-based nucleic acid composition according to claim 1, further comprising a chemical lipofection reagent or a chemical transfection reagent.

4. The EV-based nucleic acid composition according claim 1, wherein the fusion protein is configured, or designed, to elicit, or induce, a humoral immune response and/or a cellular immune response in a human subject.

5. The EV-based nucleic acid composition according to claim 1, further comprising a physiologically acceptable excipient.

6. The EV-based nucleic acid composition according to claim 1, wherein the fusion protein comprises a polypeptide as it is encoded by an infectious agent's genome that is fused, or linked, to an exosomal anchor protein.

7. The EV based nucleic acid composition according to claim 1, wherein the fusion protein comprises fragments of one or more of SARS-Co-V-2 proteins S, N, M and E.

8. The EV based nucleic acid composition according to claim 7, wherein the fusion protein comprises the receptor binding domain (RBD) of S, the entire N protein, and soluble portions of the M and E proteins.

9. The EV based nucleic acid composition according to claim 1, wherein the fusion protein further comprises a transmembrane domain of Lamp1.

10. The EV-based nucleic acid composition according to claim 1, wherein the fusion protein comprises:
 (i) SARS-COV-2 spike protein (the S protein) having the amino acid sequence according to SEQ ID NO:1, or a polypeptide having at least 90%, 91%, 92%, 93%, 94%, 95%, 96%, 97% 98%, or 99% amino acid sequence identity with SEQ ID NO: 1;
 (ii) SARS-COV-2 nucleocapsid protein (the N protein) having the amino acid sequence according to SEQ ID NO:2, or a polypeptide having at least 90%, 91%, 92%, 93%, 94%, 95%, 96%, 97%, 98%, or 99% amino acid sequence identity with SEQ ID NO: 2;
 (iii) Lamp-S(ECD)-Lamp protein (the LSL protein) having the amino acid sequence according to SEQ ID NO:3, or a polypeptide having at least 90%, 91%, 92%, 93%, 94%, 95%, 96%, 97% 98%, or 99% amino acid sequence identity with SEQ ID NO: 3;
 (iv) Lamp-N-Lamp protein (the LNL protein) having the amino acid sequence according to SEQ ID NO:4, or a polypeptide having at least 90%, 91%, 92%, 93%, 94%, 95%, 96%, 97% 98%, or 99% amino acid sequence identity with SEQ ID NO:4;
 (v) SARS-COV-2 membrane protein (the M protein) having the amino acid sequence according to SEQ ID NO:5, or a polypeptide having at least 90%, 91%, 92%, 93%, 94%, 95%, 96%, 97%, 98%, or 99% amino acid sequence identity with SEQ ID NO: 5;
 (vi) SARS-COV-2 envelope protein (the E protein) having the amino acid sequence according to SEQ ID NO:6, or a polypeptide having at least 90%, 91%, 92%, 93%, 94%, 95%, 96%, 97% 98%, or 99% amino acid sequence identity with SEQ ID NO: 6;
 (vii) FKBPDD-S(ECD) protein (the ddS protein) having the amino acid sequence according to SEQ ID NO:7, or a polypeptide having at least 90%, 91%, 92%, 93%, 94%, 95%, 96%, 97% 98%, or 99% amino acid sequence identity with SEQ ID NO: 7;
 (viii) FKBPDD-N protein (the ddN protein) having the amino acid sequence according to SEQ ID NO:8, or a polypeptide having at least 90%, 91%, 92%, 93%, 94%, 95%, 96%, 97% 98%, or 99% amino acid sequence identity with SEQ ID NO:8;
 (ix) SRBDNME protein having the amino acid sequence according to SEQ ID NO: 9, or a polypeptide having at least 90%, 91%, 92%, 93%, 94%, 95%, 96%, 97% 98%, or 99% amino acid sequence identity with SEQ ID NO:9; or (x) L-SRBDNME-L protein having the amino acid sequence according to SEQ ID NO:10, or a polypeptide having at least 90%, 91%, 92%, 93%, 94%, 95%, 96%, 97% 98%, or 99% amino acid sequence identity with SEQ ID NO:10.

11. The EV-based nucleic acid composition according to claim 10, comprising one or more EVs each loaded with, or combined with, mRNA encoding the M protein having the amino acid sequence according to SEQ ID NO:5, or a polypeptide having at least 90%, 91%, 92%, 93%, 94%, 95%, 96%, 97% 98%, or 99% amino acid sequence identity with SEQ ID NO:5, with mRNA encoding the E protein having the amino acid sequence according to SEQ ID NO:6, or a polypeptide having at least 90%, 91%, 92%, 93%, 94%, 95%, 96%, 97% 98%, or 99% amino acid sequence identity with SEQ ID NO:6, with mRNA encoding the N protein having the amino acid sequence according to SEQ ID NO:2, or a polypeptide having at least 90%, 91%, 92%, 93%, 94%, 95%, 96%, 97% 98%, or 99% amino acid sequence identity with SEQ ID NO:2, and with mRNA encoding the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO: 1.

12. The EV-based nucleic acid composition according to claim 10, comprising one or more EVs each loaded with, or combined with, mRNA encoding the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO:1, and with mRNA encoding the SRBDNME protein having the amino acid sequence according to SEQ ID NO:9, or a polypeptide having at least 90%, 91%, 92%, 93%, 94%, 95%, 96%, 97% 98%, or 99% amino acid sequence identity with SEQ ID NO:9.

13. The EV-based nucleic acid composition according to claim 10, comprising one or more EVs each loaded with, or combined with, mRNA encoding the S protein having the amino acid sequence according to SEQ ID NO:1, or a polypeptide having at least 90%, 91%, 92%, 93%, 94%, 95%, 96%, 97% 98%, or 99% amino acid sequence identity with SEQ ID NO: 1, and with mRNA encoding the L-SRBDNME-L protein having the amino acid sequence according to SEQ ID NO:10, or a polypeptide having at least 90%, 91%, 92%, 93%, 94%, 95%, 96%, 97% 98%, or 99% amino acid sequence identity with SEQ ID NO:10.

14. The EV-based nucleic acid composition according to claim 10, wherein the mRNA encoding the S protein comprises a nucleotide sequence according to SEQ ID NO:11, or a nucleotide sequence having at least 90%, 91%, 92%, 93%, 94%, 95%, 96%, 97% 98%, or 99% nucleotide sequence identity with SEQ ID NO:11.

15. The EV-based nucleic acid composition according to claim 10, wherein the mRNA encoding the SRBDNME protein comprises a nucleotide sequence according to SEQ ID NO:12, or a nucleotide sequence having at least 90%, 91%, 92%, 93%, 94%, 95%, 96%, 97% 98%, or 99% nucleotide sequence identity with SEQ ID NO: 12.

16. The EV-based nucleic acid composition according to claim 10, wherein the mRNA encoding the L-SRBDNME-L protein comprises a nucleotide sequence according to SEQ ID NO:13, or a nucleotide sequence having at least 90%, 91%, 92%, 93%, 94%, 95%, 96%, 97% 98%, or 99% nucleotide sequence identity with SEQ ID NO:13.

17. The EV-based nucleic acid composition according to claim 1, wherein the extracellular vesicle is an exosome.

18. A method of making an extracellular vesicle (EV)-based nucleic acid composition according to claim 1, the method comprising loading a polynucleotide having an open reading frame (ORF) encoding fusion protein comprising fragments of each of a plurality of antigenic peptides into one or more extracellular vesicles (EVs).

19. The method according to claim 18, wherein the polynucleotides are pre-mixed with one or more chemical lipofection reagents, or with one or more chemical transfection reagent.

20. A method of inducing, or eliciting, an antigen specific immune response in a subject, comprising administering the EV-based composition according to claim 1 to the subject in an effective amount to produce an antigen specific immune response.

\* \* \* \* \*

SEQUENCE LISTING

<160> NUMBER OF SEQ ID NOS: 15

<210> SEQ ID NO 1
<211> LENGTH: 1273
<212> TYPE: PRT
<213> ORGANISM: Severe acute respiratory syndrome coronavirus 2

<400> SEQUENCE: 1

```
Met Phe Val Phe Leu Val Leu Leu Pro Leu Val Ser Ser Gln Cys Val
1               5                   10                  15

Asn Leu Thr Thr Arg Thr Gln Leu Pro Pro Ala Tyr Thr Asn Ser Phe
            20                  25                  30

Thr Arg Gly Val Tyr Tyr Pro Asp Lys Val Phe Arg Ser Ser Val Leu
        35                  40                  45

His Ser Thr Gln Asp Leu Phe Leu Pro Phe Phe Ser Asn Val Thr Trp
    50                  55                  60

Phe His Ala Ile His Val Ser Gly Thr Asn Gly Thr Lys Arg Phe Asp
65                  70                  75                  80
```

```
Asn Pro Val Leu Pro Phe Asn Asp Gly Val Tyr Phe Ala Ser Thr Glu
                85              90              95

Lys Ser Asn Ile Ile Arg Gly Trp Ile Phe Gly Thr Thr Leu Asp Ser
            100             105             110

Lys Thr Gln Ser Leu Leu Ile Val Asn Asn Ala Thr Asn Val Val Ile
        115             120             125

Lys Val Cys Glu Phe Gln Phe Cys Asn Asp Pro Phe Leu Gly Val Tyr
    130             135             140

Tyr His Lys Asn Asn Lys Ser Trp Met Glu Ser Glu Phe Arg Val Tyr
145             150             155             160

Ser Ser Ala Asn Asn Cys Thr Phe Glu Tyr Val Ser Gln Pro Phe Leu
                165             170             175

Met Asp Leu Glu Gly Lys Gln Gly Asn Phe Lys Asn Leu Arg Glu Phe
            180             185             190

Val Phe Lys Asn Ile Asp Gly Tyr Phe Lys Ile Tyr Ser Lys His Thr
        195             200             205

Pro Ile Asn Leu Val Arg Asp Leu Pro Gln Gly Phe Ser Ala Leu Glu
    210             215             220

Pro Leu Val Asp Leu Pro Ile Gly Ile Asn Ile Thr Arg Phe Gln Thr
225             230             235             240

Leu Leu Ala Leu His Arg Ser Tyr Leu Thr Pro Gly Asp Ser Ser Ser
                245             250             255

Gly Trp Thr Ala Gly Ala Ala Ala Tyr Tyr Val Gly Tyr Leu Gln Pro
            260             265             270

Arg Thr Phe Leu Leu Lys Tyr Asn Glu Asn Gly Thr Ile Thr Asp Ala
        275             280             285

Val Asp Cys Ala Leu Asp Pro Leu Ser Glu Thr Lys Cys Thr Leu Lys
    290             295             300

Ser Phe Thr Val Glu Lys Gly Ile Tyr Gln Thr Ser Asn Phe Arg Val
305             310             315             320

Gln Pro Thr Glu Ser Ile Val Arg Phe Pro Asn Ile Thr Asn Leu Cys
                325             330             335

Pro Phe Gly Glu Val Phe Asn Ala Thr Arg Phe Ala Ser Val Tyr Ala
            340             345             350

Trp Asn Arg Lys Arg Ile Ser Asn Cys Val Ala Asp Tyr Ser Val Leu
        355             360             365

Tyr Asn Ser Ala Ser Phe Ser Thr Phe Lys Cys Tyr Gly Val Ser Pro
    370             375             380

Thr Lys Leu Asn Asp Leu Cys Phe Thr Asn Val Tyr Ala Asp Ser Phe
385             390             395             400

Val Ile Arg Gly Asp Glu Val Arg Gln Ile Ala Pro Gly Gln Thr Gly
                405             410             415

Lys Ile Ala Asp Tyr Asn Tyr Lys Leu Pro Asp Asp Phe Thr Gly Cys
            420             425             430

Val Ile Ala Trp Asn Ser Asn Asn Leu Asp Ser Lys Val Gly Gly Asn
        435             440             445

Tyr Asn Tyr Leu Tyr Arg Leu Phe Arg Lys Ser Asn Leu Lys Pro Phe
    450             455             460

Glu Arg Asp Ile Ser Thr Glu Ile Tyr Gln Ala Gly Ser Thr Pro Cys
465             470             475             480

Asn Gly Val Glu Gly Phe Asn Cys Tyr Phe Pro Leu Gln Ser Tyr Gly
                485             490             495
```

-continued

```
Phe Gln Pro Thr Asn Gly Val Gly Tyr Gln Pro Tyr Arg Val Val
                500                 505                 510
Leu Ser Phe Glu Leu Leu His Ala Pro Ala Thr Val Cys Gly Pro Lys
            515                 520                 525
Lys Ser Thr Asn Leu Val Lys Asn Lys Cys Val Asn Phe Asn Phe Asn
        530                 535                 540
Gly Leu Thr Gly Thr Gly Val Leu Thr Glu Ser Asn Lys Lys Phe Leu
545                 550                 555                 560
Pro Phe Gln Gln Phe Gly Arg Asp Ile Ala Asp Thr Thr Asp Ala Val
                565                 570                 575
Arg Asp Pro Gln Thr Leu Glu Ile Leu Asp Ile Thr Pro Cys Ser Phe
            580                 585                 590
Gly Gly Val Ser Val Ile Thr Pro Gly Thr Asn Thr Ser Asn Gln Val
        595                 600                 605
Ala Val Leu Tyr Gln Asp Val Asn Cys Thr Glu Val Pro Val Ala Ile
    610                 615                 620
His Ala Asp Gln Leu Thr Pro Thr Trp Arg Val Tyr Ser Thr Gly Ser
625                 630                 635                 640
Asn Val Phe Gln Thr Arg Ala Gly Cys Leu Ile Gly Ala Glu His Val
                645                 650                 655
Asn Asn Ser Tyr Glu Cys Asp Ile Pro Ile Gly Ala Gly Ile Cys Ala
            660                 665                 670
Ser Tyr Gln Thr Gln Thr Asn Ser Pro Arg Arg Ala Arg Ser Val Ala
        675                 680                 685
Ser Gln Ser Ile Ile Ala Tyr Thr Met Ser Leu Gly Ala Glu Asn Ser
690                 695                 700
Val Ala Tyr Ser Asn Asn Ser Ile Ala Ile Pro Thr Asn Phe Thr Ile
705                 710                 715                 720
Ser Val Thr Thr Glu Ile Leu Pro Val Ser Met Thr Lys Thr Ser Val
                725                 730                 735
Asp Cys Thr Met Tyr Ile Cys Gly Asp Ser Thr Glu Cys Ser Asn Leu
            740                 745                 750
Leu Leu Gln Tyr Gly Ser Phe Cys Thr Gln Leu Asn Arg Ala Leu Thr
        755                 760                 765
Gly Ile Ala Val Glu Gln Asp Lys Asn Thr Gln Glu Val Phe Ala Gln
770                 775                 780
Val Lys Gln Ile Tyr Lys Thr Pro Pro Ile Lys Asp Phe Gly Gly Phe
785                 790                 795                 800
Asn Phe Ser Gln Ile Leu Pro Asp Pro Ser Lys Pro Ser Lys Arg Ser
                805                 810                 815
Phe Ile Glu Asp Leu Leu Phe Asn Lys Val Thr Leu Ala Asp Ala Gly
            820                 825                 830
Phe Ile Lys Gln Tyr Gly Asp Cys Leu Gly Asp Ile Ala Ala Arg Asp
        835                 840                 845
Leu Ile Cys Ala Gln Lys Phe Asn Gly Leu Thr Val Leu Pro Pro Leu
850                 855                 860
Leu Thr Asp Glu Met Ile Ala Gln Tyr Thr Ser Ala Leu Leu Ala Gly
865                 870                 875                 880
Thr Ile Thr Ser Gly Trp Thr Phe Gly Ala Gly Ala Ala Leu Gln Ile
                885                 890                 895
Pro Phe Ala Met Gln Met Ala Tyr Arg Phe Asn Gly Ile Gly Val Thr
            900                 905                 910
Gln Asn Val Leu Tyr Glu Asn Gln Lys Leu Ile Ala Asn Gln Phe Asn
```

Ser Ala Ile Gly Lys Ile Gln Asp Ser Leu Ser Ser Thr Ala Ser Ala
              915                 920                 925

Leu Gly Lys Leu Gln Asp Val Val Asn Gln Asn Ala Gln Ala Leu Asn
930                 935                 940

Thr Leu Val Lys Gln Leu Ser Ser Asn Phe Gly Ala Ile Ser Ser Val
945                 950                 955                 960

Leu Asn Asp Ile Leu Ser Arg Leu Asp Lys Val Glu Ala Glu Val Gln
              965                 970                 975

Ile Asp Arg Leu Ile Thr Gly Arg Leu Gln Ser Leu Gln Thr Tyr Val
              980                 985                 990

Thr Gln Gln Leu Ile Arg Ala Ala Glu Ile Arg Ala Ser Ala Asn
         995                1000                1005

Leu Ala Ala Thr Lys Met Ser Glu Cys Val Leu Gly Gln Ser Lys
   1010                1015                1020

Arg Val Asp Phe Cys Gly Lys Gly Tyr His Leu Met Ser Phe Pro
   1025                1030                1035

Gln Ser Ala Pro His Gly Val Val Phe Leu His Val Thr Tyr Val
   1040                1045                1050

Pro Ala Gln Glu Lys Asn Phe Thr Thr Ala Pro Ala Ile Cys His
   1055                1060                1065

Asp Gly Lys Ala His Phe Pro Arg Glu Gly Val Phe Val Ser Asn
   1070                1075                1080

Gly Thr His Trp Phe Val Thr Gln Arg Asn Phe Tyr Glu Pro Gln
   1085                1090                1095

Ile Ile Thr Thr Asp Asn Thr Phe Val Ser Gly Asn Cys Asp Val
   1100                1105                1110

Val Ile Gly Ile Val Asn Asn Thr Val Tyr Asp Pro Leu Gln Pro
   1115                1120                1125

Glu Leu Asp Ser Phe Lys Glu Glu Leu Asp Lys Tyr Phe Lys Asn
   1130                1135                1140

His Thr Ser Pro Asp Val Asp Leu Gly Asp Ile Ser Gly Ile Asn
   1145                1150                1155

Ala Ser Val Val Asn Ile Gln Lys Glu Ile Asp Arg Leu Asn Glu
   1160                1165                1170

Val Ala Lys Asn Leu Asn Glu Ser Leu Ile Asp Leu Gln Glu Leu
   1175                1180                1185

Gly Lys Tyr Glu Gln Tyr Ile Lys Trp Pro Trp Tyr Ile Trp Leu
   1190                1195                1200

Gly Phe Ile Ala Gly Leu Ile Ala Ile Val Met Val Thr Ile Met
   1205                1210                1215

Leu Cys Cys Met Thr Ser Cys Cys Ser Cys Leu Lys Gly Cys Cys
   1220                1225                1230

Ser Cys Gly Ser Cys Cys Lys Phe Asp Glu Asp Asp Ser Glu Pro
   1235                1240                1245

Val Leu Lys Gly Val Lys Leu His Tyr Thr
   1250                1255

<210> SEQ ID NO 2
<211> LENGTH: 1295
<212> TYPE: PRT
<213> ORGANISM: Severe acute respiratory syndrome coronavirus 2

<400> SEQUENCE: 2

-continued

```
Met Gly Val Gln Val Glu Thr Ile Ser Pro Gly Asp Gly Arg Thr Phe
1               5                   10                  15

Pro Lys Arg Gly Gln Thr Cys Val Val His Tyr Thr Gly Met Leu Glu
            20                  25                  30

Asp Gly Lys Lys Val Asp Ser Ser Arg Asp Arg Asn Lys Pro Phe Lys
            35                  40                  45

Phe Met Leu Gly Lys Gln Glu Val Ile Arg Gly Trp Glu Glu Gly Val
        50                  55                  60

Ala Gln Met Ser Val Gly Gln Arg Ala Lys Leu Thr Ile Ser Pro Asp
65                  70                  75                  80

Tyr Ala Tyr Gly Ala Thr Gly His Pro Gly Ile Ile Pro Pro His Ala
                85                  90                  95

Thr Leu Val Phe Asp Val Glu Leu Leu Lys Pro Glu Gly Thr Gln Leu
            100                 105                 110

Pro Pro Ala Tyr Thr Asn Ser Phe Thr Arg Gly Val Tyr Tyr Pro Asp
            115                 120                 125

Lys Val Phe Arg Ser Ser Val Leu His Ser Thr Gln Asp Leu Phe Leu
130                 135                 140

Pro Phe Phe Ser Asn Val Thr Trp Phe His Ala Ile His Val Ser Gly
145                 150                 155                 160

Thr Asn Gly Thr Lys Arg Phe Asp Asn Pro Val Leu Pro Phe Asn Asp
                165                 170                 175

Gly Val Tyr Phe Ala Ser Thr Glu Lys Ser Asn Ile Ile Arg Gly Trp
            180                 185                 190

Ile Phe Gly Thr Thr Leu Asp Ser Lys Thr Gln Ser Leu Leu Ile Val
        195                 200                 205

Asn Asn Ala Thr Asn Val Val Ile Lys Val Cys Glu Phe Gln Phe Cys
210                 215                 220

Asn Asp Pro Phe Leu Gly Val Tyr Tyr His Lys Asn Asn Lys Ser Trp
225                 230                 235                 240

Met Glu Ser Glu Phe Arg Val Tyr Ser Ser Ala Asn Asn Cys Thr Phe
                245                 250                 255

Glu Tyr Val Ser Gln Pro Phe Leu Met Asp Leu Glu Gly Lys Gln Gly
            260                 265                 270

Asn Phe Lys Asn Leu Arg Glu Phe Val Phe Lys Asn Ile Asp Gly Tyr
        275                 280                 285

Phe Lys Ile Tyr Ser Lys His Thr Pro Ile Asn Leu Val Arg Asp Leu
        290                 295                 300

Pro Gln Gly Phe Ser Ala Leu Glu Pro Leu Val Asp Leu Pro Ile Gly
305                 310                 315                 320

Ile Asn Ile Thr Arg Phe Gln Thr Leu Leu Ala Leu His Arg Ser Tyr
                325                 330                 335

Leu Thr Pro Gly Asp Ser Ser Gly Trp Thr Ala Gly Ala Ala Ala
            340                 345                 350

Tyr Tyr Val Gly Tyr Leu Gln Pro Arg Thr Phe Leu Leu Lys Tyr Asn
            355                 360                 365

Glu Asn Gly Thr Ile Thr Asp Ala Val Asp Cys Ala Leu Asp Pro Leu
        370                 375                 380

Ser Glu Thr Lys Cys Thr Leu Lys Ser Phe Thr Val Glu Lys Gly Ile
385                 390                 395                 400

Tyr Gln Thr Ser Asn Phe Arg Val Gln Pro Thr Glu Ser Ile Val Arg
                405                 410                 415

Phe Pro Asn Ile Thr Asn Leu Cys Pro Phe Gly Glu Val Phe Asn Ala
```

```
            420                 425                 430
Thr Arg Phe Ala Ser Val Tyr Ala Trp Asn Arg Lys Arg Ile Ser Asn
            435                 440                 445

Cys Val Ala Asp Tyr Ser Val Leu Tyr Asn Ser Ala Ser Phe Ser Thr
            450                 455                 460

Phe Lys Cys Tyr Gly Val Ser Pro Thr Lys Leu Asn Asp Leu Cys Phe
465                 470                 475                 480

Thr Asn Val Tyr Ala Asp Ser Phe Val Ile Arg Gly Asp Glu Val Arg
                485                 490                 495

Gln Ile Ala Pro Gly Gln Thr Gly Lys Ile Ala Asp Tyr Asn Tyr Lys
            500                 505                 510

Leu Pro Asp Asp Phe Thr Gly Cys Val Ile Ala Trp Asn Ser Asn Asn
            515                 520                 525

Leu Asp Ser Lys Val Gly Gly Asn Tyr Asn Tyr Leu Tyr Arg Leu Phe
            530                 535                 540

Arg Lys Ser Asn Leu Lys Pro Phe Glu Arg Asp Ile Ser Thr Glu Ile
545                 550                 555                 560

Tyr Gln Ala Gly Ser Thr Pro Cys Asn Gly Val Glu Gly Phe Asn Cys
                565                 570                 575

Tyr Phe Pro Leu Gln Ser Tyr Gly Phe Gln Pro Thr Asn Gly Val Gly
            580                 585                 590

Tyr Gln Pro Tyr Arg Val Val Val Leu Ser Phe Glu Leu Leu His Ala
            595                 600                 605

Pro Ala Thr Val Cys Gly Pro Lys Lys Ser Thr Asn Leu Val Lys Asn
            610                 615                 620

Lys Cys Val Asn Phe Asn Phe Asn Gly Leu Thr Gly Thr Gly Val Leu
625                 630                 635                 640

Thr Glu Ser Asn Lys Lys Phe Leu Pro Phe Gln Gln Phe Gly Arg Asp
                645                 650                 655

Ile Ala Asp Thr Thr Asp Ala Val Arg Asp Pro Gln Thr Leu Glu Ile
            660                 665                 670

Leu Asp Ile Thr Pro Cys Ser Phe Gly Gly Val Ser Val Ile Thr Pro
            675                 680                 685

Gly Thr Asn Thr Ser Asn Gln Val Ala Val Leu Tyr Gln Asp Val Asn
            690                 695                 700

Cys Thr Glu Val Pro Val Ala Ile His Ala Asp Gln Leu Thr Pro Thr
705                 710                 715                 720

Trp Arg Val Tyr Ser Thr Gly Ser Asn Val Phe Gln Thr Arg Ala Gly
                725                 730                 735

Cys Leu Ile Gly Ala Glu His Val Asn Asn Ser Tyr Glu Cys Asp Ile
            740                 745                 750

Pro Ile Gly Ala Gly Ile Cys Ala Ser Tyr Gln Thr Gln Thr Asn Ser
            755                 760                 765

Pro Arg Arg Ala Arg Ser Val Ala Ser Gln Ser Ile Ile Ala Tyr Thr
            770                 775                 780

Met Ser Leu Gly Ala Glu Asn Ser Val Ala Tyr Ser Asn Asn Ser Ile
785                 790                 795                 800

Ala Ile Pro Thr Asn Phe Thr Ile Ser Val Thr Thr Glu Ile Leu Pro
                805                 810                 815

Val Ser Met Thr Lys Thr Ser Val Asp Cys Thr Met Tyr Ile Cys Gly
            820                 825                 830

Asp Ser Thr Glu Cys Ser Asn Leu Leu Leu Gln Tyr Gly Ser Phe Cys
            835                 840                 845
```

```
Thr Gln Leu Asn Arg Ala Leu Thr Gly Ile Ala Val Glu Gln Asp Lys
        850                 855                 860

Asn Thr Gln Glu Val Phe Ala Gln Val Lys Gln Ile Tyr Lys Thr Pro
865                 870                 875                 880

Pro Ile Lys Asp Phe Gly Gly Phe Asn Phe Ser Gln Ile Leu Pro Asp
                885                 890                 895

Pro Ser Lys Pro Ser Lys Arg Ser Phe Ile Glu Asp Leu Leu Phe Asn
            900                 905                 910

Lys Val Thr Leu Ala Asp Ala Gly Phe Ile Lys Gln Tyr Gly Asp Cys
                915                 920                 925

Leu Gly Asp Ile Ala Ala Arg Asp Leu Ile Cys Ala Gln Lys Phe Asn
        930                 935                 940

Gly Leu Thr Val Leu Pro Pro Leu Leu Thr Asp Glu Met Ile Ala Gln
945                 950                 955                 960

Tyr Thr Ser Ala Leu Leu Ala Gly Thr Ile Thr Ser Gly Trp Thr Phe
                965                 970                 975

Gly Ala Gly Ala Ala Leu Gln Ile Pro Phe Ala Met Gln Met Ala Tyr
            980                 985                 990

Arg Phe Asn Gly Ile Gly Val Thr Gln Asn Val Leu Tyr Glu Asn Gln
        995                 1000                1005

Lys Leu Ile Ala Asn Gln Phe Asn Ser Ala Ile Gly Lys Ile Gln
        1010                1015                1020

Asp Ser Leu Ser Ser Thr Ala Ser Ala Leu Gly Lys Leu Gln Asp
        1025                1030                1035

Val Val Asn Gln Asn Ala Gln Ala Leu Asn Thr Leu Val Lys Gln
        1040                1045                1050

Leu Ser Ser Asn Phe Gly Ala Ile Ser Ser Val Leu Asn Asp Ile
        1055                1060                1065

Leu Ser Arg Leu Asp Lys Val Glu Ala Glu Val Gln Ile Asp Arg
        1070                1075                1080

Leu Ile Thr Gly Arg Leu Gln Ser Leu Gln Thr Tyr Val Thr Gln
        1085                1090                1095

Gln Leu Ile Arg Ala Ala Glu Ile Arg Ala Ser Ala Asn Leu Ala
        1100                1105                1110

Ala Thr Lys Met Ser Glu Cys Val Leu Gly Gln Ser Lys Arg Val
        1115                1120                1125

Asp Phe Cys Gly Lys Gly Tyr His Leu Met Ser Phe Pro Gln Ser
        1130                1135                1140

Ala Pro His Gly Val Val Phe Leu His Val Thr Tyr Val Pro Ala
        1145                1150                1155

Gln Glu Lys Asn Phe Thr Thr Ala Pro Ala Ile Cys His Asp Gly
        1160                1165                1170

Lys Ala His Phe Pro Arg Glu Gly Val Phe Val Ser Asn Gly Thr
        1175                1180                1185

His Trp Phe Val Thr Gln Arg Asn Phe Tyr Glu Pro Gln Ile Ile
        1190                1195                1200

Thr Thr Asp Asn Thr Phe Val Ser Gly Asn Cys Asp Val Val Ile
        1205                1210                1215

Gly Ile Val Asn Asn Thr Val Tyr Asp Pro Leu Gln Pro Glu Leu
        1220                1225                1230

Asp Ser Phe Lys Glu Glu Leu Asp Lys Tyr Phe Lys Asn His Thr
        1235                1240                1245
```

```
Ser Pro Asp Val Asp Leu Gly Asp Ile Ser Gly Ile Asn Ala Ser
    1250                1255                1260

Val Val Asn Ile Gln Lys Glu Ile Asp Arg Leu Asn Glu Val Ala
    1265                1270                1275

Lys Asn Leu Asn Glu Ser Leu Ile Asp Leu Gln Glu Leu Gly Lys
    1280                1285                1290

Leu Glu
    1295

<210> SEQ ID NO 3
<211> LENGTH: 1606
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 3

Met Ala Ala Pro Gly Ser Ala Arg Arg Pro Leu Leu Leu Leu Leu
1               5                   10                  15

Leu Leu Leu Leu Gly Leu Met His Cys Ala Ser Ala Ala Met Phe Met
                20                  25                  30

Val Lys Asn Gly Asn Gly Thr Ala Cys Ile Met Ala Asn Phe Ser Ala
            35                  40                  45

Ala Phe Ser Val Asn Tyr Asp Thr Lys Ser Gly Pro Lys Asn Met Thr
    50                  55                  60

Phe Asp Leu Pro Ser Asp Ala Thr Val Val Leu Asn Arg Ser Ser Cys
65                  70                  75                  80

Gly Lys Glu Asn Thr Ser Asp Pro Ser Leu Val Ile Ala Phe Gly Arg
                85                  90                  95

Gly His Thr Leu Thr Leu Asn Phe Thr Arg Asn Ala Thr Arg Tyr Ser
            100                 105                 110

Val Gln Leu Met Ser Phe Val Tyr Asn Leu Ser Asp Thr His Leu Phe
        115                 120                 125

Pro Asn Ala Ser Ser Lys Glu Ile Lys Thr Val Glu Ser Ile Thr Asp
    130                 135                 140

Ile Arg Ala Asp Ile Asp Lys Lys Tyr Arg Cys Val Ser Gly Thr Gln
145                 150                 155                 160

Val His Met Asn Asn Val Thr Val Thr Leu His Asp Ala Thr Ile Gln
                165                 170                 175

Ala Tyr Leu Ser Asn Ser Ser Phe Ser Arg Gly Glu Thr Arg Cys Glu
            180                 185                 190

Gln Asp Arg Pro Ser Pro Thr Thr Ala Pro Pro Ala Pro Pro Ser Pro
        195                 200                 205

Ser Pro Ser Pro Val Pro Lys Ser Pro Ser Val Asp Lys Tyr Asn Val
    210                 215                 220

Ser Gly Thr Asn Gly Thr Cys Leu Leu Ala Ser Met Gly Leu Gln Leu
225                 230                 235                 240

Asn Leu Thr Tyr Glu Arg Lys Asp Asn Thr Thr Val Thr Arg Leu Leu
                245                 250                 255

Asn Ile Asn Pro Asn Lys Thr Ser Ala Ser Gly Ser Cys Gly Ala His
            260                 265                 270

Leu Val Thr Leu Glu Leu His Ser Glu Gly Thr Thr Val Leu Leu Phe
        275                 280                 285

Gln Phe Gly Met Asn Ala Ser Ser Ser Arg Phe Phe Leu Gln Gly Ile
    290                 295                 300
```

```
Gln Leu Asn Thr Ile Leu Pro Asp Ala Arg Asp Pro Ala Phe Lys Ala
305                 310                 315                 320

Ala Asn Gly Ser Leu Arg Ala Leu Gln Ala Thr Val Gly Asn Ser Tyr
            325                 330                 335

Lys Cys Asn Ala Glu Glu His Val Arg Val Thr Lys Ala Phe Ser Val
            340                 345                 350

Asn Ile Phe Lys Val Trp Val Gln Ala Phe Lys Val Glu Gly Gly Gln
            355                 360                 365

Phe Gly Ser Gly Thr Gln Leu Pro Pro Ala Tyr Thr Asn Ser Phe Thr
        370                 375                 380

Arg Gly Val Tyr Tyr Pro Asp Lys Val Phe Arg Ser Ser Val Leu His
385                 390                 395                 400

Ser Thr Gln Asp Leu Phe Leu Pro Phe Phe Ser Asn Val Thr Trp Phe
                405                 410                 415

His Ala Ile His Val Ser Gly Thr Asn Gly Thr Lys Arg Phe Asp Asn
            420                 425                 430

Pro Val Leu Pro Phe Asn Asp Gly Val Tyr Phe Ala Ser Thr Glu Lys
            435                 440                 445

Ser Asn Ile Ile Arg Gly Trp Ile Phe Gly Thr Thr Leu Asp Ser Lys
        450                 455                 460

Thr Gln Ser Leu Leu Ile Val Asn Asn Ala Thr Asn Val Val Ile Lys
465                 470                 475                 480

Val Cys Glu Phe Gln Phe Cys Asn Asp Pro Phe Leu Gly Val Tyr Tyr
                485                 490                 495

His Lys Asn Asn Lys Ser Trp Met Glu Ser Glu Phe Arg Val Tyr Ser
            500                 505                 510

Ser Ala Asn Asn Cys Thr Phe Glu Tyr Val Ser Gln Pro Phe Leu Met
        515                 520                 525

Asp Leu Glu Gly Lys Gln Gly Asn Phe Lys Asn Leu Arg Glu Phe Val
        530                 535                 540

Phe Lys Asn Ile Asp Gly Tyr Phe Lys Ile Tyr Ser Lys His Thr Pro
545                 550                 555                 560

Ile Asn Leu Val Arg Asp Leu Pro Gln Gly Phe Ser Ala Leu Glu Pro
                565                 570                 575

Leu Val Asp Leu Pro Ile Gly Ile Asn Ile Thr Arg Phe Gln Thr Leu
            580                 585                 590

Leu Ala Leu His Arg Ser Tyr Leu Thr Pro Gly Asp Ser Ser Ser Gly
            595                 600                 605

Trp Thr Ala Gly Ala Ala Ala Tyr Tyr Val Gly Tyr Leu Gln Pro Arg
        610                 615                 620

Thr Phe Leu Leu Lys Tyr Asn Glu Asn Gly Thr Ile Thr Asp Ala Val
625                 630                 635                 640

Asp Cys Ala Leu Asp Pro Leu Ser Glu Thr Lys Cys Thr Leu Lys Ser
                645                 650                 655

Phe Thr Val Glu Lys Gly Ile Tyr Gln Thr Ser Asn Phe Arg Val Gln
            660                 665                 670

Pro Thr Glu Ser Ile Val Arg Phe Pro Asn Ile Thr Asn Leu Cys Pro
        675                 680                 685

Phe Gly Glu Val Phe Asn Ala Thr Arg Phe Ala Ser Val Tyr Ala Trp
        690                 695                 700

Asn Arg Lys Arg Ile Ser Asn Cys Val Ala Asp Tyr Ser Val Leu Tyr
705                 710                 715                 720
```

```
Asn Ser Ala Ser Phe Ser Thr Phe Lys Cys Tyr Gly Val Ser Pro Thr
                725                 730                 735
Lys Leu Asn Asp Leu Cys Phe Thr Asn Val Tyr Ala Asp Ser Phe Val
            740                 745                 750
Ile Arg Gly Asp Glu Val Arg Gln Ile Ala Pro Gly Gln Thr Gly Lys
        755                 760                 765
Ile Ala Asp Tyr Asn Tyr Lys Leu Pro Asp Asp Phe Thr Gly Cys Val
    770                 775                 780
Ile Ala Trp Asn Ser Asn Leu Asp Ser Lys Val Gly Gly Asn Tyr
785                 790                 795                 800
Asn Tyr Leu Tyr Arg Leu Phe Arg Lys Ser Asn Leu Lys Pro Phe Glu
                805                 810                 815
Arg Asp Ile Ser Thr Glu Ile Tyr Gln Ala Gly Ser Thr Pro Cys Asn
            820                 825                 830
Gly Val Glu Gly Phe Asn Cys Tyr Phe Pro Leu Gln Ser Tyr Gly Phe
        835                 840                 845
Gln Pro Thr Asn Gly Val Gly Tyr Gln Pro Tyr Arg Val Val Val Leu
    850                 855                 860
Ser Phe Glu Leu Leu His Ala Pro Ala Thr Val Cys Gly Pro Lys Lys
865                 870                 875                 880
Ser Thr Asn Leu Val Lys Asn Lys Cys Val Asn Phe Asn Phe Asn Gly
                885                 890                 895
Leu Thr Gly Thr Gly Val Leu Thr Glu Ser Asn Lys Lys Phe Leu Pro
            900                 905                 910
Phe Gln Gln Phe Gly Arg Asp Ile Ala Asp Thr Thr Asp Ala Val Arg
        915                 920                 925
Asp Pro Gln Thr Leu Glu Ile Leu Asp Ile Thr Pro Cys Ser Phe Gly
    930                 935                 940
Gly Val Ser Val Ile Thr Pro Gly Thr Asn Thr Ser Asn Gln Val Ala
945                 950                 955                 960
Val Leu Tyr Gln Asp Val Asn Cys Thr Glu Val Pro Val Ala Ile His
                965                 970                 975
Ala Asp Gln Leu Thr Pro Thr Trp Arg Val Tyr Ser Thr Gly Ser Asn
            980                 985                 990
Val Phe Gln Thr Arg Ala Gly Cys Leu Ile Gly Ala Glu His Val Asn
        995                 1000                1005
Asn Ser Tyr Glu Cys Asp Ile Pro Ile Gly Ala Gly Ile Cys Ala
    1010                1015                1020
Ser Tyr Gln Thr Gln Thr Asn Ser Pro Arg Arg Ala Arg Ser Val
    1025                1030                1035
Ala Ser Gln Ser Ile Ile Ala Tyr Thr Met Ser Leu Gly Ala Glu
    1040                1045                1050
Asn Ser Val Ala Tyr Ser Asn Asn Ser Ile Ala Ile Pro Thr Asn
    1055                1060                1065
Phe Thr Ile Ser Val Thr Thr Glu Ile Leu Pro Val Ser Met Thr
    1070                1075                1080
Lys Thr Ser Val Asp Cys Thr Met Tyr Ile Cys Gly Asp Ser Thr
    1085                1090                1095
Glu Cys Ser Asn Leu Leu Leu Gln Tyr Gly Ser Phe Cys Thr Gln
    1100                1105                1110
Leu Asn Arg Ala Leu Thr Gly Ile Ala Val Glu Gln Asp Lys Asn
    1115                1120                1125
Thr Gln Glu Val Phe Ala Gln Val Lys Gln Ile Tyr Lys Thr Pro
```

-continued

```
            1130                1135                1140
Pro Ile Lys Asp Phe Gly Gly Phe Asn Phe Ser Gln Ile Leu Pro
            1145                1150                1155
Asp Pro Ser Lys Pro Ser Lys Arg Ser Phe Ile Glu Asp Leu Leu
            1160                1165                1170
Phe Asn Lys Val Thr Leu Ala Asp Ala Gly Phe Ile Lys Gln Tyr
            1175                1180                1185
Gly Asp Cys Leu Gly Asp Ile Ala Ala Arg Asp Leu Ile Cys Ala
            1190                1195                1200
Gln Lys Phe Asn Gly Leu Thr Val Leu Pro Pro Leu Leu Thr Asp
            1205                1210                1215
Glu Met Ile Ala Gln Tyr Thr Ser Ala Leu Leu Ala Gly Thr Ile
            1220                1225                1230
Thr Ser Gly Trp Thr Phe Gly Ala Gly Ala Ala Leu Gln Ile Pro
            1235                1240                1245
Phe Ala Met Gln Met Ala Tyr Arg Phe Asn Gly Ile Gly Val Thr
            1250                1255                1260
Gln Asn Val Leu Tyr Glu Asn Gln Lys Leu Ile Ala Asn Gln Phe
            1265                1270                1275
Asn Ser Ala Ile Gly Lys Ile Gln Asp Ser Leu Ser Ser Thr Ala
            1280                1285                1290
Ser Ala Leu Gly Lys Leu Gln Asp Val Val Asn Gln Asn Ala Gln
            1295                1300                1305
Ala Leu Asn Thr Leu Val Lys Gln Leu Ser Ser Asn Phe Gly Ala
            1310                1315                1320
Ile Ser Ser Val Leu Asn Asp Ile Leu Ser Arg Leu Asp Lys Val
            1325                1330                1335
Glu Ala Glu Val Gln Ile Asp Arg Leu Ile Thr Gly Arg Leu Gln
            1340                1345                1350
Ser Leu Gln Thr Tyr Val Thr Gln Gln Leu Ile Arg Ala Ala Glu
            1355                1360                1365
Ile Arg Ala Ser Ala Asn Leu Ala Ala Thr Lys Met Ser Glu Cys
            1370                1375                1380
Val Leu Gly Gln Ser Lys Arg Val Asp Phe Cys Gly Lys Gly Tyr
            1385                1390                1395
His Leu Met Ser Phe Pro Gln Ser Ala Pro His Gly Val Val Phe
            1400                1405                1410
Leu His Val Thr Tyr Val Pro Ala Gln Glu Lys Asn Phe Thr Thr
            1415                1420                1425
Ala Pro Ala Ile Cys His Asp Gly Lys Ala His Phe Pro Arg Glu
            1430                1435                1440
Gly Val Phe Val Ser Asn Gly Thr His Trp Phe Val Thr Gln Arg
            1445                1450                1455
Asn Phe Tyr Glu Pro Gln Ile Ile Thr Thr Asp Asn Thr Phe Val
            1460                1465                1470
Ser Gly Asn Cys Asp Val Val Ile Gly Ile Val Asn Asn Thr Val
            1475                1480                1485
Tyr Asp Pro Leu Gln Pro Glu Leu Asp Ser Phe Lys Glu Glu Leu
            1490                1495                1500
Asp Lys Tyr Phe Lys Asn His Thr Ser Pro Asp Val Asp Leu Gly
            1505                1510                1515
Asp Ile Ser Gly Ile Asn Ala Ser Val Val Asn Ile Gln Lys Glu
            1520                1525                1530
```

-continued

```
Ile Asp Arg Leu Asn Glu Val Ala Lys Asn Leu Asn Glu Ser Leu
    1535                1540                1545

Ile Asp Leu Gln Glu Leu Gly Lys Leu Glu Gly Ser Val Glu Glu
    1550                1555                1560

Cys Leu Leu Asp Glu Asn Ser Met Leu Ile Pro Ile Ala Val Gly
    1565                1570                1575

Gly Ala Leu Ala Gly Leu Val Leu Ile Val Leu Ile Ala Tyr Leu
    1580                1585                1590

Val Gly Arg Lys Arg Ser His Ala Gly Tyr Gln Thr Ile
    1595                1600                1605

<210> SEQ ID NO 4
<211> LENGTH: 841
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 4

Met Ala Ala Pro Gly Ser Ala Arg Arg Pro Leu Leu Leu Leu Leu
1               5                   10                  15

Leu Leu Leu Gly Leu Met His Cys Ala Ser Ala Ala Met Phe Met
                20                  25                  30

Val Lys Asn Gly Asn Gly Thr Ala Cys Ile Met Ala Asn Phe Ser Ala
                35                  40                  45

Ala Phe Ser Val Asn Tyr Asp Thr Lys Ser Gly Pro Lys Asn Met Thr
50                  55                  60

Phe Asp Leu Pro Ser Asp Ala Thr Val Val Leu Asn Arg Ser Ser Cys
65                  70                  75                  80

Gly Lys Glu Asn Thr Ser Asp Pro Ser Leu Val Ile Ala Phe Gly Arg
                85                  90                  95

Gly His Thr Leu Thr Leu Asn Phe Thr Arg Asn Ala Thr Arg Tyr Ser
                100                 105                 110

Val Gln Leu Met Ser Phe Val Tyr Asn Leu Ser Asp Thr His Leu Phe
                115                 120                 125

Pro Asn Ala Ser Ser Lys Glu Ile Lys Thr Val Glu Ser Ile Thr Asp
                130                 135                 140

Ile Arg Ala Asp Ile Asp Lys Lys Tyr Arg Cys Val Ser Gly Thr Gln
145                 150                 155                 160

Val His Met Asn Asn Val Thr Val Thr Leu His Asp Ala Thr Ile Gln
                165                 170                 175

Ala Tyr Leu Ser Asn Ser Ser Phe Ser Arg Gly Glu Thr Arg Cys Glu
                180                 185                 190

Gln Asp Arg Pro Ser Pro Thr Thr Ala Pro Ala Pro Pro Ser Pro
                195                 200                 205

Ser Pro Ser Pro Val Pro Lys Ser Pro Ser Val Asp Lys Tyr Asn Val
                210                 215                 220

Ser Gly Thr Asn Gly Thr Cys Leu Leu Ala Ser Met Gly Leu Gln Leu
225                 230                 235                 240

Asn Leu Thr Tyr Glu Arg Lys Asp Asn Thr Thr Val Thr Arg Leu Leu
                245                 250                 255

Asn Ile Asn Pro Asn Lys Thr Ser Ala Ser Gly Ser Cys Gly Ala His
                260                 265                 270

Leu Val Thr Leu Glu Leu His Ser Glu Gly Thr Thr Val Leu Leu Phe
```

```
                275                 280                 285
Gln Phe Gly Met Asn Ala Ser Ser Arg Phe Phe Leu Gln Gly Ile
290                 295                 300
Gln Leu Asn Thr Ile Leu Pro Asp Ala Arg Asp Pro Ala Phe Lys Ala
305                 310                 315                 320
Ala Asn Gly Ser Leu Arg Ala Leu Gln Ala Thr Val Gly Asn Ser Tyr
                325                 330                 335
Lys Cys Asn Ala Glu Glu His Val Arg Val Thr Lys Ala Phe Ser Val
                340                 345                 350
Asn Ile Phe Lys Val Trp Val Gln Ala Phe Lys Val Glu Gly Gly Gln
                355                 360                 365
Phe Gly Ser Gly Thr Ser Asp Asn Gly Pro Gln Asn Gln Arg Asn Ala
370                 375                 380
Pro Arg Ile Thr Phe Gly Gly Pro Ser Asp Ser Thr Gly Ser Asn Gln
385                 390                 395                 400
Asn Gly Glu Arg Ser Gly Ala Arg Ser Lys Gln Arg Arg Pro Gln Gly
                405                 410                 415
Leu Pro Asn Asn Thr Ala Ser Trp Phe Thr Ala Leu Thr Gln His Gly
                420                 425                 430
Lys Glu Asp Leu Lys Phe Pro Arg Gly Gln Gly Val Pro Ile Asn Thr
                435                 440                 445
Asn Ser Ser Pro Asp Asp Gln Ile Gly Tyr Tyr Arg Arg Ala Thr Arg
450                 455                 460
Arg Ile Arg Gly Gly Asp Gly Lys Met Lys Asp Leu Ser Pro Arg Trp
465                 470                 475                 480
Tyr Phe Tyr Tyr Leu Gly Thr Gly Pro Glu Ala Gly Leu Pro Tyr Gly
                485                 490                 495
Ala Asn Lys Asp Gly Ile Ile Trp Val Ala Thr Glu Gly Ala Leu Asn
                500                 505                 510
Thr Pro Lys Asp His Ile Gly Thr Arg Asn Pro Ala Asn Asn Ala Ala
                515                 520                 525
Ile Val Leu Gln Leu Pro Gln Gly Thr Thr Leu Pro Lys Gly Phe Tyr
530                 535                 540
Ala Glu Gly Ser Arg Gly Gly Ser Gln Ala Ser Ser Arg Ser Ser Ser
545                 550                 555                 560
Arg Ser Arg Asn Ser Ser Arg Asn Ser Thr Pro Gly Ser Ser Arg Gly
                565                 570                 575
Thr Ser Pro Ala Arg Met Ala Gly Asn Gly Gly Asp Ala Ala Leu Ala
                580                 585                 590
Leu Leu Leu Leu Asp Arg Leu Asn Gln Leu Glu Ser Lys Met Ser Gly
                595                 600                 605
Lys Gly Gln Gln Gln Gly Gln Thr Val Thr Lys Lys Ser Ala Ala
610                 615                 620
Glu Ala Ser Lys Lys Pro Arg Gln Lys Arg Thr Ala Thr Lys Ala Tyr
625                 630                 635                 640
Asn Val Thr Gln Ala Phe Gly Arg Arg Gly Pro Glu Gln Thr Gln Gly
                645                 650                 655
Asn Phe Gly Asp Gln Glu Leu Ile Arg Gln Gly Thr Asp Tyr Lys His
                660                 665                 670
Trp Pro Gln Ile Ala Gln Phe Ala Pro Ser Ala Ser Ala Phe Phe Gly
                675                 680                 685
Met Ser Arg Ile Gly Met Glu Val Thr Pro Ser Gly Thr Trp Leu Thr
690                 695                 700
```

Tyr Thr Gly Ala Ile Lys Leu Asp Asp Lys Asp Pro Asn Phe Lys Asp
705                 710                 715                 720

Gln Val Ile Leu Leu Asn Lys His Ile Asp Ala Tyr Lys Thr Phe Pro
            725                 730                 735

Pro Thr Glu Pro Lys Lys Asp Lys Lys Lys Ala Asp Glu Thr Gln
        740                 745                 750

Ala Leu Pro Gln Arg Gln Lys Lys Gln Gln Thr Val Thr Leu Leu Pro
            755                 760                 765

Ala Ala Asp Leu Asp Asp Phe Ser Lys Gln Leu Gln Gln Ser Met Ser
    770                 775                 780

Ser Ala Asp Ser Thr Gln Ala Leu Glu Gly Val Glu Glu Cys Leu
785                 790                 795                 800

Leu Asp Glu Asn Ser Met Leu Ile Pro Ile Ala Val Gly Gly Ala Leu
                805                 810                 815

Ala Gly Leu Val Leu Ile Val Leu Ile Ala Tyr Leu Val Gly Arg Lys
            820                 825                 830

Arg Ser His Ala Gly Tyr Gln Thr Ile
        835                 840

<210> SEQ ID NO 5
<211> LENGTH: 222
<212> TYPE: PRT
<213> ORGANISM: Severe acute respiratory syndrome coronavirus 2

<400> SEQUENCE: 5

Met Ala Asp Ser Asn Gly Thr Ile Thr Val Glu Glu Leu Lys Lys Leu
1               5                   10                  15

Leu Glu Gln Trp Asn Leu Val Ile Gly Phe Leu Phe Leu Thr Trp Ile
            20                  25                  30

Cys Leu Leu Gln Phe Ala Tyr Ala Asn Arg Asn Arg Phe Leu Tyr Ile
        35                  40                  45

Ile Lys Leu Ile Phe Leu Trp Leu Leu Trp Pro Val Thr Leu Ala Cys
    50                  55                  60

Phe Val Leu Ala Ala Val Tyr Arg Ile Asn Trp Ile Thr Gly Gly Ile
65                  70                  75                  80

Ala Ile Ala Met Ala Cys Leu Val Gly Leu Met Trp Leu Ser Tyr Phe
                85                  90                  95

Ile Ala Ser Phe Arg Leu Phe Ala Arg Thr Arg Ser Met Trp Ser Phe
            100                 105                 110

Asn Pro Glu Thr Asn Ile Leu Leu Asn Val Pro Leu His Gly Thr Ile
        115                 120                 125

Leu Thr Arg Pro Leu Leu Glu Ser Glu Leu Val Ile Gly Ala Val Ile
    130                 135                 140

Leu Arg Gly His Leu Arg Ile Ala Gly His His Leu Gly Arg Cys Asp
145                 150                 155                 160

Ile Lys Asp Leu Pro Lys Glu Ile Thr Val Ala Thr Ser Arg Thr Leu
                165                 170                 175

Ser Tyr Tyr Lys Leu Gly Ala Ser Gln Arg Val Ala Gly Asp Ser Gly
            180                 185                 190

Phe Ala Ala Tyr Ser Arg Tyr Arg Ile Gly Asn Tyr Lys Leu Asn Thr
        195                 200                 205

Asp His Ser Ser Ser Ser Asp Asn Ile Ala Leu Leu Val Gln
    210                 215                 220

```
<210> SEQ ID NO 6
<211> LENGTH: 75
<212> TYPE: PRT
<213> ORGANISM: Severe acute respiratory syndrome coronavirus 2

<400> SEQUENCE: 6

Met Tyr Ser Phe Val Ser Glu Glu Thr Gly Thr Leu Ile Val Asn Ser
1               5                   10                  15

Val Leu Leu Phe Leu Ala Phe Val Val Phe Leu Leu Val Thr Leu Ala
            20                  25                  30

Ile Leu Thr Ala Leu Arg Leu Cys Ala Tyr Cys Cys Asn Ile Val Asn
        35                  40                  45

Val Ser Leu Val Lys Pro Ser Phe Tyr Val Tyr Ser Arg Val Lys Asn
    50                  55                  60

Leu Asn Ser Ser Arg Val Pro Asp Leu Leu Val
65                  70                  75

<210> SEQ ID NO 7
<211> LENGTH: 1293
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 7

Met Gly Val Gln Val Glu Thr Ile Ser Pro Gly Asp Gly Arg Thr Phe
1               5                   10                  15

Pro Lys Arg Gly Gln Thr Cys Val Val His Tyr Thr Gly Met Leu Glu
            20                  25                  30

Asp Gly Lys Lys Val Asp Ser Ser Arg Asp Arg Asn Lys Pro Phe Lys
        35                  40                  45

Phe Met Leu Gly Lys Gln Glu Val Ile Arg Gly Trp Glu Glu Gly Val
    50                  55                  60

Ala Gln Met Ser Val Gly Gln Arg Ala Lys Leu Thr Ile Ser Pro Asp
65                  70                  75                  80

Tyr Ala Tyr Gly Ala Thr Gly His Pro Gly Ile Ile Pro Pro His Ala
                85                  90                  95

Thr Leu Val Phe Asp Val Glu Leu Leu Lys Pro Glu Gly Thr Gln Leu
            100                 105                 110

Pro Pro Ala Tyr Thr Asn Ser Phe Thr Arg Gly Val Tyr Tyr Pro Asp
        115                 120                 125

Lys Val Phe Arg Ser Ser Val Leu His Ser Thr Gln Asp Leu Phe Leu
    130                 135                 140

Pro Phe Phe Ser Asn Val Thr Trp Phe His Ala Ile His Val Ser Gly
145                 150                 155                 160

Thr Asn Gly Thr Lys Arg Phe Asp Asn Pro Val Leu Pro Phe Asn Asp
                165                 170                 175

Gly Val Tyr Phe Ala Ser Thr Glu Lys Ser Asn Ile Ile Arg Gly Trp
            180                 185                 190

Ile Phe Gly Thr Thr Leu Asp Ser Lys Thr Gln Ser Leu Leu Ile Val
        195                 200                 205

Asn Asn Ala Thr Asn Val Val Ile Lys Val Cys Glu Phe Gln Phe Cys
    210                 215                 220

Asn Asp Pro Phe Leu Gly Val Tyr Tyr His Lys Asn Asn Lys Ser Trp
225                 230                 235                 240

Met Glu Ser Glu Phe Arg Val Tyr Ser Ser Ala Asn Asn Cys Thr Phe
```

-continued

```
            245                 250                 255
Glu Tyr Val Ser Gln Pro Phe Leu Met Asp Leu Glu Gly Lys Gln Gly
            260                 265                 270

Asn Phe Lys Asn Leu Arg Glu Phe Val Phe Lys Asn Ile Asp Gly Tyr
            275                 280                 285

Phe Lys Ile Tyr Ser Lys His Thr Pro Ile Asn Leu Val Arg Asp Leu
            290                 295                 300

Pro Gln Gly Phe Ser Ala Leu Glu Pro Leu Val Asp Leu Pro Ile Gly
305                 310                 315                 320

Ile Asn Ile Thr Arg Phe Gln Thr Leu Leu Ala Leu His Arg Ser Tyr
                325                 330                 335

Leu Thr Pro Gly Asp Ser Ser Ser Gly Trp Thr Ala Gly Ala Ala Ala
                340                 345                 350

Tyr Tyr Val Gly Tyr Leu Gln Pro Arg Thr Phe Leu Leu Lys Tyr Asn
                355                 360                 365

Glu Asn Gly Thr Ile Thr Asp Ala Val Asp Cys Ala Leu Asp Pro Leu
370                 375                 380

Ser Glu Thr Lys Cys Thr Leu Lys Ser Phe Thr Val Glu Lys Gly Ile
385                 390                 395                 400

Tyr Gln Thr Ser Asn Phe Arg Val Gln Pro Thr Glu Ser Ile Val Arg
                405                 410                 415

Phe Pro Asn Ile Thr Asn Leu Cys Pro Phe Gly Glu Val Phe Asn Ala
                420                 425                 430

Thr Arg Phe Ala Ser Val Tyr Ala Trp Asn Arg Lys Arg Ile Ser Asn
                435                 440                 445

Cys Val Ala Asp Tyr Ser Val Leu Tyr Asn Ser Ala Ser Phe Ser Thr
                450                 455                 460

Phe Lys Cys Tyr Gly Val Ser Pro Thr Lys Leu Asn Asp Leu Cys Phe
465                 470                 475                 480

Thr Asn Val Tyr Ala Asp Ser Phe Val Ile Arg Gly Asp Glu Val Arg
                485                 490                 495

Gln Ile Ala Pro Gly Gln Thr Gly Lys Ile Ala Asp Tyr Asn Tyr Lys
                500                 505                 510

Leu Pro Asp Asp Phe Thr Gly Cys Val Ile Ala Trp Asn Ser Asn Asn
                515                 520                 525

Leu Asp Ser Lys Val Gly Gly Asn Tyr Asn Tyr Leu Tyr Arg Leu Phe
                530                 535                 540

Arg Lys Ser Asn Leu Lys Pro Phe Glu Arg Asp Ile Ser Thr Glu Ile
545                 550                 555                 560

Tyr Gln Ala Gly Ser Thr Pro Cys Asn Gly Val Glu Gly Phe Asn Cys
                565                 570                 575

Tyr Phe Pro Leu Gln Ser Tyr Gly Phe Gln Pro Thr Asn Gly Val Gly
                580                 585                 590

Tyr Gln Pro Tyr Arg Val Val Val Leu Ser Phe Glu Leu Leu His Ala
                595                 600                 605

Pro Ala Thr Val Cys Gly Pro Lys Lys Ser Thr Asn Leu Val Lys Asn
                610                 615                 620

Lys Cys Val Asn Phe Asn Phe Asn Gly Leu Thr Gly Thr Gly Val Leu
625                 630                 635                 640

Thr Glu Ser Asn Lys Lys Phe Leu Pro Phe Gln Gln Phe Gly Arg Asp
                645                 650                 655

Ile Ala Asp Thr Thr Asp Ala Val Arg Asp Pro Gln Thr Leu Glu Ile
                660                 665                 670
```

-continued

```
Leu Asp Ile Thr Pro Cys Ser Phe Gly Gly Val Ser Ile Thr Pro
        675                 680                 685
Gly Thr Asn Thr Ser Asn Gln Val Ala Val Leu Tyr Gln Asp Val Asn
690                 695                 700
Cys Thr Glu Val Pro Val Ala Ile His Ala Asp Gln Leu Thr Pro Thr
705                 710                 715                 720
Trp Arg Val Tyr Ser Thr Gly Ser Asn Val Phe Gln Thr Arg Ala Gly
                725                 730                 735
Cys Leu Ile Gly Ala Glu His Val Asn Asn Ser Tyr Glu Cys Asp Ile
                740                 745                 750
Pro Ile Gly Ala Gly Ile Cys Ala Ser Tyr Gln Thr Gln Thr Asn Ser
            755                 760                 765
Pro Arg Arg Ala Arg Ser Val Ala Ser Gln Ser Ile Ile Ala Tyr Thr
770                 775                 780
Met Ser Leu Gly Ala Glu Asn Ser Val Ala Tyr Ser Asn Asn Ser Ile
785                 790                 795                 800
Ala Ile Pro Thr Asn Phe Thr Ile Ser Val Thr Thr Glu Ile Leu Pro
                805                 810                 815
Val Ser Met Thr Lys Thr Ser Val Asp Cys Thr Met Tyr Ile Cys Gly
            820                 825                 830
Asp Ser Thr Glu Cys Ser Asn Leu Leu Leu Gln Tyr Gly Ser Phe Cys
                835                 840                 845
Thr Gln Leu Asn Arg Ala Leu Thr Gly Ile Ala Val Glu Gln Asp Lys
850                 855                 860
Asn Thr Gln Glu Val Phe Ala Gln Val Lys Gln Ile Tyr Lys Thr Pro
865                 870                 875                 880
Pro Ile Lys Asp Phe Gly Gly Phe Asn Phe Ser Gln Ile Leu Pro Asp
                885                 890                 895
Pro Ser Lys Pro Ser Lys Arg Ser Phe Ile Glu Asp Leu Leu Phe Asn
            900                 905                 910
Lys Val Thr Leu Ala Asp Ala Gly Phe Ile Lys Gln Tyr Gly Asp Cys
        915                 920                 925
Leu Gly Asp Ile Ala Ala Arg Asp Leu Ile Cys Ala Gln Lys Phe Asn
    930                 935                 940
Gly Leu Thr Val Leu Pro Pro Leu Leu Thr Asp Glu Met Ile Ala Gln
945                 950                 955                 960
Tyr Thr Ser Ala Leu Leu Ala Gly Thr Ile Thr Ser Gly Trp Thr Phe
                965                 970                 975
Gly Ala Gly Ala Ala Leu Gln Ile Pro Phe Ala Met Gln Met Ala Tyr
            980                 985                 990
Arg Phe Asn Gly Ile Gly Val Thr Gln Asn Val Leu Tyr Glu Asn Gln
        995                 1000                1005
Lys Leu Ile Ala Asn Gln Phe Asn Ser Ala Ile Gly Lys Ile Gln
    1010                1015                1020
Asp Ser Leu Ser Ser Thr Ala Ser Ala Leu Gly Lys Leu Gln Asp
    1025                1030                1035
Val Val Asn Gln Asn Ala Gln Ala Leu Asn Thr Leu Val Lys Gln
    1040                1045                1050
Leu Ser Ser Asn Phe Gly Ala Ile Ser Ser Val Leu Asn Asp Ile
    1055                1060                1065
Leu Ser Arg Leu Asp Lys Val Glu Ala Glu Val Gln Ile Asp Arg
    1070                1075                1080
```

```
Leu Ile Thr Gly Arg Leu Gln Ser Leu Gln Thr Tyr Val Thr Gln
    1085                1090                1095

Gln Leu Ile Arg Ala Ala Glu Ile Arg Ala Ser Ala Asn Leu Ala
    1100                1105                1110

Ala Thr Lys Met Ser Glu Cys Val Leu Gly Gln Ser Lys Arg Val
    1115                1120                1125

Asp Phe Cys Gly Lys Gly Tyr His Leu Met Ser Phe Pro Gln Ser
    1130                1135                1140

Ala Pro His Gly Val Val Phe Leu His Val Thr Tyr Val Pro Ala
    1145                1150                1155

Gln Glu Lys Asn Phe Thr Thr Ala Pro Ala Ile Cys His Asp Gly
    1160                1165                1170

Lys Ala His Phe Pro Arg Glu Gly Val Phe Val Ser Asn Gly Thr
    1175                1180                1185

His Trp Phe Val Thr Gln Arg Asn Phe Tyr Glu Pro Gln Ile Ile
    1190                1195                1200

Thr Thr Asp Asn Thr Phe Val Ser Gly Asn Cys Asp Val Val Ile
    1205                1210                1215

Gly Ile Val Asn Asn Thr Val Tyr Asp Pro Leu Gln Pro Glu Leu
    1220                1225                1230

Asp Ser Phe Lys Glu Glu Leu Asp Lys Tyr Phe Lys Asn His Thr
    1235                1240                1245

Ser Pro Asp Val Asp Leu Gly Asp Ile Ser Gly Ile Asn Ala Ser
    1250                1255                1260

Val Val Asn Ile Gln Lys Glu Ile Asp Arg Leu Asn Glu Val Ala
    1265                1270                1275

Lys Asn Leu Asn Glu Ser Leu Ile Asp Leu Gln Glu Leu Gly Lys
    1280                1285                1290

<210> SEQ ID NO 8
<211> LENGTH: 529
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 8

Met Gly Val Gln Val Glu Thr Ile Ser Pro Gly Asp Gly Arg Thr Phe
1               5                   10                  15

Pro Lys Arg Gly Gln Thr Cys Val Val His Tyr Thr Gly Met Leu Glu
                20                  25                  30

Asp Gly Lys Lys Val Asp Ser Ser Arg Asp Arg Asn Lys Pro Phe Lys
            35                  40                  45

Phe Met Leu Gly Lys Gln Glu Val Ile Arg Gly Trp Glu Glu Gly Val
    50                  55                  60

Ala Gln Met Ser Val Gly Gln Arg Ala Lys Leu Thr Ile Ser Pro Asp
65                  70                  75                  80

Tyr Ala Tyr Gly Ala Thr Gly His Pro Gly Ile Ile Pro Pro His Ala
                85                  90                  95

Thr Leu Val Phe Asp Val Glu Leu Leu Lys Pro Glu Gly Thr Met Ser
            100                 105                 110

Asp Asn Gly Pro Gln Asn Gln Arg Asn Ala Pro Arg Ile Thr Phe Gly
        115                 120                 125

Gly Pro Ser Asp Ser Thr Gly Ser Asn Gln Asn Gly Glu Arg Ser Gly
    130                 135                 140
```

Ala Arg Ser Lys Gln Arg Arg Pro Gln Gly Leu Pro Asn Asn Thr Ala
145                 150                 155                 160

Ser Trp Phe Thr Ala Leu Thr Gln His Gly Lys Glu Asp Leu Lys Phe
            165                 170                 175

Pro Arg Gly Gln Gly Val Pro Ile Asn Thr Asn Ser Ser Pro Asp Asp
        180                 185                 190

Gln Ile Gly Tyr Tyr Arg Arg Ala Thr Arg Arg Ile Arg Gly Gly Asp
    195                 200                 205

Gly Lys Met Lys Asp Leu Ser Pro Arg Trp Tyr Phe Tyr Tyr Leu Gly
210                 215                 220

Thr Gly Pro Glu Ala Gly Leu Pro Tyr Gly Ala Asn Lys Asp Gly Ile
225                 230                 235                 240

Ile Trp Val Ala Thr Glu Gly Ala Leu Asn Thr Pro Lys Asp His Ile
            245                 250                 255

Gly Thr Arg Asn Pro Ala Asn Asn Ala Ala Ile Val Leu Gln Leu Pro
        260                 265                 270

Gln Gly Thr Thr Leu Pro Lys Gly Phe Tyr Ala Glu Gly Ser Arg Gly
    275                 280                 285

Gly Ser Gln Ala Ser Ser Arg Ser Ser Ser Arg Ser Arg Asn Ser Ser
290                 295                 300

Arg Asn Ser Thr Pro Gly Ser Ser Arg Gly Thr Ser Pro Ala Arg Met
305                 310                 315                 320

Ala Gly Asn Gly Gly Asp Ala Ala Leu Ala Leu Leu Leu Leu Asp Arg
            325                 330                 335

Leu Asn Gln Leu Glu Ser Lys Met Ser Gly Lys Gly Gln Gln Gln Gln
        340                 345                 350

Gly Gln Thr Val Thr Lys Lys Ser Ala Ala Glu Ala Ser Lys Lys Pro
    355                 360                 365

Arg Gln Lys Arg Thr Ala Thr Lys Ala Tyr Asn Val Thr Gln Ala Phe
370                 375                 380

Gly Arg Arg Gly Pro Glu Gln Thr Gln Gly Asn Phe Gly Asp Gln Glu
385                 390                 395                 400

Leu Ile Arg Gln Gly Thr Asp Tyr Lys His Trp Pro Gln Ile Ala Gln
            405                 410                 415

Phe Ala Pro Ser Ala Ser Ala Phe Phe Gly Met Ser Arg Ile Gly Met
        420                 425                 430

Glu Val Thr Pro Ser Gly Thr Trp Leu Thr Tyr Thr Gly Ala Ile Lys
    435                 440                 445

Leu Asp Asp Lys Asp Pro Asn Phe Lys Asp Gln Val Ile Leu Leu Asn
450                 455                 460

Lys His Ile Asp Ala Tyr Lys Thr Phe Pro Pro Thr Glu Pro Lys Lys
465                 470                 475                 480

Asp Lys Lys Lys Lys Ala Asp Glu Thr Gln Ala Leu Pro Gln Arg Gln
            485                 490                 495

Lys Lys Gln Gln Thr Val Thr Leu Leu Pro Ala Ala Asp Leu Asp Asp
        500                 505                 510

Phe Ser Lys Gln Leu Gln Gln Ser Met Ser Ser Ala Asp Ser Thr Gln
    515                 520                 525

Ala

<210> SEQ ID NO 9
<211> LENGTH: 809
<212> TYPE: PRT

<213> ORGANISM: Artificial Sequence
<220> FEATURE:
<223> OTHER INFORMATION: Description of Artificial Sequence: Synthetic polypeptide

<400> SEQUENCE: 9

Met Asn Ile Thr Asn Leu Cys Pro Phe Gly Glu Val Phe Asn Ala Thr
1               5                   10                  15

Arg Phe Ala Ser Val Tyr Ala Trp Asn Arg Lys Arg Ile Ser Asn Cys
            20                  25                  30

Val Ala Asp Tyr Ser Val Leu Tyr Asn Ser Ala Ser Phe Ser Thr Phe
        35                  40                  45

Lys Cys Tyr Gly Val Ser Pro Thr Lys Leu Asn Asp Leu Cys Phe Thr
    50                  55                  60

Asn Val Tyr Ala Asp Ser Phe Val Ile Arg Gly Asp Glu Val Arg Gln
65                  70                  75                  80

Ile Ala Pro Gly Gln Thr Gly Lys Ile Ala Asp Tyr Asn Tyr Lys Leu
                85                  90                  95

Pro Asp Asp Phe Thr Gly Cys Val Ile Ala Trp Asn Ser Asn Asn Leu
            100                 105                 110

Asp Ser Lys Val Gly Gly Asn Tyr Asn Tyr Leu Tyr Arg Leu Phe Arg
        115                 120                 125

Lys Ser Asn Leu Lys Pro Phe Glu Arg Asp Ile Ser Thr Glu Ile Tyr
130                 135                 140

Gln Ala Gly Ser Thr Pro Cys Asn Gly Val Glu Gly Phe Asn Cys Tyr
145                 150                 155                 160

Phe Pro Leu Gln Ser Tyr Gly Phe Gln Pro Thr Asn Gly Val Gly Tyr
                165                 170                 175

Gln Pro Tyr Arg Val Val Val Leu Ser Phe Glu Leu Leu His Ala Pro
            180                 185                 190

Ala Thr Val Ser Asp Asn Gly Pro Gln Asn Gln Arg Asn Ala Pro Arg
        195                 200                 205

Ile Thr Phe Gly Gly Pro Ser Asp Ser Thr Gly Ser Asn Gln Asn Gly
210                 215                 220

Glu Arg Ser Gly Ala Arg Ser Lys Gln Arg Arg Pro Gln Gly Leu Pro
225                 230                 235                 240

Asn Asn Thr Ala Ser Trp Phe Thr Ala Leu Thr Gln His Gly Lys Glu
                245                 250                 255

Asp Leu Lys Phe Pro Arg Gly Gln Gly Val Pro Ile Asn Thr Asn Ser
            260                 265                 270

Ser Pro Asp Asp Gln Ile Gly Tyr Tyr Arg Arg Ala Thr Arg Arg Ile
        275                 280                 285

Arg Gly Gly Asp Gly Lys Met Lys Asp Leu Ser Pro Arg Trp Tyr Phe
290                 295                 300

Tyr Tyr Leu Gly Thr Gly Pro Glu Ala Gly Leu Pro Tyr Gly Ala Asn
305                 310                 315                 320

Lys Asp Gly Ile Ile Trp Val Ala Thr Glu Gly Ala Leu Asn Thr Pro
                325                 330                 335

Lys Asp His Ile Gly Thr Arg Asn Pro Ala Asn Asn Ala Ala Ile Val
            340                 345                 350

Leu Gln Leu Pro Gln Gly Thr Thr Leu Pro Lys Gly Phe Tyr Ala Glu
        355                 360                 365

Gly Ser Arg Gly Gly Ser Gln Ala Ser Ser Arg Ser Ser Ser Arg Ser
370                 375                 380

-continued

Arg Asn Ser Ser Arg Asn Ser Thr Pro Gly Ser Ser Arg Gly Thr Ser
385                 390                 395                 400

Pro Ala Arg Met Ala Gly Asn Gly Gly Asp Ala Ala Leu Ala Leu Leu
            405                 410                 415

Leu Leu Asp Arg Leu Asn Gln Leu Glu Ser Lys Met Ser Gly Lys Gly
        420                 425                 430

Gln Gln Gln Gln Gly Gln Thr Val Thr Lys Lys Ser Ala Ala Glu Ala
            435                 440                 445

Ser Lys Lys Pro Arg Gln Lys Arg Thr Ala Thr Lys Ala Tyr Asn Val
450                 455                 460

Thr Gln Ala Phe Gly Arg Arg Gly Pro Glu Gln Thr Gln Gly Asn Phe
465                 470                 475                 480

Gly Asp Gln Glu Leu Ile Arg Gln Gly Thr Asp Tyr Lys His Trp Pro
            485                 490                 495

Gln Ile Ala Gln Phe Ala Pro Ser Ala Ser Ala Phe Phe Gly Met Ser
            500                 505                 510

Arg Ile Gly Met Glu Val Thr Pro Ser Gly Thr Trp Leu Thr Tyr Thr
            515                 520                 525

Gly Ala Ile Lys Leu Asp Asp Lys Asp Pro Asn Phe Lys Asp Gln Val
530                 535                 540

Ile Leu Leu Asn Lys His Ile Asp Ala Tyr Lys Thr Phe Pro Pro Thr
545                 550                 555                 560

Glu Pro Lys Lys Asp Lys Lys Lys Lys Ala Asp Glu Thr Gln Ala Leu
            565                 570                 575

Pro Gln Arg Gln Lys Lys Gln Gln Thr Val Thr Leu Leu Pro Ala Ala
            580                 585                 590

Asp Leu Asp Asp Phe Ser Lys Gln Leu Gln Gln Ser Met Ser Ser Ala
            595                 600                 605

Asp Ser Thr Gln Ala Ala Asp Ser Asn Gly Thr Ile Thr Val Glu Glu
            610                 615                 620

Leu Lys Lys Leu Leu Glu Gln Arg Leu Phe Ala Arg Thr Arg Ser Met
625                 630                 635                 640

Trp Ser Phe Asn Pro Glu Thr Asn Ile Leu Leu Asn Val Pro Leu His
            645                 650                 655

Gly Thr Ile Leu Thr Arg Pro Leu Leu Glu Ser Glu Leu Val Ile Gly
            660                 665                 670

Ala Val Ile Leu Arg Gly His Leu Arg Ile Ala Gly His His Leu Gly
            675                 680                 685

Arg Cys Asp Ile Lys Asp Leu Pro Lys Glu Ile Thr Val Ala Thr Ser
690                 695                 700

Arg Thr Leu Ser Tyr Tyr Lys Leu Gly Ala Ser Gln Arg Val Ala Gly
705                 710                 715                 720

Asp Ser Gly Phe Ala Ala Tyr Ser Arg Tyr Arg Ile Gly Asn Tyr Lys
            725                 730                 735

Leu Asn Thr Asp His Ser Ser Ser Asp Asn Ile Ala Leu Leu Val
            740                 745                 750

Gln Met Tyr Ser Phe Val Ser Glu Glu Thr Gly Thr Leu Ile Val Asn
            755                 760                 765

Ser Arg Leu Cys Ala Tyr Cys Cys Asn Ile Val Asn Val Ser Leu Val
            770                 775                 780

Lys Pro Ser Phe Tyr Val Tyr Ser Arg Val Lys Asn Leu Asn Ser Ser
785                 790                 795                 800

Arg Val Pro Asp Leu Leu Val Leu Glu

<210> SEQ ID NO 10
<211> LENGTH: 1230
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 10

Met Ala Ala Pro Gly Ser Ala Arg Arg Pro Leu Leu Leu Leu Leu Leu
1               5                   10                  15

Leu Leu Leu Leu Gly Leu Met His Cys Ala Ser Ala Ala Met Phe Met
            20                  25                  30

Val Lys Asn Gly Asn Gly Thr Ala Cys Ile Met Ala Asn Phe Ser Ala
        35                  40                  45

Ala Phe Ser Val Asn Tyr Asp Thr Lys Ser Gly Pro Lys Asn Met Thr
    50                  55                  60

Phe Asp Leu Pro Ser Asp Ala Thr Val Val Leu Asn Arg Ser Ser Cys
65                  70                  75                  80

Gly Lys Glu Asn Thr Ser Asp Pro Ser Leu Val Ile Ala Phe Gly Arg
                85                  90                  95

Gly His Thr Leu Thr Leu Asn Phe Thr Arg Asn Ala Thr Arg Tyr Ser
            100                 105                 110

Val Gln Leu Met Ser Phe Val Tyr Asn Leu Ser Asp Thr His Leu Phe
        115                 120                 125

Pro Asn Ala Ser Ser Lys Glu Ile Lys Thr Val Glu Ser Ile Thr Asp
    130                 135                 140

Ile Arg Ala Asp Ile Asp Lys Lys Tyr Arg Cys Val Ser Gly Thr Gln
145                 150                 155                 160

Val His Met Asn Asn Val Thr Val Thr Leu His Asp Ala Thr Ile Gln
                165                 170                 175

Ala Tyr Leu Ser Asn Ser Ser Phe Ser Arg Gly Glu Thr Arg Cys Glu
            180                 185                 190

Gln Asp Arg Pro Ser Pro Thr Thr Ala Pro Ala Pro Pro Ser Pro
            195                 200                 205

Ser Pro Ser Pro Val Pro Lys Ser Pro Ser Val Asp Lys Tyr Asn Val
    210                 215                 220

Ser Gly Thr Asn Gly Thr Cys Leu Leu Ala Ser Met Gly Leu Gln Leu
225                 230                 235                 240

Asn Leu Thr Tyr Glu Arg Lys Asp Asn Thr Thr Val Thr Arg Leu Leu
                245                 250                 255

Asn Ile Asn Pro Asn Lys Thr Ser Ala Ser Gly Ser Cys Gly Ala His
            260                 265                 270

Leu Val Thr Leu Glu Leu His Ser Glu Gly Thr Thr Val Leu Leu Phe
        275                 280                 285

Gln Phe Gly Met Asn Ala Ser Ser Ser Arg Phe Phe Leu Gln Gly Ile
    290                 295                 300

Gln Leu Asn Thr Ile Leu Pro Asp Ala Arg Asp Pro Ala Phe Lys Ala
305                 310                 315                 320

Ala Asn Gly Ser Leu Arg Ala Leu Gln Ala Thr Val Gly Asn Ser Tyr
                325                 330                 335

Lys Cys Asn Ala Glu Glu His Val Arg Val Thr Lys Ala Phe Ser Val
            340                 345                 350

-continued

```
Asn Ile Phe Lys Val Trp Val Gln Ala Phe Lys Val Glu Gly Gly Gln
            355                 360                 365
Phe Gly Ser Gly Thr Met Asn Ile Thr Asn Leu Cys Pro Phe Gly Glu
    370                 375                 380
Val Phe Asn Ala Thr Arg Phe Ala Ser Val Tyr Ala Trp Asn Arg Lys
385                 390                 395                 400
Arg Ile Ser Asn Cys Val Ala Asp Tyr Ser Val Leu Tyr Asn Ser Ala
                405                 410                 415
Ser Phe Ser Thr Phe Lys Cys Tyr Gly Val Ser Pro Thr Lys Leu Asn
            420                 425                 430
Asp Leu Cys Phe Thr Asn Val Tyr Ala Asp Ser Phe Val Ile Arg Gly
            435                 440                 445
Asp Glu Val Arg Gln Ile Ala Pro Gly Gln Thr Gly Lys Ile Ala Asp
    450                 455                 460
Tyr Asn Tyr Lys Leu Pro Asp Asp Phe Thr Gly Cys Val Ile Ala Trp
465                 470                 475                 480
Asn Ser Asn Asn Leu Asp Ser Lys Val Gly Gly Asn Tyr Asn Tyr Leu
                485                 490                 495
Tyr Arg Leu Phe Arg Lys Ser Asn Leu Lys Pro Phe Glu Arg Asp Ile
            500                 505                 510
Ser Thr Glu Ile Tyr Gln Ala Gly Ser Thr Pro Cys Asn Gly Val Glu
            515                 520                 525
Gly Phe Asn Cys Tyr Phe Pro Leu Gln Ser Tyr Gly Phe Gln Pro Thr
    530                 535                 540
Asn Gly Val Gly Tyr Gln Pro Tyr Arg Val Val Val Leu Ser Phe Glu
545                 550                 555                 560
Leu Leu His Ala Pro Ala Thr Val Ser Asp Asn Gly Pro Gln Asn Gln
                565                 570                 575
Arg Asn Ala Pro Arg Ile Thr Phe Gly Gly Pro Ser Asp Ser Thr Gly
            580                 585                 590
Ser Asn Gln Asn Gly Glu Arg Ser Gly Ala Arg Ser Lys Gln Arg Arg
            595                 600                 605
Pro Gln Gly Leu Pro Asn Asn Thr Ala Ser Trp Phe Thr Ala Leu Thr
610                 615                 620
Gln His Gly Lys Glu Asp Leu Lys Phe Pro Arg Gly Gln Gly Val Pro
625                 630                 635                 640
Ile Asn Thr Asn Ser Ser Pro Asp Asp Gln Ile Gly Tyr Tyr Arg Arg
                645                 650                 655
Ala Thr Arg Arg Ile Arg Gly Gly Asp Gly Lys Met Lys Asp Leu Ser
            660                 665                 670
Pro Arg Trp Tyr Phe Tyr Tyr Leu Gly Thr Gly Pro Glu Ala Gly Leu
    675                 680                 685
Pro Tyr Gly Ala Asn Lys Asp Gly Ile Ile Trp Val Ala Thr Glu Gly
    690                 695                 700
Ala Leu Asn Thr Pro Lys Asp His Ile Gly Thr Arg Asn Pro Ala Asn
705                 710                 715                 720
Asn Ala Ala Ile Val Leu Gln Leu Pro Gln Gly Thr Thr Leu Pro Lys
                725                 730                 735
Gly Phe Tyr Ala Glu Gly Ser Arg Gly Gly Ser Gln Ala Ser Ser Arg
            740                 745                 750
Ser Ser Ser Arg Ser Arg Asn Ser Ser Arg Asn Ser Thr Pro Gly Ser
            755                 760                 765
Ser Arg Gly Thr Ser Pro Ala Arg Met Ala Gly Asn Gly Gly Asp Ala
```

```
                770             775             780
Ala Leu Ala Leu Leu Leu Leu Asp Arg Leu Asn Gln Leu Glu Ser Lys
785             790             795             800

Met Ser Gly Lys Gly Gln Gln Gln Gly Gln Thr Val Thr Lys Lys
                805             810             815

Ser Ala Ala Glu Ala Ser Lys Lys Pro Arg Gln Lys Arg Thr Ala Thr
                820             825             830

Lys Ala Tyr Asn Val Thr Gln Ala Phe Gly Arg Arg Gly Pro Glu Gln
                835             840             845

Thr Gln Gly Asn Phe Gly Asp Gln Glu Leu Ile Arg Gln Gly Thr Asp
                850             855             860

Tyr Lys His Trp Pro Gln Ile Ala Gln Phe Ala Pro Ser Ala Ser Ala
865             870             875             880

Phe Phe Gly Met Ser Arg Ile Gly Met Glu Val Thr Pro Ser Gly Thr
                885             890             895

Trp Leu Thr Tyr Thr Gly Ala Ile Lys Leu Asp Asp Lys Asp Pro Asn
                900             905             910

Phe Lys Asp Gln Val Ile Leu Leu Asn Lys His Ile Asp Ala Tyr Lys
                915             920             925

Thr Phe Pro Pro Thr Glu Pro Lys Lys Asp Lys Lys Lys Lys Ala Asp
930             935             940

Glu Thr Gln Ala Leu Pro Gln Arg Gln Lys Lys Gln Gln Thr Val Thr
945             950             955             960

Leu Leu Pro Ala Ala Asp Leu Asp Asp Phe Ser Lys Gln Leu Gln Gln
                965             970             975

Ser Met Ser Ser Ala Asp Ser Thr Gln Ala Ala Asp Ser Asn Gly Thr
                980             985             990

Ile Thr Val Glu Glu Leu Lys Lys Leu Leu Glu Gln Arg Leu Phe Ala
                995             1000            1005

Arg Thr Arg Ser Met Trp Ser Phe Asn Pro Glu Thr Asn Ile Leu
        1010            1015            1020

Leu Asn Val Pro Leu His Gly Thr Ile Leu Thr Arg Pro Leu Leu
        1025            1030            1035

Glu Ser Glu Leu Val Ile Gly Ala Val Ile Leu Arg Gly His Leu
        1040            1045            1050

Arg Ile Ala Gly His His Leu Gly Arg Cys Asp Ile Lys Asp Leu
        1055            1060            1065

Pro Lys Glu Ile Thr Val Ala Thr Ser Arg Thr Leu Ser Tyr Tyr
        1070            1075            1080

Lys Leu Gly Ala Ser Gln Arg Val Ala Gly Asp Ser Gly Phe Ala
        1085            1090            1095

Ala Tyr Ser Arg Tyr Arg Ile Gly Asn Tyr Lys Leu Asn Thr Asp
        1100            1105            1110

His Ser Ser Ser Ser Asp Asn Ile Ala Leu Leu Val Gln Met Tyr
        1115            1120            1125

Ser Phe Val Ser Glu Glu Thr Gly Thr Leu Ile Val Asn Ser Arg
        1130            1135            1140

Leu Cys Ala Tyr Cys Cys Asn Ile Val Asn Val Ser Leu Val Lys
        1145            1150            1155

Pro Ser Phe Tyr Val Tyr Ser Arg Val Lys Asn Leu Asn Ser Ser
        1160            1165            1170

Arg Val Pro Asp Leu Leu Val Leu Glu Gly Ser Val Glu Glu Cys
        1175            1180            1185
```

Leu Leu Asp Glu Asn Ser Met Leu Ile Pro Ile Ala Val Gly Gly
    1190                1195                1200

Ala Leu Ala Gly Leu Val Leu Ile Val Leu Ile Ala Tyr Leu Val
    1205                1210                1215

Gly Arg Lys Arg Ser His Ala Gly Tyr Gln Thr Ile
    1220                1225                1230

<210> SEQ ID NO 11
<211> LENGTH: 3834
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 11

```
ggtaccatgt tgttttttct tgttttattg ccactagtct ctagtcagtg tgttaatctt      60
acaaccagaa ctcaattacc ccctgcatac actaattctt tcacacgtgg tgtttattac    120
cctgacaaag ttttcagatc ctcagtttta cattcaactc aggacttgtt cttacctttc    180
ttttccaatg ttacttggtt ccatgctata catgtctctg ggaccaatgg tactaagagg    240
tttgataacc ctgtcctacc atttaatgat ggtgtttatt ttgcttccac tgagaagtct    300
aacataataa gaggctggat ttttggtact actttagatt cgaagaccca gtccctactt    360
attgttaata cgctactaa tgttgttatt aaagtctgtg aatttcaatt ttgtaatgat    420
ccatttttgg gtgtttatta ccacaaaaac aacaaaagtt ggatggaaag tgagttcaga    480
gtttattcta gtgcgaataa ttgcactttt gaatatgtct ctcagccttt tcttatggac    540
cttgaaggaa acagggtaa tttcaaaaat cttagggaat tgtgtttaa gaatattgat    600
ggttatttta aaatatattc taagcacacg cctattaatt tagtgcgtga tctccctcag    660
ggtttttcgg ctttagaacc attggtagat tgccaatag gtattaacat cactaggttt    720
caaactttac ttgctttaca tagaagttat ttgactcctg gtgattcttc ttcaggttgg    780
acagctggtg ctgcagctta ttatgtgggt tatcttcaac ctaggacttt tctattaaaa    840
tataatgaaa atggaaccat tacagatgct gtagactgtg cacttgaccc tctctcagaa    900
acaaagtgta cgttgaaatc cttcactgta gaaaaaggaa tctatcaaac ttctaacttt    960
agagtccaac aacagaatc tattgttaga tttcctaata ttacaaactt gtgcccttt   1020
ggtgaagttt taacgccac cagatttgca tctgtttatg cttggaacag gaagagaatc   1080
agcaactgtg ttgctgatta ttctgtccta taataattccg catcattttc cacttttaag   1140
tgttatggag tgtctcctac taaattaaat gatctctgct ttactaatgt ctatgcagat   1200
tcatttgtaa ttagaggtga tgaagtcaga caaatcgctc cagggcaaac tggaaagatt   1260
gctgattata attataaatt accagatgat tttacaggct gcgttatagc ttggaattct   1320
aacaatcttg attctaaggt tggtggtaat tataattacc tgtatagatt gtttaggaag   1380
tctaatctca aacctttga gagagatatt tcaactgaaa tctatcaggc cggtagcaca   1440
ccttgtaatg gtgttgaagg ttttaattgt tactttcctt tacaatcata tggtttccaa   1500
cccactaatg gtgttggtta ccaaccatac agagtagtag tactttcttt tgaacttcta   1560
catgcaccag caactgtttg tggacctaaa aagtctacta atttggttaa aaacaaatgt   1620
gtcaatttca acttcaatgg tttaacaggc acaggtgttc ttactgagtc taacaaaaag   1680
tttctgcctt tccaacaatt tggcagagac attgctgaca ctactgatgc tgtccgtgat   1740
```

```
ccacagacac ttgagattct tgacattaca ccatgttctt ttggtggtgt cagtgttata    1800
acaccaggaa caaatacttc taaccaggtt gctgttcttt atcaggatgt taactgcaca    1860
gaagtccctg ttgctattca tgcagatcaa cttactccta cttggcgtgt ttattctaca    1920
ggttctaatg tttttcaaac acgtgcaggc tgtttaatag gggctgaaca tgtcaacaac    1980
tcatatgagt gtgacatacc cattggtgca ggtatatgcg ctagttatca gactcagact    2040
aattctcctc ggcgggcacg tagtgtagct agtcaatcca tcattgccta cactatgtca    2100
cttggtgcag aaaattcagt tgcttactct aataactcta ttgccatacc cacaaatttt    2160
actattagtg ttaccacaga aattctacca gtgtctatga ccaagacatc agtagattgt    2220
acaatgtaca tttgtggtga ttcaactgaa tgcagcaatc ttttgttgca atatggcagt    2280
ttttgtacac aattaaaccg tgctttaact ggaatagctg ttgaacaaga caaaacacc     2340 caagaagttt ttgcacaagt caaacaaatt tacaaaacac caccaattaa agattttggt    2400
ggttttaatt tttcacaaat attaccagat ccatcaaaac caagcaagag gtcatttatt    2460
gaggatctac ttttcaacaa agtgacactt gcagatgctg gcttcatcaa acaatatggt    2520
gattgccttg gtgatattgc tgctagagac ctcatttgtg cacaaaagtt taacggcctt    2580
actgttttgc cacctttgct cacagatgaa atgattgctc aatacacttc tgcactgtta    2640
gcgggtacaa tcacttctgg ttggaccttt ggtgcaggtg ctgcattaca aataccattt    2700
gctatgcaaa tggcttatag gtttaatggt attggagtta cacagaatgt tctctatgag    2760
aaccaaaaat tgattgccaa ccaatttaat agtgctattg caaaattca agactcactt     2820 tcttccacag caagtgcact tggaaaactt caagatgtgg tcaaccaaaa tgcacaagct    2880
ttaaacacgc ttgttaaaca acttagctcc aattttggtg caatttcaag tgttttaaat    2940
gatatccttt cacgtcttga caaagttgag gctgaagtgc aaattgatag gttgatcaca    3000
ggcagacttc aaagtttgca gacatatgtg actcaacaat taattagagc tgcagaaatc    3060
agagcttctg ctaatcttgc tgctactaaa atgtcagagt gtgtacttgg acaatcaaaa    3120
agagttgatt tttgtggaaa gggctatcat cttatgtcct cccctcagtc agcacctcat    3180
ggtgtagtct tcttgcatgt gacttatgtc cctgcacaag aaaagaactt cacaactgct    3240
cctgccattt gtcatgatgg aaaagcacac tttcctcgtg aaggtgtctt tgtttcaaat    3300
ggcacacact ggtttgtaac acaaaggaat tttatgaac cacaaatcat tactacagac    3360
aacacatttg tgtctggtaa ctgtgatgtt gtaataggaa ttgtcaacaa cacagtttat    3420 gatccttgc aacctgaatt agactcattc aaggaggagt tagataaata ttttaagaat     3480
catacatcac cagatgttga tttaggtgac atctctggca ttaatgcttc agttgtaaac    3540
attcaaaaag aaattgaccg cctcaatgag gttgccaaga atttaaatga atctctcata    3600
gatctccaag aacttggaaa gtatgagcag tatataaaat ggccatggta catttggcta    3660
ggttttatag ctggcttgat tgccatagta atggtgacaa ttatgctttg ctgtatgacc    3720
agttgctgta gttgtctcaa gggctgttgt tcttgtggat cctgctgcaa atttgatgaa    3780
gacgactctg agccagtgct caaaggagtc aaattacatt acacataact cgag          3834
```

<210> SEQ ID NO 12
<211> LENGTH: 2436
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 12

```
ggtaccatga acattactaa cctctgcccg ttcggcgagg tatttaatgc aacacgattt      60
gcaagtgtct atgcgtggaa tagaaaacgc atttcaaatt gtgtcgccga ttactccgta     120
ctctataaca gcgcctcatt tagcacgttt aaatgttatg gtgtctcccc cacaaagctc     180
aatgatctct gcttcactaa cgtgtatgct gatagcttcg tgatccgagg tgacgaagtg     240
aggcaaattg ctccgggtca aaccgggaag atcgcagatt ataactataa gttgccagac     300
gatttcactg gatgtgttat tgcgtggaac tctaataacc tggactcaaa agtgggaggg     360
aattacaatt acctctacag gctgtttcgc aaaagcaatt tgaaacccctt cgagagggac     420
atcagtactg agatatacca ggcagggtca accccctgca atggagtcga aggatttaat     480
tgctacttcc cgcttcagag ctatgggttc cagccaacga acggagtggg ctaccaaccc     540
tatcgggtcg tagttttgag ttttgagctg ctccacgccc ctgcgacggt ttctgataat     600
gggccccaga atcagaggaa tgccccaaga atcactttcg gaggtccatc cgattcaacg     660
ggcagcaacc agaacggaga acggtctggc gccaggtcaa agcaacgccg gccccagggg     720
cttccgaaca atacagcaag ctggtttact gcactcacgc aacatgggaa agaagatctg     780
aaattcccaa ggggccaagg tgtcccaatc aacaccaaca gcagtcctga tgatcaaata     840
ggatactatc gacgcgcgac tcgcagaata cgagggggg acggtaaaat gaaagatctc     900
tctccacgct ggtacttcta ctatctgggg acggacccg aagcagggct tccatatgga     960
gctaacaagg atggcattat ttgggtggct accgagggcg ctctgaatac accaaaagac    1020
catataggga ctagaaatcc agcgaataac gcagcaatcg tgctgcagct cccgcaaggt    1080
acgaccttgc cgaaagggtt ctatgcagag ggaagcagag gagggtcaca agcatcatca    1140
cgaagttcca gccgctccag aaatagctca agaaacagca ctccagggag cagtagagga    1200
acatcacccg ctcgaatggc aggtaatgga ggtgatgccg cgctggcgct tttgctgctg    1260
gatcggttga atcaacttga gtctaaaatg tctgggaagg acagcagca acaaggccag    1320
acggtcacca aaaaatccgc tgccgaggca tcaaagaaac cgcgccaaaa gaggactgcg    1380
acaaaggcct ataatgtgac acaagcattt ggacgacggg gcctgagca gacgcaaggg    1440
aactttggcg accaggagct tattcgccaa ggcaccgact acaaacattg gccacaaata    1500
gcccaatttg caccctcagc ctcagcattc tttggaatga gtcggattgg tatgcgaggtt    1560
acaccgagcg gtacttggtt gacctacact ggcgcaataa agttggatga caaggaccca    1620
aacttcaaag accaggtaat actcttgaac aaacacattg acgcttacaa aactttcccc    1680
cccacggagc cgaagaagga caagaagaaa aaggcagatg agactcaggc gcttccgcaa    1740
cggcagaaga agcaacaaac ggttactctc ctgccggctg cggatctgga cgactttagt    1800
aagcagctgc aacagagcat gagctctgct gactcaactc aggcagcaga tagcaatggt    1860
acaatcacag tagaggagtt gaagaagctg ttggaacagc gacttttcgc cagaactcga    1920
agcatgtgga gtttcaaccc tgaaaccaac atccttttga acgttccgct tcacggaact    1980
attcttaccc ggccacttct tgaatccgag ctcgtcatag gtgctgtaat ccttagggat    2040
cacctgagaa ttgctgggca ccatctcggt cggtgtgata tcaaggacct tcccaaggag    2100
attacggtag caacgagcag aacgttgtca tattacaagt gggggcttc acagagagta    2160
gcgggagact ccggtttcgc agcatactcc cgataccgga taggaaacta caaattgaac    2220
actgaccatt cttcctctag tgacaatata gctttgcttg ttcaaatgta ttccttcgtt    2280
tctgaggaaa caggcactct gattgtaaac tctaggcttt gtgcatactg ctgtaatatc    2340
```

| | | |
|---|---|---|
| gtaaacgtat ctctcgtgaa gcctagcttc tacgtctaca gtcgcgtcaa gaaccttaat | | 2400 |
| agttcccgag tgcctgattt gttggtttaa ctcgag | | 2436 |

<210> SEQ ID NO 13
<211> LENGTH: 3707
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 13

| | | |
|---|---|---|
| ggtaccatgg ctgcgccagg aagtgcacga cgcccgctgt tgttgcttct tcttcttctt | | 60 |
| ctcctcggat tgatgcactg tgctagtgca gccatgttta tggtaaagaa tggcaacggt | | 120 |
| actgcgtgca ttatggccaa ttttagcgcg gcttttttccg taaactacga tacaaaaagt | | 180 |
| gggcccaaga acatgacttt tgatcttccc tccgatgcaa ccgtcgtact gaatagatcc | | 240 |
| tcctgcggaa aagagaacac gagcgacccg tctctggtca ttgccttcgg gagaggtcat | | 300 |
| accettactc ttaattttac aagaaacgct acgagatact ccgttcagct tatgagcttt | | 360 |
| gtatataatc tgtcagacac acacctttttt cctaacgcct cctccaagga aattaagaca | | 420 |
| gtagaatcaa taacggacat aagagcggat attgataaaa agtatcggtg cgtttccggg | | 480 |
| acacaggtgc acatgaataa cgtgacggtc actttgcatg atgcgaccat ccaagcctac | | 540 |
| ctctccaaca gctctttttc ccgaggagaa acccgatgcg aacaagatcg gccctcacct | | 600 |
| accactgccc ctcccgcccc gccctcccca tcccctctc cggtgcccaa atcccctcc | | 660 |
| gtcgacaaat ataacgtttc tggtacgaac gggacgtgcc ttctggcaag catgggtctc | | 720 |
| caactgaatc ttacttatga gagaaaagat aacaccaccg tcacgcgact gctcaacatt | | 780 |
| aatcccaaca agacgtctgc ctcaggttca tgtggggctc atctcgtgac tcttgagttg | | 840 |
| cactccgagg gcaccactgt tttgcttttc caatttggta tgaatgcgag ctcaagtcga | | 900 |
| ttttttctgc agggtattca gttgaacacg attctgccgg atgccaggga ccccgcgttc | | 960 |
| aaagctgcga atgcagcttt gagagcactc caggcgaccg tcggtaatag ctacaagtgt | | 1020 |
| aatgccgaag aacacgtccg agtcaccaaa gcgttttcag tcaatatttt taaagtatgg | | 1080 |
| gtacaagcgt ttaaagttga ggggggtcaa ttcggtagtg gtaccatgaa cattactaac | | 1140 |
| ctctgcccgt tcggcgaggt atttaatgca acacgatttg caagtgtcta tgcgtggaat | | 1200 |
| agaaaacgca tttcaaattg tgtcgccgat tactccgtac tctataacag cgcctcatt | | 1260 |
| agcacgttta aatgttatgg tgtctccccc acaaagctca atgatctctg cttcactaac | | 1320 |
| gtgtatgctg atagcttcgt gatccgaggt gacgaagtga ggcaaattgc tccgggtcaa | | 1380 |
| accgggaaga tcgcagatta taactataag ttgccagacg atttcactgg atgtgttatt | | 1440 |
| gcgtggaact ctaataacct ggactcaaaa gtgggaggga attacaatta cctctacagg | | 1500 |
| ctgtttcgca aaagcaattt gaaacccttc gagagggaca tcagtactga gatataccag | | 1560 |
| gcagggtcaa ccccctgcaa tggagtcgaa ggatttaatt gctacttccc gcttcagagc | | 1620 |
| tatgggttcc agccaacgaa cggagtgggc taccaaccct atcgggtcgt agttttgagt | | 1680 |
| tttgagctgc tccacgcccc tgcgacggtt tctgataatg ggccccagaa tcagaggaat | | 1740 |
| gccccaagaa tcactttcgg aggtccatcc gattcaacgg gcagcaacca gaacggagaa | | 1800 |
| cggtctggcg ccaggtcaaa gcaacgccgg ccccaggggc ttccgaacaa tacagcaagc | | 1860 |
| tggtttactg cactcacgca acatgggaaa gaagatctga aattcccaag gggccaaggt | | 1920 |

```
gtcccaatca acaccaacag cagtcctgat gatcaaatag gatactatcg acgcgcgact    1980
cgcagaatac gagggggga cggtaaaatg aaagatctct ctccacgctg gtacttctac    2040
tatctgggga cgggacccga agcagggctt ccatatggag ctaacaagga tggcattatt    2100
tgggtggcta ccgagggcgc tctgaataca ccaaaagacc atatagggac tagaaatcca    2160
gcgaataacg cagcaatcgt gctgcagctc ccgcaaggta cgaccttgcc gaaagggttc    2220
tatgcagagg gaagcagagg agggtcacaa gcatcatcac gaagttccag ccgctccaga    2280
aatagctcaa gaaacagcac tccagggagc agtagaggaa catcacccgc tcgaatggca    2340
ggtaatggag gtgatgccgc gctggcgctt ttgctgctgg atcggttgaa tcaacttgag    2400
tctaaaatgt ctgggaaggg acagcagcaa caaggccaga cggtcaccaa aaaatccgct    2460
gccgaggcat caaagaaacc gcgccaaaag aggactgcga caaaggccta taatgtgaca    2520
caagcatttg gacgacgggg ccctgagcag acgcaaggga ctttggcga ccaggagctt    2580 attcgccaag gcaccgacta caaacattgg ccacaaatag cccaatttgc accctcagcc    2640
tcagcattct ttggaatgag tcggattggt atggaggtta caccgagcgg tacttggttg    2700
acctacactg gcgcaataaa gttggatgac aaggacccaa acttcaaaga ccaggtaata    2760
ctcttgaaca aacacattga cgcttacaaa actttccccc ccacggagcc gaagaaggac    2820
aagaagaaaa aggcagatga gactcaggcg cttccgcaac ggcagaagaa gcaacaaacg    2880
gttactctcc tgccggctgc ggatctggac gactttagta agcagctgca acagagcatg    2940
agctctgctg actcaactca ggcagcagat agcaatggta caatcacagt agaggagttg    3000
aagaagctgt tggaacagcg acttttcgcc agaactcgaa gcatgtggag tttcaaccct    3060
gaaaccaaca tccttttgaa cgttccgctt cacggaacta ttcttacccg gccacttctt    3120
gaatccgagc tcgtcatagg tgctgtaatc cttaggggtc acctgagaat tgctgggcac    3180
catctcggtc ggtgtgatat caaggacctt cccaaggaga ttacggtagc aacgagcaga    3240
acgttgtcat attacaagtt gggggcttca cagagagtag cgggagactc cggtttcgca    3300
gcatactccc gataccggat aggaaactac aaattgaaca ctgaccattc ttcctctagt    3360
gacaatatag ctttgcttgt tcaaatgtat tccttcgttt ctgaggaaac aggcactctg    3420
attgtaaact ctaggctttg tgcatactgc tgtaatatcg taaacgtatc tctcgtgaag    3480
cctagcttct acgtctacag tcgcgtcaag aaccttaata gttcccgagt gcctgatttg    3540
ttggttctcg agggatccgt agaggaatgc ttgctggatg aaaattctat gctcatcccg    3600
attgccgtag gcggtgctct ggccggactg gttctgatag tgctcatagc ttacctggtg    3660
gggcgcaagc gaagccatgc gggctaccag accatataag cggccgc                  3707
```

<210> SEQ ID NO 14  
<211> LENGTH: 1881  
<212> TYPE: DNA  
<213> ORGANISM: Artificial Sequence  
<220> FEATURE:  
<223> OTHER INFORMATION: Description of Artificial Sequence: Synthetic polynucleotide

<400> SEQUENCE: 14

```
atggtgagca agggcgagga gctgatcaag gagaacatga agcaagct gtacctggaa      60 ggcagcgtga acggccacca gttcaagtgc acccacgaag gggagggcaa gccctacgag    120
ggcaagcaga ccaacaggat caaggtggtg gagggaggcc cctgccgtt cgcattcgac    180 atcctggcca cccactttat gtacgggagc aaggtgttca tcaagtaccc cgccgacctc    240
```

```
cccgattatt ttaagcagtc cttccctgag ggcttcacat gggagagagt catggtgttc    300
gaagacgggg gcgtgctgac cgccacccag acaccagcc tccaggacgg cgagctcatc    360
tacaacgtca aggtcagagg ggtgaacttc ccagccaacg ccccgtgat gcagaagaaa    420 acactgggct gggagcccag caccgagacc atgtacccg ctgacggcgg cctggaaggc    480
agatgcgaca aggccctgaa gctcgtgggc ggggccacc tgcacgtcaa cttcaagacc    540
acatacaagt ccaagaaacc cgtgaagatg cccggcgtcc actacgtgga ccgcagactg    600
gaaagaatca aggaggccga caacgagacc tacgtcgagc agtacgagca cgctgtggcc    660
agatactcca acctgggcgg aggcttcaca ctcgaagatt tcgttgggga ctggcgacag    720
acagccggct acaacttgag tcaagtcctt gaacagggag gtgtgtccag tttgtttcag    780
aatctcgggg tgtccgtaac tccgatccaa aggattgtcc tgagcggtga aaatgggctg    840
aagatcgaca tccatgtcat catcccgtat gaaggtctga gcggcgacca aatgggccag    900
atcgaaaaaa ttttttaaggt ggtgtaccct gtggataatc atcactttaa ggtgatcctg    960
cactatggca cactggtaat cgacggggtt acgccgaaca tgatcgacta tttcggacgg   1020
ccgtatgaag gcatcgccgt gttcgacggc aaaaagatca ctgtaacagg gaccctgtgg   1080
aacggcaaca aaattatcga cgagcgcctg atcaaccccg acggctccct gctgttccga   1140
gtaaccatca acggagtgac cggctggcgt ctgcatgaac gcattctggc gaggcacgag   1200
ctgatcaagg agaacatgag aagcaagctg tacctggaag gcagcgtgaa cggccaccag   1260
ttcaagtgca cccacgaagg ggagggcaag ccctacgagg gcaagcagac caacaggatc   1320
aaggtggtgg agggaggccc cctgccgttc gcattcgaca tcctggccac ccactttatg   1380
tacgggagca aggtgttcat caagtacccc gccgacctcc ccgattattt taagcagtcc   1440
ttccctgagg gcttcacatg ggagagagtc atggtgttcg aagacggggg cgtgctgacc   1500
gccacccagg acaccagcct ccaggacggc gagctcatct acaacgtcaa ggtcagaggg   1560
gtgaacttcc cagccaacgg ccccgtgatg cagaagaaaa cactgggctg ggagcccagc   1620
accgagacca tgtaccccgc tgacggcggc ctggaaggca gatgcgacaa ggccctgaag   1680
ctcgtgggcg ggggccacct gcacgtcaac ttcaagacca catacaagtc caagaaaccc   1740
gtgaagatgc ccggcgtcca ctacgtggac cgcagactgg aaagaatcaa ggaggccgac   1800
aacgagacct acgtcgagca gtacgagcac gctgtggcca gatactccaa cctgggcgga   1860
ggcatggacg agctgtacaa g                                             1881
```

<210> SEQ ID NO 15
<211> LENGTH: 627
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 15

```
Met Val Ser Lys Gly Glu Glu Leu Ile Lys Glu Asn Met Arg Ser Lys
1               5                   10                  15

Leu Tyr Leu Glu Gly Ser Val Asn Gly His Gln Phe Lys Cys Thr His
            20                  25                  30

Glu Gly Glu Gly Lys Pro Tyr Glu Gly Lys Gln Thr Asn Arg Ile Lys
        35                  40                  45

Val Val Glu Gly Gly Pro Leu Pro Phe Ala Phe Asp Ile Leu Ala Thr
    50                  55                  60
```

-continued

His Phe Met Tyr Gly Ser Lys Val Phe Ile Lys Tyr Pro Ala Asp Leu
65                  70                  75                  80

Pro Asp Tyr Phe Lys Gln Ser Phe Pro Glu Gly Phe Thr Trp Glu Arg
            85                  90                  95

Val Met Val Phe Glu Asp Gly Val Leu Thr Ala Thr Gln Asp Thr
                100                 105                 110

Ser Leu Gln Asp Gly Glu Leu Ile Tyr Asn Val Lys Val Arg Gly Val
            115                 120                 125

Asn Phe Pro Ala Asn Gly Pro Val Met Gln Lys Lys Thr Leu Gly Trp
130                 135                 140

Glu Pro Ser Thr Glu Thr Met Tyr Pro Ala Asp Gly Gly Leu Glu Gly
145                 150                 155                 160

Arg Cys Asp Lys Ala Leu Lys Leu Val Gly Gly Gly His Leu His Val
                165                 170                 175

Asn Phe Lys Thr Thr Tyr Lys Ser Lys Lys Pro Val Lys Met Pro Gly
            180                 185                 190

Val His Tyr Val Asp Arg Arg Leu Glu Arg Ile Lys Glu Ala Asp Asn
            195                 200                 205

Glu Thr Tyr Val Glu Gln Tyr Glu His Ala Val Ala Arg Tyr Ser Asn
210                 215                 220

Leu Gly Gly Gly Phe Thr Leu Glu Asp Phe Val Gly Asp Trp Arg Gln
225                 230                 235                 240

Thr Ala Gly Tyr Asn Leu Ser Gln Val Leu Glu Gln Gly Gly Val Ser
                245                 250                 255

Ser Leu Phe Gln Asn Leu Gly Val Ser Val Thr Pro Ile Gln Arg Ile
            260                 265                 270

Val Leu Ser Gly Glu Asn Gly Leu Lys Ile Asp Ile His Val Ile Ile
            275                 280                 285

Pro Tyr Glu Gly Leu Ser Gly Asp Gln Met Gly Gln Ile Glu Lys Ile
290                 295                 300

Phe Lys Val Val Tyr Pro Val Asp Asn His His Phe Lys Val Ile Leu
305                 310                 315                 320

His Tyr Gly Thr Leu Val Ile Asp Gly Val Thr Pro Asn Met Ile Asp
                325                 330                 335

Tyr Phe Gly Arg Pro Tyr Glu Gly Ile Ala Val Phe Asp Gly Lys Lys
            340                 345                 350

Ile Thr Val Thr Gly Thr Leu Trp Asn Gly Asn Lys Ile Ile Asp Glu
            355                 360                 365

Arg Leu Ile Asn Pro Asp Gly Ser Leu Leu Phe Arg Val Thr Ile Asn
            370                 375                 380

Gly Val Thr Gly Trp Arg Leu His Glu Arg Ile Leu Ala Arg His Glu
385                 390                 395                 400

Leu Ile Lys Glu Asn Met Arg Ser Lys Leu Tyr Leu Glu Gly Ser Val
                405                 410                 415

Asn Gly His Gln Phe Lys Cys Thr His Glu Gly Glu Gly Lys Pro Tyr
            420                 425                 430

Glu Gly Lys Gln Thr Asn Arg Ile Lys Val Val Glu Gly Gly Pro Leu
            435                 440                 445

Pro Phe Ala Phe Asp Ile Leu Ala Thr His Phe Met Tyr Gly Ser Lys
450                 455                 460

Val Phe Ile Lys Tyr Pro Ala Asp Leu Pro Asp Tyr Phe Lys Gln Ser
465                 470                 475                 480

```
Phe Pro Glu Gly Phe Thr Trp Glu Arg Val Met Val Phe Glu Asp Gly
                    485                 490                 495

Gly Val Leu Thr Ala Thr Gln Asp Thr Ser Leu Gln Asp Gly Glu Leu
                500             505                 510

Ile Tyr Asn Val Lys Val Arg Gly Val Asn Phe Pro Ala Asn Gly Pro
            515             520             525

Val Met Gln Lys Lys Thr Leu Gly Trp Glu Pro Ser Thr Glu Thr Met
    530             535                 540

Tyr Pro Ala Asp Gly Gly Leu Glu Gly Arg Cys Asp Lys Ala Leu Lys
545             550                 555                 560

Leu Val Gly Gly Gly His Leu His Val Asn Phe Lys Thr Thr Tyr Lys
            565                 570                 575

Ser Lys Lys Pro Val Lys Met Pro Gly Val His Tyr Val Asp Arg Arg
            580             585                 590

Leu Glu Arg Ile Lys Glu Ala Asp Asn Glu Thr Tyr Val Glu Gln Tyr
            595             600                 605

Glu His Ala Val Ala Arg Tyr Ser Asn Leu Gly Gly Gly Met Asp Glu
    610                 615                 620

Leu Tyr Lys
625
```